(12) United States Patent
Zhu et al.

(10) Patent No.: US 11,716,657 B2
(45) Date of Patent: Aug. 1, 2023

(54) MOVEMENT DIRECTION BASED COMMUNICATIONS BETWEEN USER EQUIPMENT (UE) AND BASE STATION (BS)

(71) Applicant: QUALCOMM Incorporated, San Diego, CA (US)

(72) Inventors: Xipeng Zhu, San Diego, CA (US); Ming Yang, San Diego, CA (US); Kausik Ray Chaudhuri, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/145,880

(22) Filed: Jan. 11, 2021

(65) Prior Publication Data

US 2021/0235342 A1     Jul. 29, 2021

Related U.S. Application Data

(60) Provisional application No. 62/965,044, filed on Jan. 23, 2020.

(51) Int. Cl.
*H04W 36/00* (2009.01)
*H04W 76/27* (2018.01)
(Continued)

(52) U.S. Cl.
CPC ........ *H04W 36/00837* (2018.08); *H04B 7/01* (2013.01); *H04W 36/0058* (2018.08); *H04W 74/0833* (2013.01); *H04W 76/27* (2018.02)

(58) Field of Classification Search
CPC ......... H04W 36/0016; H04W 36/0005; H04W 36/0085; H04W 36/00837;
(Continued)

(56) References Cited

U.S. PATENT DOCUMENTS

2013/0196670 A1   8/2013   Kim et al.
2013/0260760 A1 * 10/2013  Pan ................ H04W 36/32
                                                455/436
(Continued)

FOREIGN PATENT DOCUMENTS

WO    WO-2017011129 A1    1/2017
WO    WO-2019215666 A1    11/2019

OTHER PUBLICATIONS

International Search Report and Written Opinion—PCT/US2021/013033—ISA/EPO—dated Apr. 30, 2021.

*Primary Examiner* — Quoc Thai N Vu
(74) *Attorney, Agent, or Firm* — Arun Swain; Weaver Austin Villeneuve & Sampson LLP

(57) ABSTRACT

This disclosure provides systems, methods and apparatus for wireless communication. In one aspect, a user equipment (UE) may generate an indication of a first doppler shift associated with the wireless communication device moving with reference to a first target base station (BS), obtain, from the serving BS, a handover command for conditional handover (CHO) (with the handover command including a first trigger for handover to the first target BS), and synchronize with the first target BS during CHO after the first trigger is met, wherein the first trigger is associated with the first doppler shift. In another aspect, a serving BS generates the handover command for CHO and provides the handover command to the UE. The UE is to synchronize with the first target BS during CHO after the first trigger associated with a first doppler shift is met.

25 Claims, 18 Drawing Sheets

(51) Int. Cl.
*H04W 74/08* (2009.01)
*H04B 7/01* (2006.01)

(58) Field of Classification Search
CPC . H04W 36/0058; H04W 36/34; H04W 36/32; H04W 56/0035; H04W 76/27; H04W 74/0833; H04B 7/0695; H04B 7/01
See application file for complete search history.

(56) References Cited

U.S. PATENT DOCUMENTS

| | | | |
|---|---|---|---|
| 2016/0345222 A1 | 11/2016 | Axmon et al. | |
| 2017/0019819 A1* | 1/2017 | Yang | H04W 36/0072 |
| 2018/0295596 A1* | 10/2018 | Zhang | H04W 64/006 |
| 2021/0391894 A1* | 12/2021 | Yu | H04B 7/01 |

* cited by examiner

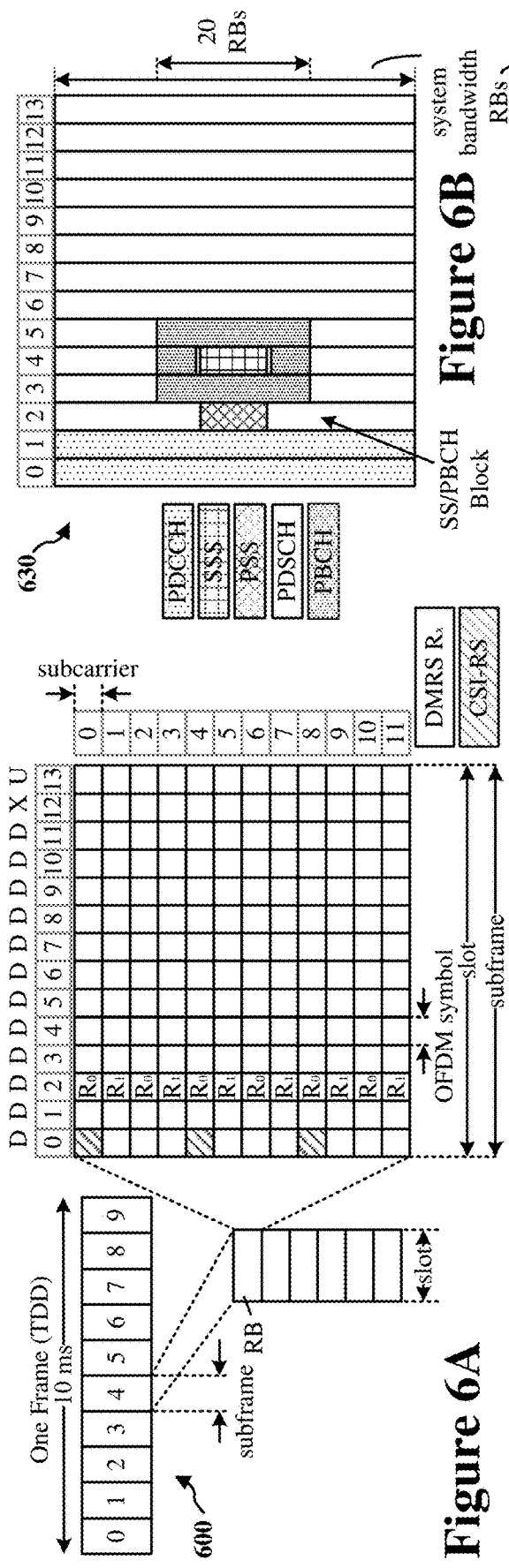
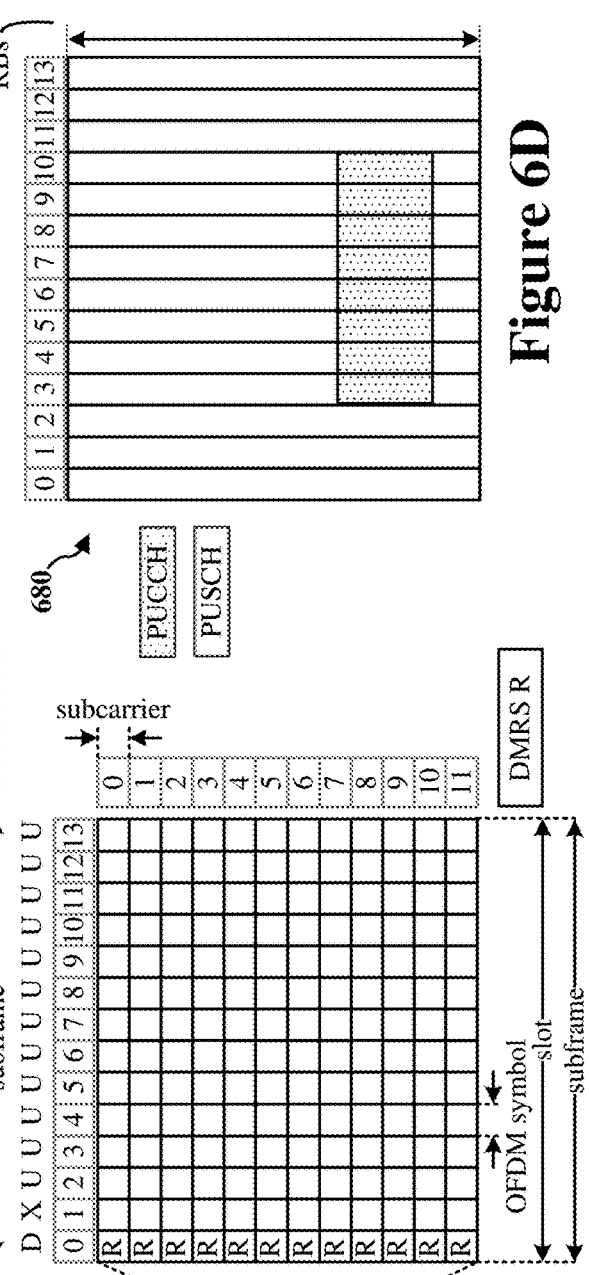
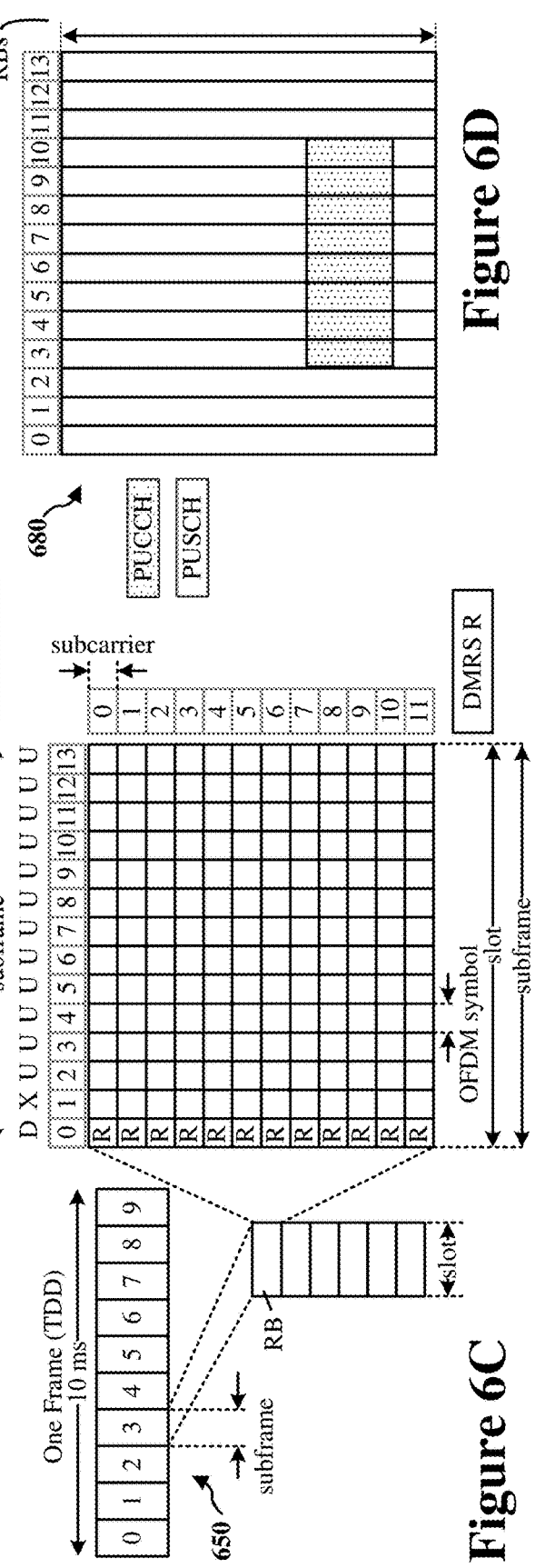
Figure 6A, Figure 6B, Figure 6C, Figure 6D

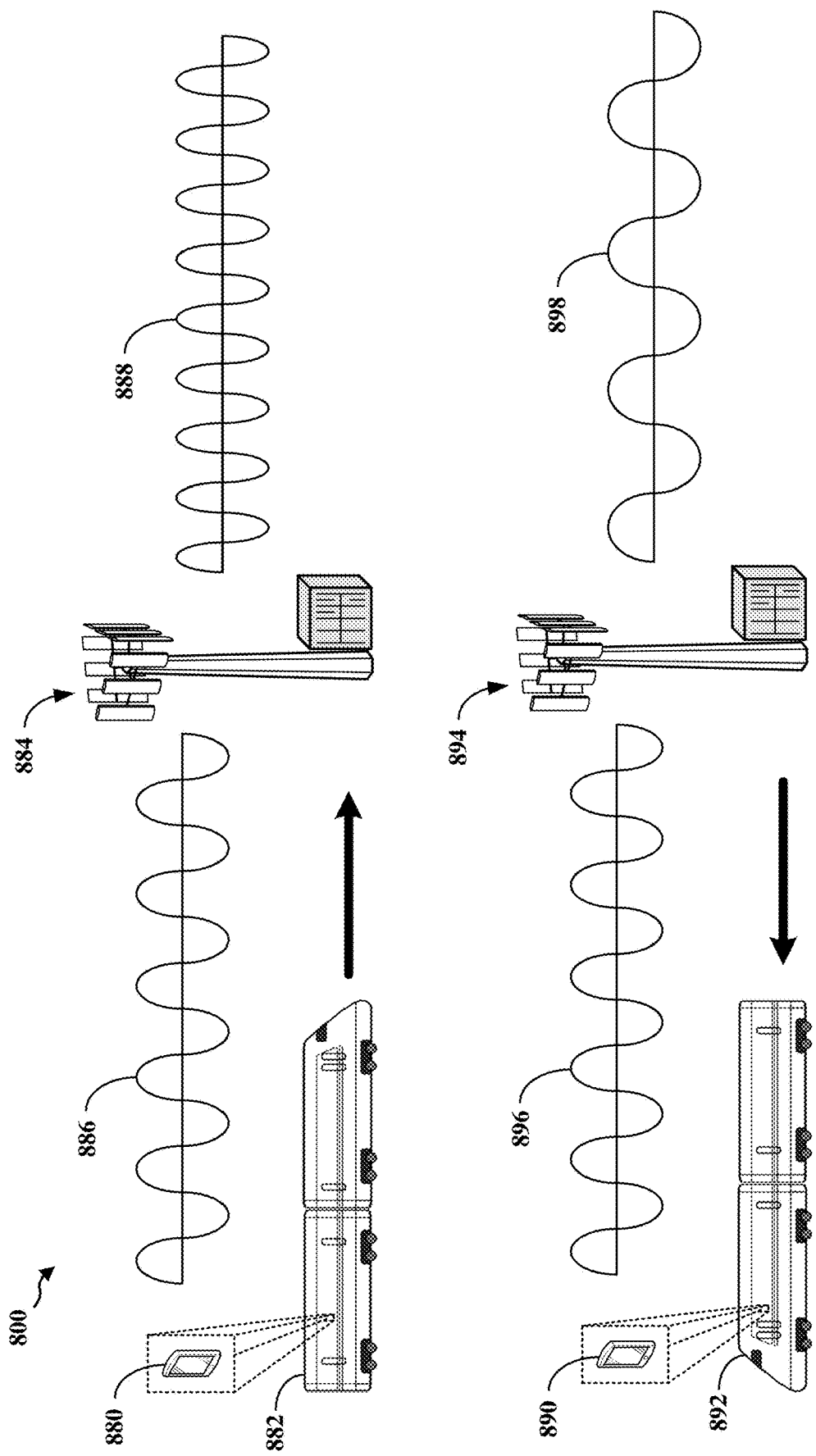

MOVEMENT DIRECTION BASED COMMUNICATIONS BETWEEN USER EQUIPMENT (UE) AND BASE STATION (BS)

CROSS-REFERENCE TO RELATED APPLICATIONS

This patent application claims priority to U.S. Provisional patent Application No. 62/965,044 entitled "MOVEMENT DIRECTION BASED COMMUNICATIONS BETWEEN USER EQUIPMENT (UE) AND BASE STATION (BS)" and filed on Jan. 23, 2020, which is assigned to the assignee hereof and incorporated by reference in this patent application.

TECHNICAL FIELD

The present disclosure relates generally to communication systems, and more particularly, to communication between a user equipment (UE) and a base station (BS) based on a movement direction of the UE with reference to the BS.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a device for wireless communication. The example wireless communication device includes a processing system and an interface. The processing system is configured to generate an indication of a first doppler shift associated with the wireless communication device moving with reference to a first target base station (BS). The processing system also is configured to cause the wireless communication device to synchronize with the first target BS during conditional handover (CHO) after a first trigger is met, where the first trigger is associated with the first doppler shift. The interface is configured to obtain, from the serving BS, a handover command for CHO, where the handover command includes a first trigger for handover to the first target BS.

Another innovative aspect of the subject matter described in this disclosure can be implemented as a method for wireless communication by a wireless communication device. The example method includes generating an indication of a first doppler shift associated with the wireless communication device moving with reference to a first target BS. The method also includes obtaining, from the serving BS, a handover command for CHO, where the handover command includes a first trigger for handover to the first target BS. The method further includes synchronizing with the first target BS during CHO after the first trigger is met, where the first trigger is associated with the first doppler shift.

Another innovative aspect of the subject matter described in this disclosure can be implemented as another device for wireless communication. The example device includes a processing system and an interface. The processing system is configured to generate a handover command for CHO, where the handover command includes a first trigger for handover of a UE to a first target BS. The interface is configured to provide the handover command to the UE. The UE is to synchronize with the first target BS during CHO after the first trigger is met, the first trigger is associated with a first doppler shift, and the first doppler shift is associated with the wireless communication device moving with reference to the first target BS.

Another innovative aspect of the subject matter described in this disclosure can be implemented as another method for wireless communication by a wireless communication device. The method includes generating a handover command for CHO, where the handover command includes a first trigger for handover of a UE to a first target BS. The method also includes providing the handover command to the UE. The UE is to synchronize with the first target BS during CHO after the first trigger is met, the first trigger is associated with a first doppler shift, and the first doppler shift is associated with the wireless communication device moving with reference to the first target BS.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6A shows an example of a first slot within a 5G/NR frame structure.

FIG. 6B shows an example of downlink (DL) channels within a 5G/NR slot.

FIG. 6C shows an example of a second slot within a 5G/NR frame structure.

FIG. 6D shows an example of uplink (UL) channels within a 5G/NR slot.

FIG. 8A shows a diagram illustrating an example UE on a high speed train causing a doppler shift for wireless communications between a BS and the UE.

Like reference numbers and designations in the various drawings indicate like elements.

DETAILED DESCRIPTION

Figure 1:
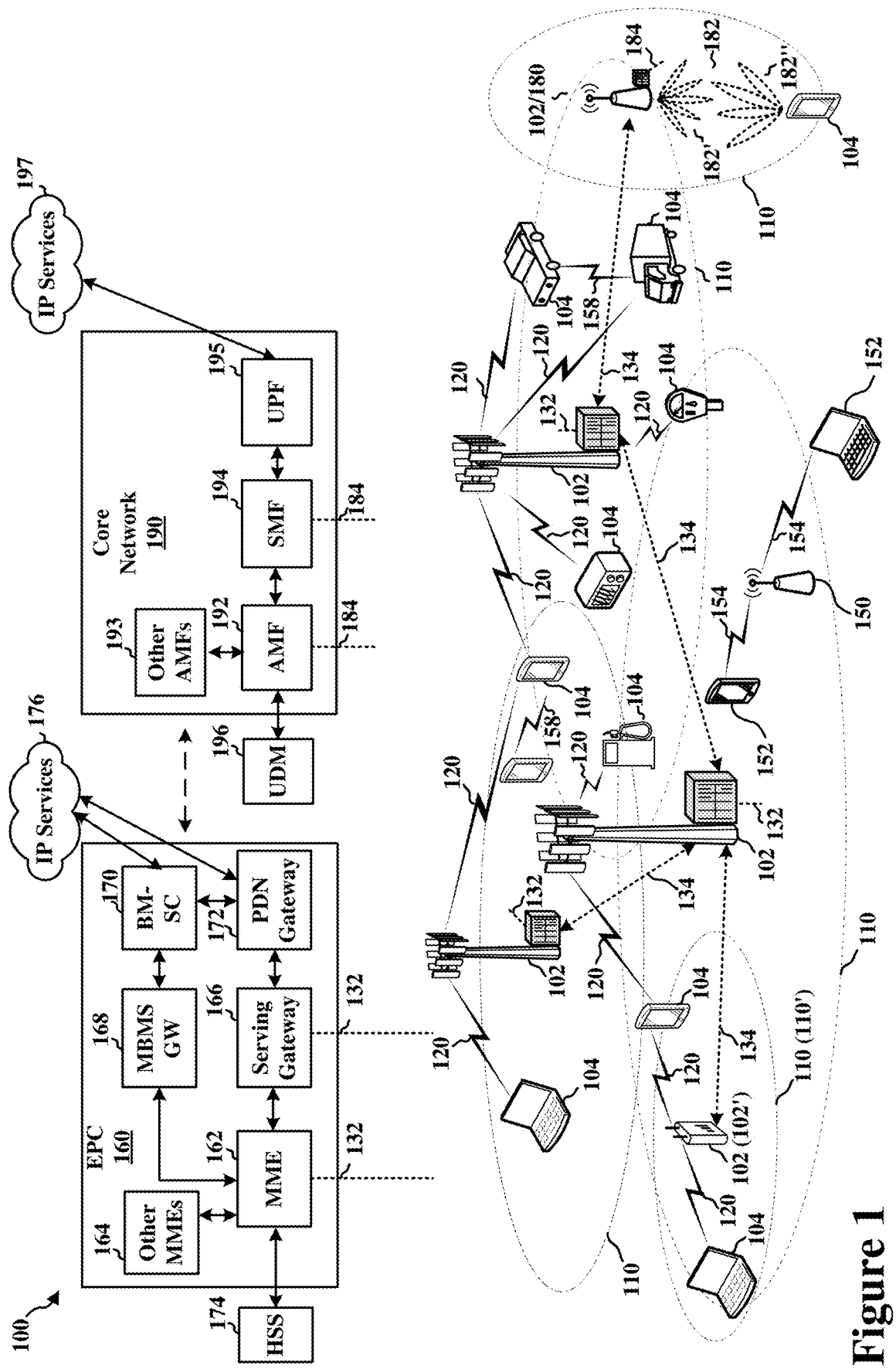
FIG. 1 shows a diagram illustrating an example of a wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Implementations of the subject matter described in this disclosure may allow UEs to determine a movement direction of the UE with reference to a BS. In some implementations, the BS is a target BS for handover or cell selection/reselection. In some other implementations, the BS is a BS serving the UE. One or more communications between the UE and the cellular network including the BS may be affected by or based on the determined movement direction. For example, the movement direction may be used to adjust cell reselection, adjust one or more random access channel parameters for communication by the user equipment to the base station (such as determining when a UE is allowed to access the random access channel (RACH) for uplink communications with the BS), adjust one or more communication link parameters for measurement or for reporting to the base station (such as when to report a signal strength to interference plus noise ratio (SINR) measured by the UE to the BS), or adjust performing conditional handover (CHO).

In particular, a UE may synchronize with a target BS during CHO based on a doppler shift between the UE and the target BS. For example, the UE may obtain a handover command (such as a radio resource control (RRC) reconfiguration message) from a BS currently serving the UE. The handover command includes a trigger that, when met, may indicate that the UE is to synchronize with the target BS. The UE may adjust the trigger based on the doppler shift, or the UE may provide an indication of the doppler shift to the serving BS so that the serving BS adjusts the trigger before providing the trigger in the handover command. Example adjustments to the trigger include adjusting the priority of target BSs with which to synchronize, increasing or decreasing a threshold (such as a received signal strength indication (RSSI) or other link quality indicator), or preventing the UE from synchronizing with a specific target BS. In this manner, when and whether to provide handover communications from the serving BS to the target BS is based on the doppler shift. For example, if the target BS services UEs on a high speed train, the target BS may be associated with a range of doppler shifts associated with the UE moving at a high speed with reference to the target BS (such as greater than approximately 120 kilometers per hour (kph) or any other suitable range). In this manner, if the doppler shift is outside of the range, the UE may be prevented from synchronizing with the target BS or the target BS may be given a lower priority for synchronization from a plurality of target BSs. If the doppler shift is in the range, the UE may prioritize synchronizing with the target BS over other target BSs.

In a simplified example, if the target BS emits a reference signal (that is received by the UE) at a frequency of 1850 megahertz (MHz), a range of doppler shifts is associated with whether the UE is moving faster than 120 kph, and the UE is moving directly towards the target BS, the lower threshold of the range of doppler shifts is a doppler shift of the 1850 MHz signal as received by the UE that is associated with 120 kph. With the speed of radio signals assumed to be the speed of light, a doppler shift threshold associated with 120 kph is approximately 180 MHz. In this manner, a frequency of the 1850 MHz signal as received by the UE travelling at 120 kph towards a stationary BS is approximately 2030 MHz (1850 MHz+180 MHz). An example range of doppler shifts includes doppler shifts greater than 180 MHz. If the frequency of the received signal is greater than 2030 MHz, the UE is travelling faster than 120 kph. In this manner, when the doppler shift is greater than 180 MHz, the doppler shift is determined to be in the range of doppler shifts. An upper threshold also may be determined for a range of doppler shifts (such as a maximum speed for the range of doppler shifts being associated with 200 kph or another suitable speed).

Particular implementations of the subject matter described in this disclosure can be implemented to realize one or more of the following potential advantages. In some instances, the number of cell reselections may be reduced. Additionally, BS selection for handover may be improved so that a BS that provides better link quality or will have a longer amount of time serving the UE is selected instead of another BS. Furthermore, access to a RACH by multiple UEs may be in a fairer manner than current RACH access techniques. Additionally, the UE determination of when to request a cell reselection may be improved to prevent unnecessary cell reselections. Finally, when to perform a handover may be improved to prevent unnecessary handovers. For example, whether and when to synchronize with a target BS during CHO being based on a doppler shift between the UE and the target BS may allow for being serviced by an appropriate BS (such as a BS servicing UEs on a high speed train) to reduce the number of handovers that occur. Whether and when to synchronize also may improve future link quality between the BS and the UE (such as by ensuring the UE is moving towards a target BS instead of away from the BS before handover, which may affect signal strength, a signal to interference ratio, and so on).

The provided examples illustrate some of the advantages of a UE determining a movement direction or speed (such as determining a doppler shift). The 3GPP has defined a basic classification of a UE's speed. The speed classification is in general without reference to other components in a cellular network. For example, Technical Specification 36.304 from the 3GPP defines that a speed of a UE may be classified in one of three ranges of speed: a predefined range of "normal" (such as at a speed of a person walking or riding a bicycle), "medium" (such as at a speed of a moving car) or "high" (such as at a speed of a high speed train) based on a number of cell reselections in a defined period of time. Each cell/base station covers a portion of a network coverage area. In some instances, as a result of the UE moving through the network coverage area, the UE switches from being serviced by a base station (BS) to being serviced by another BS via cell reselection. Differentiating between a UE moving at a "normal" speed or moving at a "medium" speed may be based on a first threshold number of cell reselections by the UE, and differentiating between the UE moving at a "medium" speed or moving at a "high" speed may be based on a second threshold number of cell reselections by the UE (with the second threshold being greater than the first threshold). Some cell reselection parameters (such as a reselection hysteresis ($Q_{Hyst}$) or a reselection timer ($T_{Reselection}$)) may be adjusted or configured based on a classified range of the UE's speed.

However, UEs are not configured to determine a movement direction and speed of the UE with reference to a base station. As a result, the UE and the cellular network do not account for a movement direction and speed of the UE (with reference to a BS). For example, while a UE's speed may be determined as "high" based on a number of cell reselections, the UE is not configured to determine the direction and speed of the UE's movement with reference to a target BS for cell reselection. In this manner, the UE does not account for whether the UE is moving toward or away from the target BS or how fast the UE moves towards or away from the target BS in performing cell reselection (with the target BS to service the UE after cell reselection). However, whether and how fast the UE is moving toward or away from a BS may affect communications between the cellular network and the UE. For example, a user may prefer that a cell reselection by the UE is to a BS toward which the UE is moving to reduce the number of cell reselections. In another example, the user may prefer that a BS selected by the network for communication handover is a BS toward which the UE is moving. Configuring a UE to determine its movement direction with reference to a BS and using the movement direction for aspects of cellular communications may improve operation of the network and the UE (including improved cell reselection, RACH access, measurement reporting, and conditional handover).

In the scenario of CHO, the movement direction and speed of the UE with reference to each target BS for handover may be useful in determining with which target BS to synchronize during CHO execution. For example, a user may prefer for the UE to be serviced by a BS moving towards the UE instead of a BS moving away from the UE to reduce the number of handovers. In another example, some BSs may be configured to service UEs on a high speed train network (such as including repeaters to reduce the number of handovers while the UE travels along the network). A doppler shift may indicate whether the UE is moving at a high speed with reference to a BS (such as greater than a speed threshold), and target BSs configured for the high speed train network may be prioritized over other target BSs for handover. For example, a target BS may be associated with a range of doppler shifts, and the priority of the target BS for handover may be adjusted based on whether the doppler shift of the UE is in or outside the range. In this manner, the number of handovers may be reduced or the servicing of the UE may otherwise be improved by use of doppler shifts for CHO.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram illustrating an example of a wireless communications system and an access network 100. The wireless communications system (also referred to as a wireless wide area network (WWAN)) includes base stations/BSs 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. Some base stations 102 also may be configured for other cellular communications (such as 3G, LTE, and so on). In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, or delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, and so on) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smartphone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, and so on). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 may be configured to identify a movement direction and speed of the UE 104 with reference to a base station 102 (such as gNB 180) that may serve the UE 104 in the coverage area 110. The identified movement direction or speed is used by the UE 104 or a serving base station to configure or adjust communications between the UE 104 and one or more base stations 102. FIGS. 2-5B illustrate flowcharts 200-500 of example operations for configuring or adjusting communications between the UE 104 and one or more base stations 102.

Figure 2:
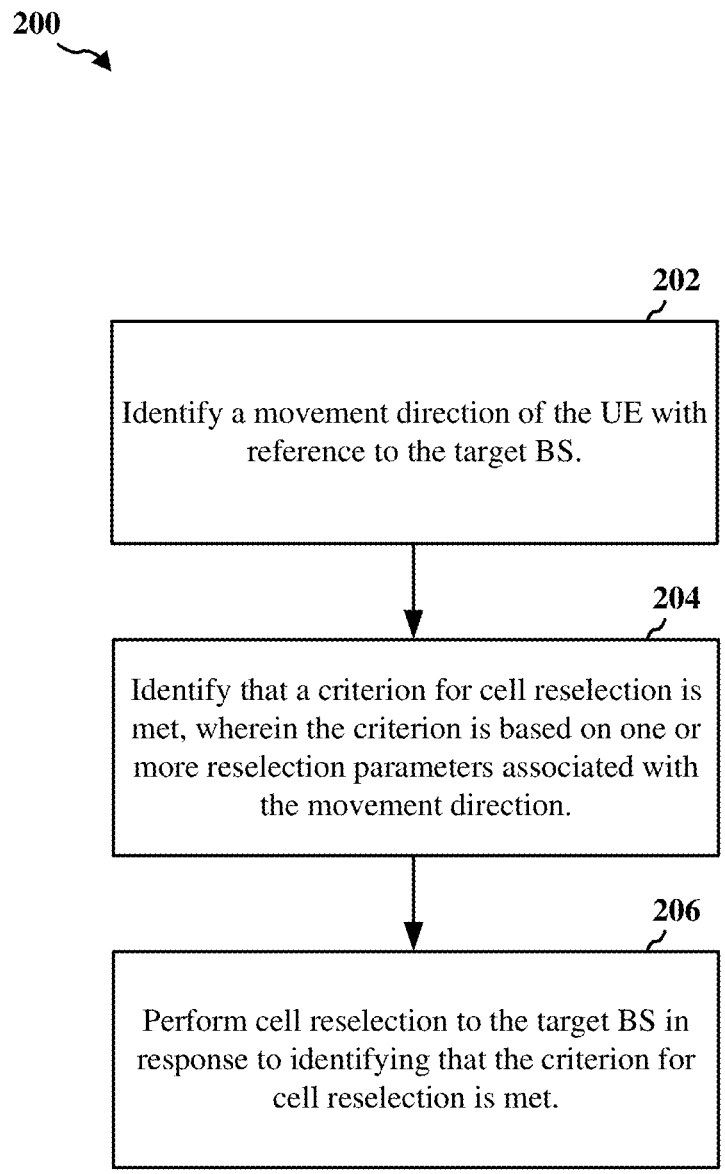
FIG. 2 shows a flowchart of an example method of wireless communication.

FIG. 2 shows a flowchart 200 of an example method of wireless communication. The method in FIG. 2 is regarding cell reselection by a UE to a target BS to serve the UE. The method may be performed by a UE (such as the UE 104 in FIG. 1). At 202, the UE 104 identifies a movement direction of the UE 104 with reference to a target BS 102 that is a candidate to serve the UE 104. For example, the UE 104 may use one or more device sensors (such as an accelerometer, magnetometer, global positioning system (GPS) sensor, and so on) to determine a movement direction based on a known location of the target BS 102. In another example, the UE 104 may measure a doppler effect of one or more signals from the target BS 102 to determine a movement direction of the UE 104 with reference to the BS 102. As used herein, a doppler effect also may be referred to as a doppler shift, a doppler, or a doppler measurement.

At 204, the UE 104 may identify that a criterion for cell reselection is met, and the criterion is based on one or more reselection parameters associated with the movement direction. In some implementations, a criterion to cause a cell reselection by the UE may be associated with a signal strength (such as a received signal strength indicator (RSSI)), a signal to interference plus noise ratio (SINR), a signal to noise ratio (SNR), or other suitable indicators for a signal measured by the UE 104 from the target BS. For example, an SINR of a signal from the target BS may be measured to be a threshold amount greater than an SINR of a signal from the serving BS, and the threshold may be based on whether the UE 104 is moving away from or toward the target BS. If the UE 104 is moving toward the target BS, the threshold may be lowered. If the UE 104 is moving away from the target BS, the threshold may be raised (or the target BS may be prevented from being a candidate for cell reselection). The SINRs (or other suitable measurements) may be based on one or more reference signals from a BS to the UE 104.

At 206, the UE 104 may perform cell reselection to the target BS in response to identifying that the criterion for cell reselection is met. For example, if the difference between SINRs associated with the serving BS and the target BS is greater than the adjusted threshold, the UE 104 may determine to perform cell reselection to the target BS.

In this manner, the UE 104 may bias against cell reselection to a target BS away from which the UE 104 is moving. The UE 104 also may bias toward cell reselection to a target BS toward which the UE 104 is moving. In addition, or alternative to cell reselection, a UE's movement direction with reference to a BS 102 also may be used for configuring or adjusting access to or use of a random access channel (RACH) by the UE 104 for uplink communications with the BS 102 (such as illustrated in the flowchart 300 in FIG. 3).

While not shown, a doppler shift may be used in selecting a target BS during cell reselection. As noted above, the doppler shift may indicate a direction of movement of the UE with reference to the target BS. The doppler shift also may indicate a speed of the UE with reference to the BS. For example, whether a doppler shift is positive or negative indicates whether the UE is moving towards or away from the BS. The magnitude of the doppler shift indicates a magnitude of the speed of the UE with reference to the BS. In this manner, a BS may be associated with a positive range of doppler shifts for cell reselection. The UE may determine a measured doppler shift to be in the range and select the BS for service based on the doppler shift being in the range. For example, a first target BS associated with a high speed train network (or otherwise to service UEs moving at greater than a threshold speed) may be associated with a higher range of doppler shifts than a second target BS not associated with the high speed train network. In this manner, a measured doppler shift may be used by the UE to determine whether to select the first target BS or the second target BS during cell reselection.

Figure 3:
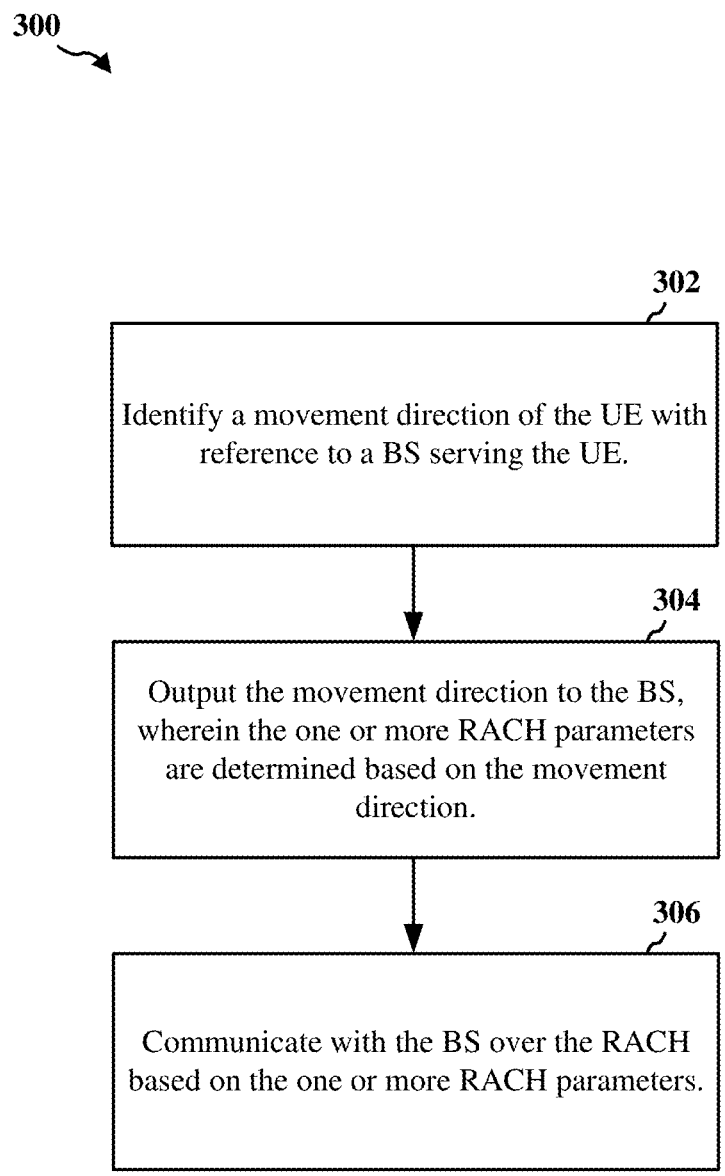
FIG. 3 shows a flowchart of another example method of wireless communication.

FIG. 3 shows a flowchart 300 of another example method of wireless communication. The method may be performed by a UE (such as the UE 104 in FIG. 1). At 302, the UE 104 identifies a movement direction of the UE 104 with reference to the BS 102 serving the UE 104. For example, the UE 104 may use one or more device sensors (such as an accelerometer, magnetometer, global positioning system (GPS) sensor, and so on) to determine a movement direction based on a known location of the BS 102. In another example, the UE 104 may measure a doppler effect of one or more signals from the BS 102 to determine a movement direction of the UE 104 with reference to the BS 102.

At 304, the UE 104 may output the movement direction to the BS 102, and the one or more RACH parameters may be determined based on the movement direction. In some implementations, the BS 102 may determine the one or more RACH parameters. For example, the serving BS 102 may adjust or configure, based on the movement direction:

- a physical RACH (PRACH) for uplink communication (such as selecting a specific frequency range or channel);
- one or more PRACH parameters (such as configuring a PRACH configuration index or a PRACH frequency offset);
- one or more radio resource control (RRC) parameters (such as configuring a packet preamble size from the UE 104, a preamble power ramping step to increase the transmit power of the UE 104, a target (BS) received power of the preamble, a maximum transmission power of the preamble, a power offset between the preamble and a payload of the packet, a contention resolution timer size for backoff when multiple UEs contend for the RACH, or a response window size for the BS to respond to the request from the UE);
- a preamble format from the UE requesting access to the RACH from the BS 102 (such as including a field to indicate a movement direction or a movement vector (including the direction and magnitude of movement) of the UE 104 with reference to the BS 102);
- the payload length associated of the packet including the preamble (such as shortening the payload length when the UE 104 is moving toward the BS 102 instead of away from the BS 102).
- an access priority of the UE 104 to the RACH (such as increasing a UE's priority when the UE 104 is moving toward the BS 102 instead of moving away from the BS 102); or
- one or more access barring parameters for preventing the UE 104 from accessing the RACH (such as adjusting an amount of time the BS 102 bars/prevents the UE 104 either from contending for the RACH or from accessing the RACH based on a movement direction or movement vector of the UE 104).

At 306, the UE 104 may communicate with the BS 102 over the RACH based on the one or more RACH parameters. For example, the BS 102 may configure the RACH and means for accessing the RACH based on the one or more RACH parameters, and the BS 102 may output information regarding the RACH to the UE 104 in a system information communication (such as one or more system information blocks (SIBs)). The UE 104 may use the received system information to configure when and how to access the RACH for uplink transmissions to the BS 102. The information also may be received in a dedicated radio resource control (RRC) message from the BS 102 to the UE 104.

Similar to as described above with reference to cell reselection, a doppler shift may be used in determining one or more RACH parameters. For example, one or more RACH parameters may be associated with a range of doppler shifts associated with a movement direction and speed. A UE may measure a doppler shift and indicate the doppler shift to a BS. One or more RACH parameters may be adjusted based on whether the doppler shift is in a range of doppler shifts associated with one or more RACH parameters.

Figure 4:
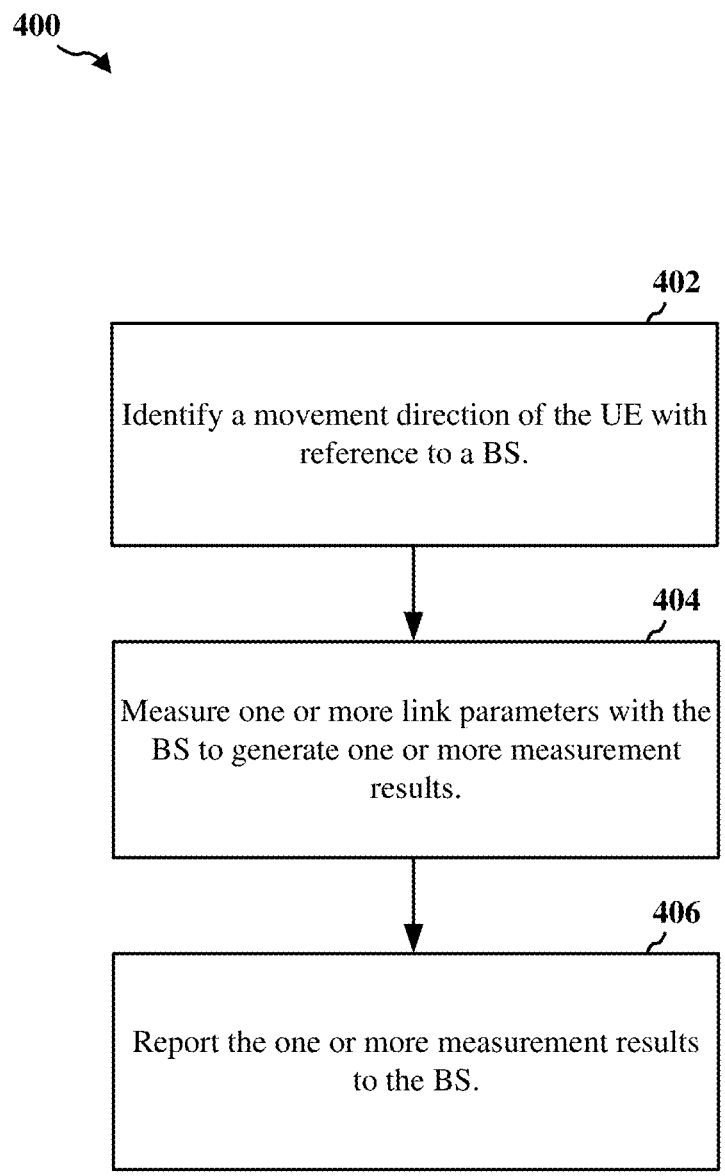
FIG. 4 shows a flowchart of another example method of wireless communication.

FIG. 4 shows a flowchart 400 of another example method of wireless communication. The method in FIG. 4 is regarding measurement of link parameters between a UE and one or more BSs. In some implementations, the link parameters may be used by the network to adjust a link between the UE and the serving BS or to perform a handover (such as a handover between channels or a handover between BSs to serve the UE). The method may be performed by a UE (such as the UE 104 in FIG. 1). At 402, the UE 104 identifies a movement direction of the UE 104 with reference to the BS 102. For example, the UE 104 may use one or more device sensors (such as an accelerometer, magnetometer, global positioning system (GPS) sensor, and so on) to determine a movement direction based on a known location of the BS 102. In another example, the UE 104 may measure a doppler effect of one or more signals from the BS 102 to determine a movement direction of the UE 104 with reference to the BS 102.

At 404, the UE 104 measures one or more link parameters with the BS to generate one or more measurement results. For example, the UE 104 may measure a reference signal receive power (RSRP), a reference signal receive quality (RSRQ), an SINR of the reference signal, an SNR of the reference signal, or a channel state information for the reference signal (CSI-RS) from the BS 102. In some implementations, the UE 104 measures an RSRP, RSRQ, SINR, SNR, or CSI-RS for a reference signal from a target BS (or multiple target BSs) and a serving BS that currently services the UE 104, and the measurements are used to generate the measurement results. At 406, the UE 104 may report the one or more measurement results to the serving BS 102.

Reporting the one or more measurement results to the BS 102 may cause the BS 102 to determine that the network is to perform a handover (such as a handover from the BS 102 to a target BS or a handover between channels used for the UE 104). For example, the BS 102 may use the measurement results to determine whether one or more trigger events for a communication handover are met (with the BS 102 initiating the communication handover when a trigger event is met). Example parameters of one or more trigger events may include:

- a difference between RSRPs, RSRQs, SINRs, SNRs, or CSIs-RS of a serving BS and a target BS being greater than a threshold;
- a difference between a measured RSRP, RSRQ, SINR, SNR, or CSI-RS and an expected RSRP, RSRQ, SINR, SNR, or CSI-RS of a BS being outside a hysteresis; or
- a time to trigger (TTT) indicating a window of time for which one or more measurement results are outside an offset during the entire window (such as a difference between an RSRP of the serving BS and an RSRP of the target BS being greater than a threshold for the entire window).

In some implementations, the UE 104 may adjust measuring one or more link parameters or reporting one or more measurement results based on the movement direction of the UE 104. For example, if the UE 104 is moving toward a target BS, a frequency of measuring the link parameters may be increased or a frequency of reporting measurement results may be increased (since the network may determine to handover from the BS 102 serving the UE 104 to the target BS).

The movement direction of the UE 104 also may influence a communication handover. For example, a trigger event for a network to initiate a communication handover may be based on one or more of a TTT, a hysteresis, an offset, or a threshold. If the movement direction of the UE 104 is toward a target BS, a TTT may be reduced, a hysteresis or offset threshold may be reduced, or a threshold difference between link parameters for a serving BS and a target BS may be reduced for a network to determine when to handover from the serving BS to the target BS. In some implementations, multiple target BSs may exist as candidates for handover. The network 100 may be configured to perform a conditional handover (CHO) during which multiple target BSs are considered by the network as candidates for a communication handover. For example, multiple BSs may have overlapping coverage areas 110. When the UE 104 is in the overlapping portion of the coverage areas 110, the UE 104 may be served by any of the multiple BSs. The BS 102 may be configured to indicate to the UE 104 which of the multiple BSs may serve the UE 104. The BS 102 also may be configured to provide indications of trigger events to cause the UE 104 to synchronize with a target BS.

Operations for CHO, such as a CHO preparation phase during which the serving BS prepares target BSs for possible handover and a CHO execution phase during which a UE synchronizes with one of the prepared target BSs to complete handover, may be referred to as CHO operations herein. Example CHO operations may include providing one or more measurement reports by the UE to the serving BS during CHO preparation, selecting, by the serving BS, one or more target BSs as candidates for handover and sending handover requests to the target BSs to prepare the BSs, providing a handover command by the serving BS to the UE (with the handover command including a cell list of target BSs that are candidates for handover, a priority of the target BSs in the cell list for handover, and a trigger event for each target BS to cause the UE to synchronize with the target BS), determining by the UE whether one or more trigger events are met, synchronizing the UE with a target BS based on a trigger event being met, determining one or more RACH parameters between the UE and the target BS to complete handover, and providing any acknowledgements (ACKs) between the UE and a BS or between BSs during CHO preparation or CHO execution.

Figure 5A:
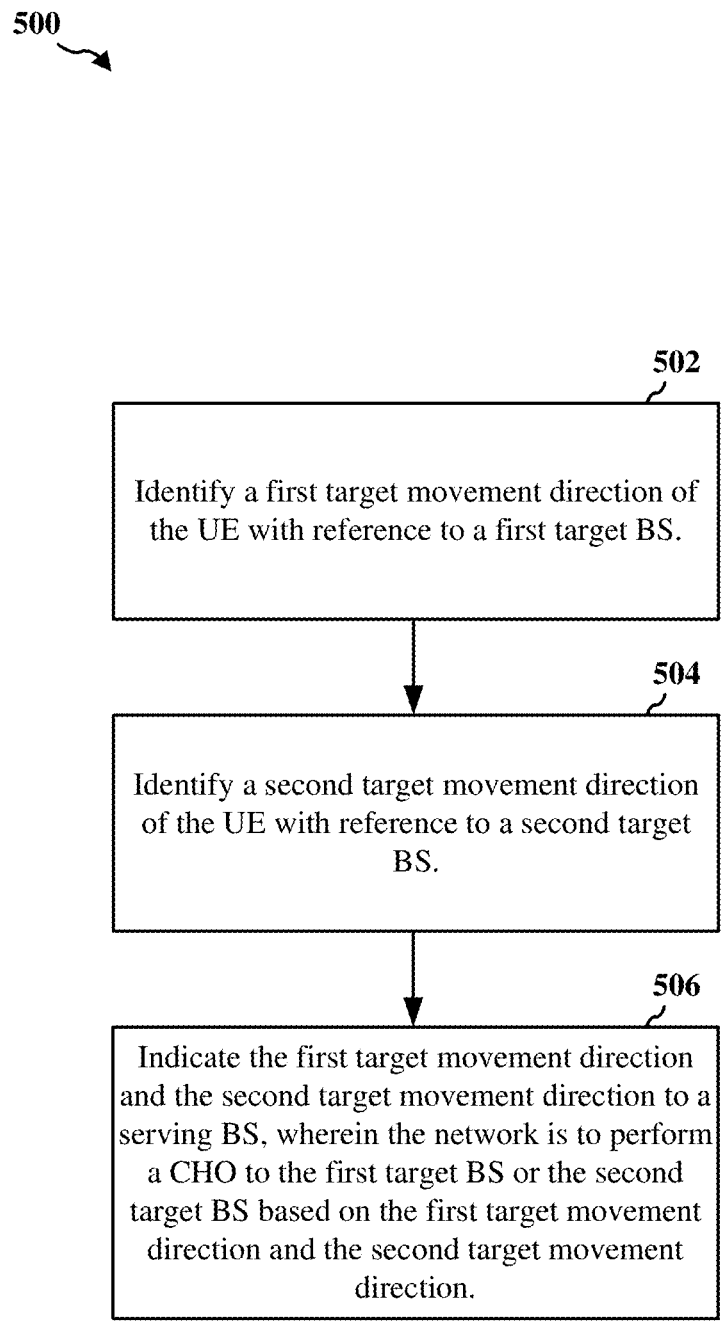
FIG. 5A shows a flowchart of another example method of wireless communication.

FIG. 5A shows a flowchart 500 of another example method of wireless communication. The method in FIG. 5A is regarding CHO from the UE's perspective. The method may be performed by a UE (such as the UE 104 in FIG. 1) for a CHO performed by the network and associated with a first target BS and a second target BS (which may be candidate BSs for a CHO). At 502, the UE 104 identifies a first target movement direction of the UE 104 with reference to a first target BS. For example, the UE 104 may use one or more device sensors (such as an accelerometer, magnetometer, global positioning system (GPS) sensor, and so on) to determine the movement direction based on a known location of the first target BS. In another example, the UE 104 may measure a doppler effect of one or more signals from the first target BS to determine a movement direction of the UE 104 with reference to the BS. At 504, the UE 104 identifies a second target movement direction of the UE 104 with reference to a second target BS. The UE 104 indicates the first target movement direction and the second target movement direction to a serving BS 102 (506). The network including the serving BS, the first target BS, and the second target BS may perform a CHO to the first target BS or the second target BS based on the first target movement direction and the second target movement direction. For example, if the first target movement direction is toward the first target BS and the second target movement direction is away from the second target BS, the network may bias toward a communication handover from the serving BS to the first target BS. In some implementations, the UE 104 also may determine a UE movement direction with reference to the serving BS, and the CHO also may be based on the movement direction (such as whether or not the network is to request or perform a communication handover).

A network performing a CHO may refer to one or more CHO operations. In some implementations, a serving BS 102 performs some operations for a communication handover to one or more candidate BSs. For example, a serving BS 102 may select one or more target BSs as candidates for a communication handover. The serving BS 102 also may prioritize the target BSs for a possible communication handover. The serving BS 102 further may indicate to the UE 104 the selected target BSs, the priority of the BSs, and one or more trigger events to cause the UE to synchronize with a target BS. The serving BS 102 also may indicate for which BSs the UE 104 is to generate and report measurement results. As noted above, one or more trigger events may be adjusted based on a UE movement direction with reference to one or more target BSs. In addition, or to the alternative, a serving BS may be configured to adjust a priority of a candidate BS with reference to the priority of another candidate BS for CHO, and the adjustment may be based on a UE movement direction with reference to one or more target BSs. In another example, a serving BS may exclude a target BS as a candidate BS based on a UE movement direction with reference to one or more target BSs (including the target BS to be excluded). For example, a trigger event may be adjusted, the priority of candidate BSs may be adjusted, or a target BS may be excluded as a candidate BS for handover based on a doppler shift between the UE and the serving BS. Example operations for adjusting one or more CHO operations based on a doppler shift are described in more detail below with reference to FIGS. 12-14.

Figure 5B:
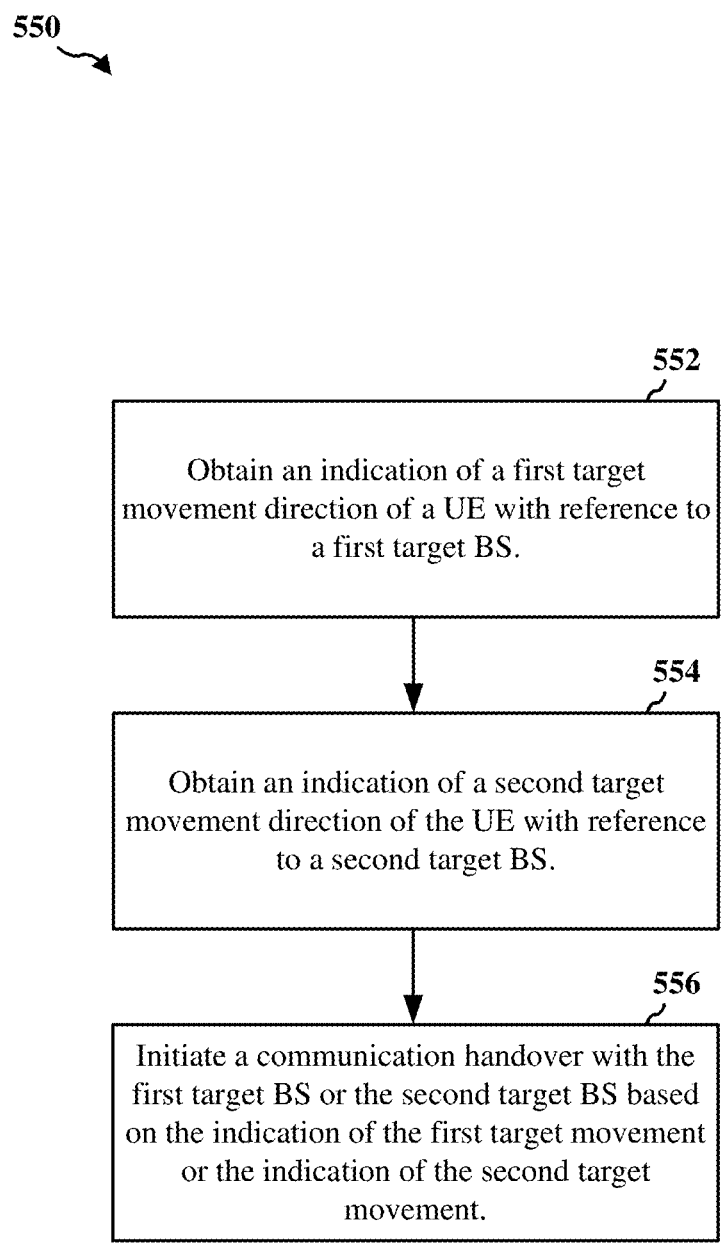
FIG. 5B shows a flowchart of another example method of wireless communication.

FIG. 5B shows a flowchart 550 of another example method of wireless communication. The method in FIG. 5B is regarding CHO from the serving BS's perspective. The method may be performed by a BS (such as the BS 102 in FIG. 1) for a CHO associated with a first target BS and a second target BS (which may be candidate BSs for the CHO). At 552, the BS 102 obtains an indication of a first target movement direction of a UE 104 with reference to a first target BS. In some implementations, the UE 104 may communicate, to the BS 102, the first target movement direction of the UE 104. The BS 102 may determine if one or more trigger events associated with the first target BS are to be adjusted based on the indicated movement direction. For example, the BS 102 may determine if one or more link parameters (such as TTT, hysteresis or offset thresholds, and so on) associated with trigger events handover to the first target BS are to be adjusted based on the first target movement direction. In some other implementations, the UE 104 may adjust providing one or more measurement results based on the first target movement direction, and the adjustment may indicate a first target movement direction. For example, if a frequency of reporting a measurement result for the first target BS is increased, the BS 102 may determine that the UE movement direction is toward the first target BS. At 554, the BS 102 also obtains an indication of a second target movement direction of a UE 104 with reference to a second target BS. The indication of the second target movement direction may be similar to the first target movement direction described herein.

At 556, the BS 102 may initiate a communication handover with the first target BS or the second target BS based on the indication of the first target movement or the indication of the second target movement. For example, the BS 102 may prepare a first target BS for CHO (such as by providing a handover request to prepare the target BS for possible handover). In another example, the BS 102 may increase a priority for handover of the first target BS over a priority of second target BS based on the first target movement direction and the second target movement direction. The BS 102 also may provide one or more adjusted trigger events to the UE 104. While the operations in FIG. 5 are described as being performed by a BS, some operations may be performed by one or more other components of the network (such as one or more components of the core network 190) or by the UE 104. As noted above, one or more CHO operations may be adjusted based on a doppler shift between the UE 104 and a target BS. Example operations for adjusting one or more CHO operations based on a doppler shift are described in more detail below with reference to FIGS. 12-14.

Each of the example methods illustrated in flowcharts 200-500 and 550 are described in more detail herein. However, the described methods are only some of the examples of configured cellular communications based on a movement direction of the UE 104 (with reference to one or more BSs 102). The disclosure is not to be limited to any specific method or example, except as provided in the claims.

While the cellular communications may be any suitable cellular communication technology (such as 2G, 3G, LTE, and so on), in some implementations, the cellular communications may be based on 5G/NR. Additionally, while some aspects of the disclosure are described as performed by a UE 104, the aspects of the disclosure may be performed by a BS 102 or other components of the network 100. Furthermore, while some aspects of the disclosure are described as performed by a BS 102 or the network 100, aspects of the disclosure may be performed by a UE 104.

FIG. 6A shows an example of a first slot 600 within a 5G/NR frame structure. FIG. 6B shows an example of DL channels 630 within a 5G/NR slot. FIG. 6C shows an example of a second slot 650 within a 5G/NR frame structure. FIG. 6D shows an example of UL channels 680 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 6A and 6C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame (10 ms) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols per slot and $2\mu$ slots per subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz, and the numerology $\mu=5$ has a subcarrier spacing of 480 kHz. The symbol length/duration is inversely related to the subcarrier spacing. FIGS. 6A-6D provide an example of slot configuration 0 with 14 symbols per slot and numerology $\mu=0$ with 1 slot per subframe. The subcarrier spacing is 15 kHz and symbol duration is approximately 66.7 microseconds (p).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 6A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 6B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 6C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 6D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 7:
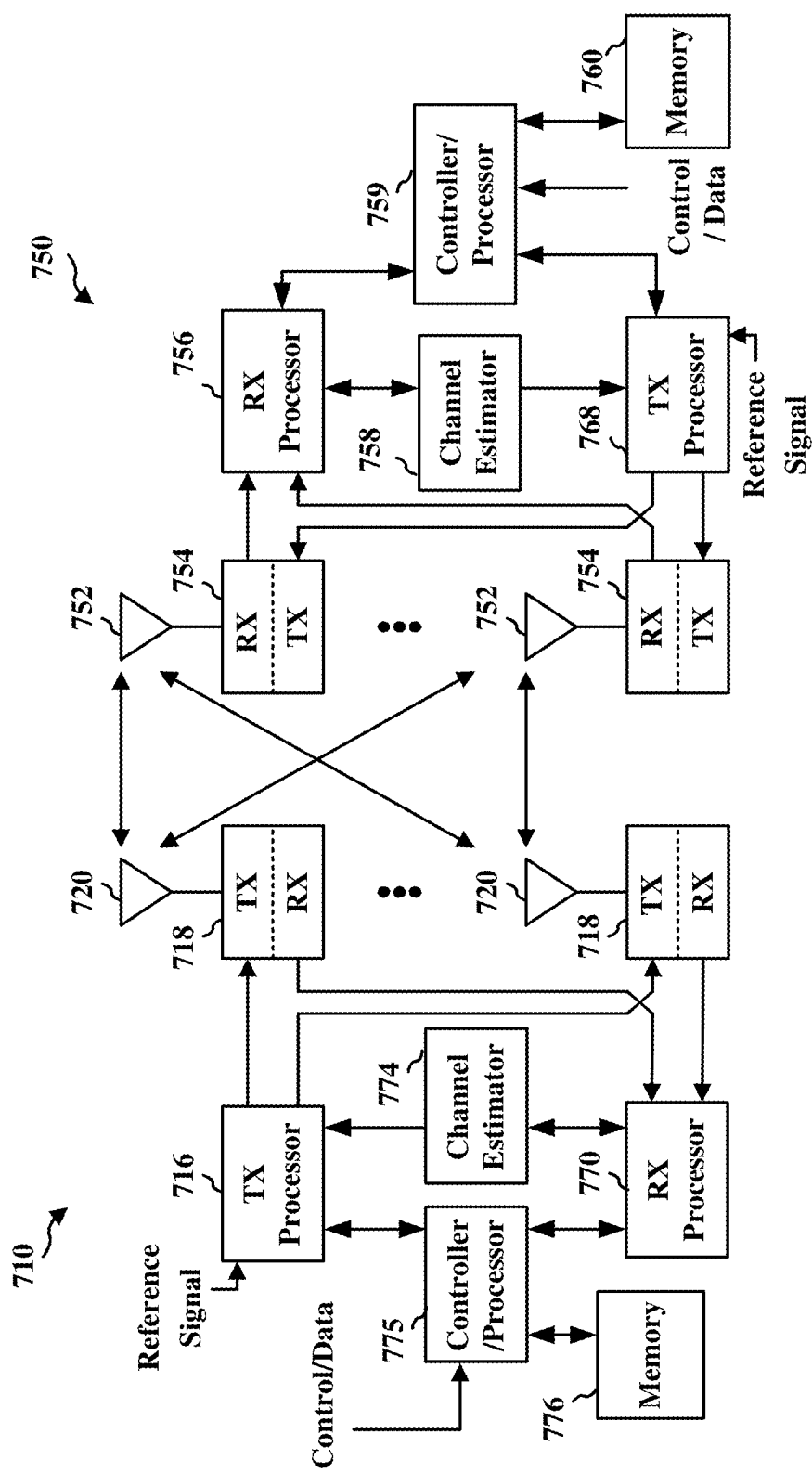
FIG. 7 shows a block diagram of an example base station (BS) and user equipment (UE) in an access network.

FIG. 7 shows a block diagram of an example base station 710 and UE 750 in an access network. In the DL, IP packets from the EPC 160 may be provided to a controller/processor 775. The controller/processor 775 implements layer 7 and layer 2 functionality. Layer 7 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 775 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 716 and the receive (RX) processor 770 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 716 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot signal) in the time or frequency domain, and combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 774 may be used to determine the coding and modulation scheme, as well as for spatial processing. The channel estimate may be derived from a reference signal or channel condition feedback transmitted by the UE 750. Each spatial stream may be provided to a different antenna 720 via a separate transmitter 718TX. Each transmitter 718TX may modulate an RF carrier with a respective spatial stream for transmission.

At the UE 750, each receiver 754RX receives a signal through its respective antenna 752. Each receiver 754RX recovers information modulated onto an RF carrier and provides the information to the receive (RX) processor 756. The TX processor 768 and the RX processor 756 implement layer 1 functionality associated with various signal processing functions. The RX processor 756 may perform spatial processing on the information to recover any spatial streams destined for the UE 750. If multiple spatial streams are destined for the UE 750, they may be combined by the RX processor 756 into a single OFDM symbol stream. The RX processor 756 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 710. These soft decisions may be based on channel estimates computed by the channel estimator 758. The soft decisions are decoded and deinterleaved to recover the data and control signals that were originally transmitted by the base station 710 on the physical channel. The data and control signals are provided to the controller/processor 759, which implements layer 3 and layer 2 functionality.

The controller/processor 759 can be associated with a memory 760 that stores program codes and data. The memory 760 may be referred to as a computer-readable medium. In the UL, the controller/processor 759 provides demultiplexing between transport and logical channels, packet reassembly, deciphering, header decompression, and control signal processing to recover IP packets from the EPC 160. The controller/processor 759 also may be responsible for error detection using an ACK or NACK protocol to support HARQ operations.

Similar to the functionality described in connection with the DL transmission by the base station 710, the controller/processor 759 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 758 from a reference signal or feedback transmitted by the base station 710 may be used by the TX processor 768 to select the appropriate coding and modulation schemes, and to facilitate spatial processing. The spatial streams generated by the TX processor 768 may be provided to different antenna 752 via separate transmitters 754TX. Each transmitter 754TX may modulate an RF carrier with a respective spatial stream for transmission.

The UL transmission is processed at the base station 710 in a manner similar to that described in connection with the receiver function at the UE 750. Each receiver 718RX receives a signal through its respective antenna 720. Each receiver 718RX recovers information modulated onto an RF carrier and provides the information to a RX processor 770.

The controller/processor 775 can be associated with a memory 776 that stores program codes and data. The memory 776 may be referred to as a computer-readable medium. In the UL, the controller/processor 775 provides demultiplexing between transport and logical channels, packet reassembly, deciphering, header decompression, control signal processing to recover IP packets from the UE 750. IP packets from the controller/processor 775 may be provided to the EPC 160. The controller/processor 775 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 7, each antenna 752 of the UE 750 is coupled to a respective transmitter 754TX. However, in actual implementations, many UEs have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

As noted herein, a UE (such as UE 750) and the network (including BS 710) may be configured to use a movement direction of the UE with reference to a BS to configure communications between the UE and the BS (such as illustrated in FIGS. 2-5B). Each of the example methods illustrated in flowcharts 200-500 and 550 are described in more detail herein.

As used herein, an interface of a BS may refer to one or more transceivers 718. The interface also may include one or more antennas 720. A processing system of the BS may include one or more of the TX processor 716, the RX processor 770, the processor 775, the memory 776 or one or more additional components of the BS 710. An interface of a UE may refer to one or more transceivers 754. The interface also may include one or more antennas 752. A processing system of the UE may include one or more of the TX processor 768, the RX processor 756, the processor 759, the memory 760 or one or more additional components of the UE 750. And interface and a processing system also is described below with reference to FIGS. 10 and 11.

Cell Reselection

In some aspects, the movement direction of a UE (and optionally the magnitude of the movement) may be used by the UE for cell reselection operations. For example, a UE 750 may measure a UE movement direction (and, optionally, a magnitude of the movement) with reference to the BS 710. For cell reselection, BS 710 may be a target BS that is a potential candidate for cell reselection. As used herein, a movement vector includes a movement direction and a movement magnitude. In some implementations, the movement magnitude may be a speed of the UE's movement without reference to the BS 710 (which may be measured by an accelerometer, GPS, or other suitable sensor, may be measured based on a doppler effect of signals from the BS 710, or may be approximated based on a number of cell reselections during a period of time). In some other implementations, the movement magnitude may be a speed of the UE's movement with reference to the BS 710. For example, if the UE 750 is moving at 50 kilometers per hour (kph), but the UE 750 is positioned and moving such that it is effectively moving 30 kph away from the BS 710, the movement magnitude without reference to the BS 710 is 50 kph, and the movement magnitude with reference to the BS 710 is 30 kph.

In some implementations, the UE movement direction may be identified as one of toward the BS 710, away from the BS 710, or equidistant from the BS 710. If the movement magnitude is with reference to the BS 710 and the UE movement direction is with reference to the BS 710, the movement direction being equidistant from the BS 710 means the movement magnitude is 0. In some implementations, magnitudes of UE movement with reference to the BS 710 may be organized into ranges (or the movement vectors may be organized into ranges). For example, a UE movement may be classified as one of a speed greater than 100 kph away from the BS 710, between 100 kph and 40 kph away from the BS 710, between 40 kph and 10 kph away from the BS 710, between 10 kph away from and 10 kph toward the BS 710, between 10 kph toward and 40 kph toward the BS 710, between 40 kph toward and 100 kph toward the BS 710, and greater than 100 kph toward the BS 710. Any other example ranges may be used, and the above example ranges are for illustrative purposes. In some implementations, three ranges toward the BS 710 and three ranges away from the BS 710 may be defined and associated with "normal," "medium," and "high" classifications of UE speed (so as to conform to cellular techniques for UE speed as defined by the 3GPP).

A BS 710 may indicate one or more parameters and one or more trigger events for cell reselection to the UE 750. For example, during configuration of the communication link between a serving BS and the UE 750, the serving BS may output system information indicating the one or more parameters and the one or more trigger events for another cell reselection to the UE 750.

One or more parameters for cell reselection (herein referred to as reselection parameters) may include a hysteresis ($Q_{Hyst}$), an offset ($Q_{offset}$), and a reselection timer ($T_{Reselection}$). $Q_{Hyst}$ may be a curve of a measured link metric between the UE 750 and a BS 710. For example, the UE 750 may measure a received signal strength, RSRP, RSRQ, CSI-RS or other signal metric for signals from a target BS to the UE 750, and the $Q_{Hyst}$ may include the curve of the measurements over time. A curve also may be generated for a measured signal metric for signals from a serving BS. The curves may indicate trends in whether a link metric is increasing or decreasing (such as an RSRP increasing for a target BS and an RSRP decreasing for a serving BS). The $Q_{Hyst}$ may be used in determining when to perform cell reselection, allowing such trends to influence the determination. For example, if the RSRP for the serving BS is increasing, the UE may use the $Q_{Hyst}$ to increase the required RSRP for the target BS for cell reselection to be triggered. In another example, if the rate of decrease in RSRP for the serving BS increases, the UE may use the $Q_{Hyst}$ to decrease the required RSRP for the target BS for cell reselection to be triggered.

One or more trigger events regarding the $Q_{Hyst}$ may include a threshold signal metric for the serving BS 710. If a signal metric is greater than the threshold signal metric, the link between the UE 750 and the serving BS 710 may be acceptable, and cell reselection may be temporarily prevented or suspended (such as while the signal metric remains above a threshold). For example, if the received signal strength (measured in dB) of a signal from the serving BS to the UE 750 is greater than a threshold signal strength, the UE 750 may temporarily prevent cell reselection. In some implementations, the UE 750 may be prevented from performing one or more operations associated with cell reselection. For example, if the received signal strength is greater than the threshold, the UE 750 may be prevented from measuring a received signal strength (or other link metrics) of signals from other BSs that may be targets for cell reselection.

One or more trigger events also may include a minimum threshold of a signal metric for a target BS. If the signal metric for a target BS is less than the minimum threshold, a potential communication link between the UE 750 and the target BS may be unacceptable. For example, if the received signal strength of a signal from a target BS to the UE 750 is less than a minimum threshold signal strength, the UE 750 may temporarily prevent cell reselection associated with the target BS.

$Q_{offset}$ may be a required offset between a link metric for a target BS and a link metric for the serving BS to trigger cell reselection. For example, if a serving RSRP for signals from the serving BS and a target RSRP for signals from the target BS are measured in dB, $Q_{offset}$ may be a minimum dB that the target RSRP is required to be greater than the serving RSRP to trigger cell reselection. One or more trigger events may include the target RSRP being greater than the serving RSRP by at least the $Q_{offset}$ for a minimum time to trigger (TTT) for cell reselection. A TTT may be a window of time or amount of time during which a trigger event is always satisfied in order to trigger cell reselection. For example, if the difference between RSRPs stays above the $Q_{offset}$ for the entirety of a TTT, the UE 750 may perform cell reselection. In some implementations, $Q_{offset}$ may be combined with $Q_{Hyst}$ in influencing when to perform cell reselection (such as described below with reference to equation (2)).

$T_{Reselection}$ may be a time during which cell reselection is prevented. A timer may count the time immediately after a last cell reselection. An example $T_{Reselection}$ may be 1 ms, which means that cell reselection is prevented for at least 1 ms after a UE performs a previous cell reselection to a new BS.

The one or more reselection parameters (for trigger events) may be based on a UE movement direction (or movement vector). In some implementations, $Q_{Hyst}$, $Q_{Offset}$, or $T_{Reselection}$ may be configured or adjusted based on a UE movement direction. For example, if a UE movement direction is toward the target BS, $Q_{offset}$ may be reduced or $T_{Reselection}$ may be reduced to promote cell reselection to the target BS. In addition, or in the alternative to configuring one or more reselection parameters, the trigger events for cell reselection based on the reselection parameters may be configured or adjusted based on a UE movement direction. For example, the impact of $Q_{Hyst}$ in determining when to trigger cell reselection may be adjusted based on a UE movement being away from or toward a BS.

Some reselection parameters and trigger events have been described to illustrate aspects of the disclosure. However, any suitable reselection parameter or trigger event may be used for cell reselection. For example, any reselection parameter or trigger event defined by the 3GPP for cell reselection (such as in Technical Specification 36.304) may be used. In some implementations, $Q_{Hyst}$, $Q_{Offset}$, or $T_{Reselection}$ also are defined by the 3GPP for cell reselection. In some implementations, the BS may define the trigger events and reselection parameters and output an indication of the trigger events and reselection parameters to the UE 750 (such as described herein). Trigger events (also referred to as triggers) also may be used for handover or CHO operations, and the example trigger events described above and below with reference to cell reselection may be similar to trigger events indicated by a serving BS to a UE for CHO.

In some implementations, the UE 750 may adjust a reselection parameter by a scaling factor that is based on a movement vector of the UE 750. For example, $Q_{Hyst}$ may be multiplied by a scaling factor to adjust $Q_{Hyst}$ based on a movement vector of the UE 750. In some implementations, the scaling factor may be as defined in equation (1) below:

$$\text{scaling factor} = \frac{UE \text{ movement magnitude}}{\text{maximum movement magnitude}} \quad (1)$$

The UE movement magnitude is as defined above regarding measuring a UE movement vector. The maximum movement magnitude may be set by the network or may be defined by a standard. For example, the 3GPP defines a maximum speed associated with cell reselection as 200 kph. In this manner, a maximum movement magnitude may be 200 kph. In some implementations, the sign of the numerator in equation (1) is based on whether the UE 750 is moving away from a target BS (which may be positive (+)) or the UE 750 is moving toward a target BS (which may be negative (−)).

To illustrate the scaling factor's effect on cell reselection, an example of a trigger event is defined in equation (2) below:

$$Q_n > Q_s + Q_{offset} + Q_{Hyst} \quad (2)$$

$Q_n$ is a link metric of the target BS (such as a signal strength), $Q_s$ is a link metric of the serving BS, $Q_{Offset}$ is the required difference between the link metrics of the target BS and the serving BS (which may be set during configuration of the link between the serving BS and the UE or adjusted based on a movement of the UE), and $Q_{Hyst}$ is a biasing of the trigger event based on a trending of one or both of the signal metrics (such as the signal metric for the serving BS). In the example, if the UE 750 determines that equation (2) is met (such as for an entirety of a TTT window or period of time), the trigger event for cell reselection is met, and the UE 750 may initiate cell reselection so that the UE 750 is served by the target BS. If the UE movement magnitude is 100 kph toward the target BS, the scaling factor may be −100 divided by 200 (−0.5). In this manner, $Q_{Hyst}$ in equation (2) biases toward the trigger event being met (with cell reselection to the target BS), but the effect of the bias is halved. The UE 750 may obtain an indication of the maximum movement magnitude from the serving BS during setup of a communication link between the serving BS and the UE 750, or the maximum movement magnitude may be predefined (such as based on any suitable cellular communication standards). If an indication is obtained from the serving BS, the maximum movement magnitude may be obtained in system information (such as an SIB) from the BS or in a dedicated RRC message from the BS.

As noted above, a movement direction (and, optionally, a movement magnitude) may be measured based on a doppler shift of one or more signals from a BS 710 to the UE 750.

FIG. 8A shows a diagram 800 illustrating an example UE on a high speed train causing a doppler shift for wireless communications between a BS and the UE. FIG. 8A illustrates the UE 880 moving towards a BS 884 to cause a doppler shift for wireless communications between the BS 884 and the UE 880. FIG. 8A also illustrates an example of a UE 890 on a high speed train 892 moving away from a BS 894 to cause a doppler shift for wireless communications between the BS 894 and the UE 890. The UEs 880 and 890 may be examples of the UE 750 in FIG. 7, and the BSs 884 and 894 may be examples of the BS 710 in FIG. 7. Referring to the example of the high speed train 882 moving towards the BS 884, a carrier signal 886 may be used for wireless communication between the UE 880 (on the high speed train 882) and the BS 884. Since the high speed train 882 is moving towards the BS 884, the carrier signal received at the BS 884 for UL transmissions and at the UE 880 for DL transmissions (as illustrated by signal 888) will be at a higher frequency than the carrier signal 886 when transmitted. For example, if the frequency of the carrier signal 886 is 1800 MHz, the train 882 is travelling at 200 kilometers per hour (kph), and radio waves are assumed to travel at approximately the speed of light, the observed frequency of the signal 888 is approximately 2130 MHz. The observed frequency of signal 888 is approximately 330 MHz greater than the frequency of the carrier signal 886 transmitted at 1800 MHz.

Referring to the example of the high speed train 892 moving away from the BS 894, a carrier signal 896 may be used for wireless communication between the UE 890 (on the high speed train 892) and the BS 894. Since the high speed train 892 is moving away from the cell 894, the carrier signal received at the cell 894 for UL transmissions and at the UE 890 for DL transmissions (as illustrated by signal 898) will be at a lower frequency than the carrier signal 896 when transmitted. For example, if the frequency of the carrier signal 896 is 1800 MHz, the train 892 is travelling at 200 kilometers per hour (kph), and radio waves are assumed to travel at approximately the speed of light, the observed frequency of the signal 898 is approximately 1520 MHz. The observed frequency of signal 898 is approximately 280 MHz less than the frequency of the carrier signal 896 transmitted at 1800 MHz.

If the UE 880 or 890 periodically receives a reference signal from the BS 884 or 894 (such as a synchronization signal, which may include a primary synchronization signal (PSS) or a secondary synchronization signal (SSS)), the periodicity of the reference signal may be known. In some implementations of determining a doppler shift that is associated with a movement direction (and, optionally, a movement magnitude), the UE 880 or 890 may identify instances of the reference signal from the BS 884 or 894. The UE 880 or 890 may determine a periodicity of the reference signal instances identified and compare the measured periodicity to the defined periodicity for the reference signal (with the doppler shift indicated by a difference of the defined periodicity at transmission and the measured periodicity at reception). Referring to the above example of a high speed train 882 or 892 moving at 200 kph toward or away from the BS 884 or 894 and a PSS being transmitted from the BS 884 or 894 to the UE 880 or 890 at 1800 MHz, a metric indicating the doppler shift may be either 1800-2130 MHz=−330 MHz when the UE 880 is moving toward the BS 884 or 1800 MHz-1520 MHz=280 MHz when the UE 890 is moving away from the BS 894. As shown, a negative doppler shift may indicate the UE moving towards the BS, and a positive doppler shift may indicate the UE moving away from the BS. However, any suitable nomenclature for doppler shifts may be used.

The UE 880 or 890 may use the determined doppler shift to adjust or configure one or more reselection parameters (or trigger events). Alternatively, the UE 880 or 890 may determine a UE movement vector (including a movement magnitude) based on the determined doppler shift associated with the BS 884 or 894. If a movement magnitude is determined, a scaling factor may be determined for adjusting one or more reselection parameters (or trigger events).

In some implementations, the UE determines a scaling factor based on a measured doppler shift (such as the measured doppler shift divided by an absolute value of the maximum doppler shift). For example, if 200 kph is a maximum movement magnitude of the UE as defined by the 3GPP, and the reference signal from the BS is at a frequency of 1800 MHz, the absolute value of the maximum doppler shift may be 330 MHz (if the UE is moving toward the BS) or 280 MHz (if the UE is moving away from the BS). In this manner, the scaling factor may be a value from −1 to 1.

In some other implementations, the scaling factor may be a value equal to or greater than zero. In this manner, the scaling factor may be used as a weight for one or more parameters of a trigger event (such as weighting $Q_{Hyst}$ or $Q_{offset}$). Any other suitable means of a scaling factor may be used, and the disclosure is not limited to a specific example.

In some implementations, ranges of movement magnitude (as described above) include ranges of doppler shifts. For example, one doppler range may be associated with a "normal" speed classification, another doppler range may be associated with a "medium" speed classification, and another doppler range may be associated with a "high" speed classification. A measured doppler shift may be identified as being in one of the doppler ranges, and the movement magnitude may be classified as "normal," "medium," or "high" based on the identified range. In this manner, ranges of doppler shifts may be used as affecting cellular communications based on the UE's movement direction.

A target BS may be associated with a range of doppler shifts. For example, a target BS may be associated with a doppler shift range corresponding to a coverage area size of the target BS. A first target BS with a smaller coverage area than a second target BS may be associated with a smaller range or a lower range of doppler shifts than the second target BS. In another example, target BSs configured to service a high speed train network may be associated with higher ranges of doppler shifts than target BSs not configured to service the high speed train network.

Figure 8B:
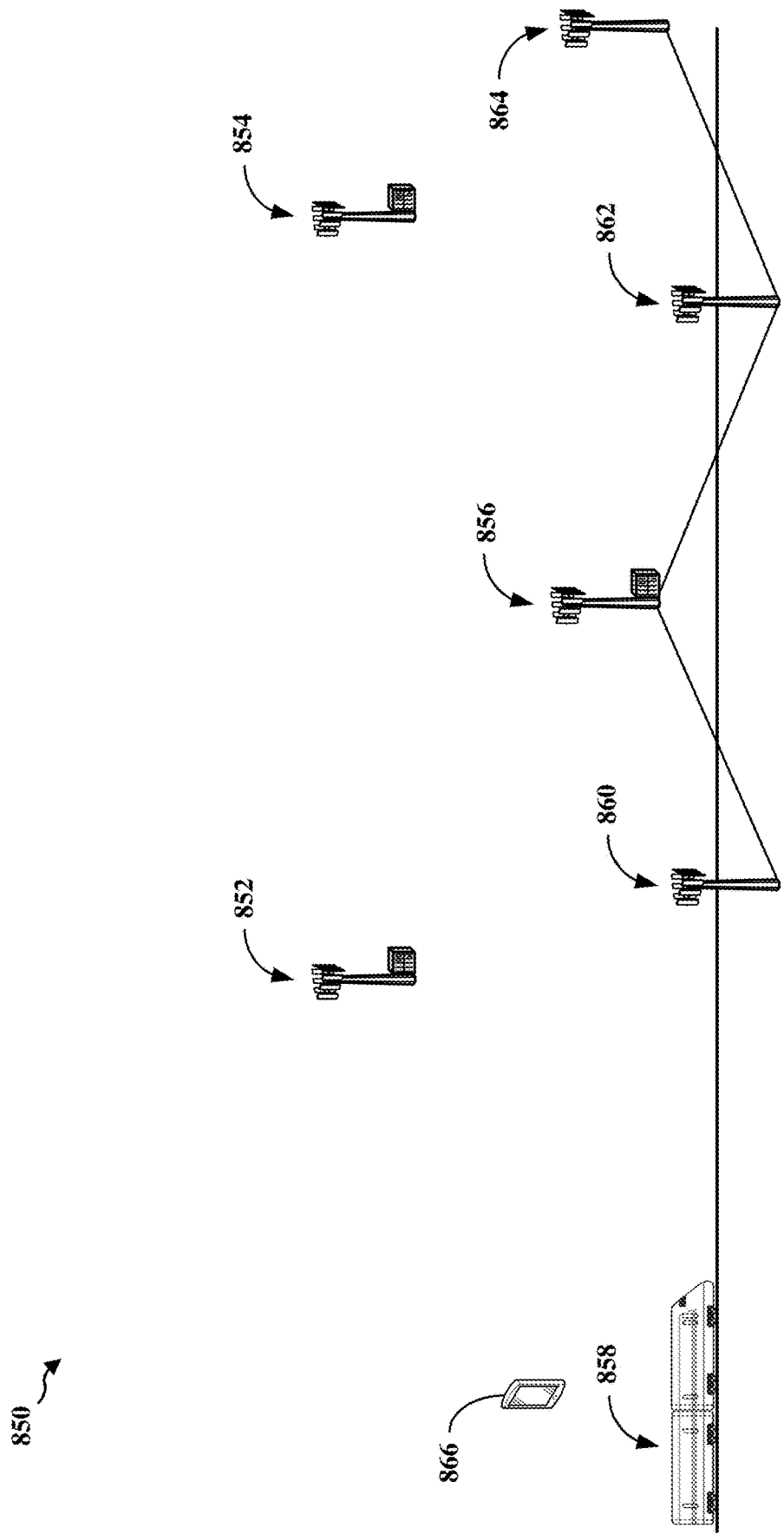
FIG. 8B shows a diagram illustrating a plurality of BSs that may service a UE.

FIG. 8B shows a diagram 850 illustrating a plurality of BSs 852-856 that may service a UE 866. The BS 856 is configured to service UEs on the high speed train 858. For example, the BS 856 is coupled to repeaters 860-864 to increase the coverage area of the BS 856. In this manner, the BS 856 may service a UE on the high speed train 858 for a longer period of time than the BS 852 or the BS 854 (which are not configured to service UEs on the high speed train 858). While not shown, one or more link parameters also may be adjusted to configure the BS 856 to service UEs on the high speed train 858.

The UE 866 may be out of range of the BS 854. Otherwise, BS 852 and BS 856 may be candidates for cell reselection (or in some other aspects, handover during CHO). The BS 852 may be associated with a first range of doppler shifts, and the BS 856 may be associated with a second range of doppler shifts. The UE 866 may determine a first doppler shift with reference to the BS 852 and a second doppler shift with reference to the BS 856. A larger doppler shift may indicate a higher speed of the UE 866 with reference to a BS.

The first and second doppler shifts are greater when the UE 866 is on a moving high speed train 858 than when the UE 866 is not on the high speed train 858. If the BS 856 is configured to service UEs on the high speed train 858 and the BS 852 is not configured to service UEs on the high speed train 858, the first range of doppler shifts may be lower than the second range of doppler shifts. In this manner, the BS 856 may be selected during cell reselection (or may be synchronized with during CHO) if the doppler shift indicates that the UE 866 is moving at a speed associated with the high speed train 858, and the BS 852 may be selected during cell reselection (or may be synchronized with during CHO) if the doppler shift indicates that the UE 866 is not moving at a speed associated with the high speed train 858. For example, the first range of doppler shifts may be associated with a "normal" and "medium" movement speed as defined in the 3GPP set of standards, and the second range of doppler shifts may be associated with a "fast" movement speed as defined in the 3GPP set of standards. In this manner, the first range may be associated with doppler shifts corresponding to a speed less than a threshold, and the second range may be associated with doppler shifts corresponding to a speed greater than a threshold (with the threshold associated with a speed of a high speed train). For example, a maximum of the first range may include a doppler shift associated with the threshold speed, or a minimum of the second range may be associated with the threshold speed.

While the example in FIG. 8B is with reference to a high speed train, doppler shift ranges or otherwise differentiating between BSs based on a doppler shift may be used in other scenarios in which the UE is moving, including a UE in a car along an interstate or other modes of transportation (such as a subway, elevated train, hyperloop, and so on).

The above examples of doppler shift are described with reference to a UE directly approaching or moving away from a BS. However, a UE movement with reference to a BS may include a direct component and a tangential component of movement with reference to the BS since the UE may not move directly towards or away from the BS. Since the doppler shift is measured by the UE with reference to signals received from the BS, the doppler shift is affected by the direct and tangential components at which the UE moves with reference to the BS. For example, a UE may move at a high rate of speed (such as greater than approximately 120 kph), but a doppler shift may not indicate the high rate of speed if the UE is moving tangentially to the BS.

Figure 8C:
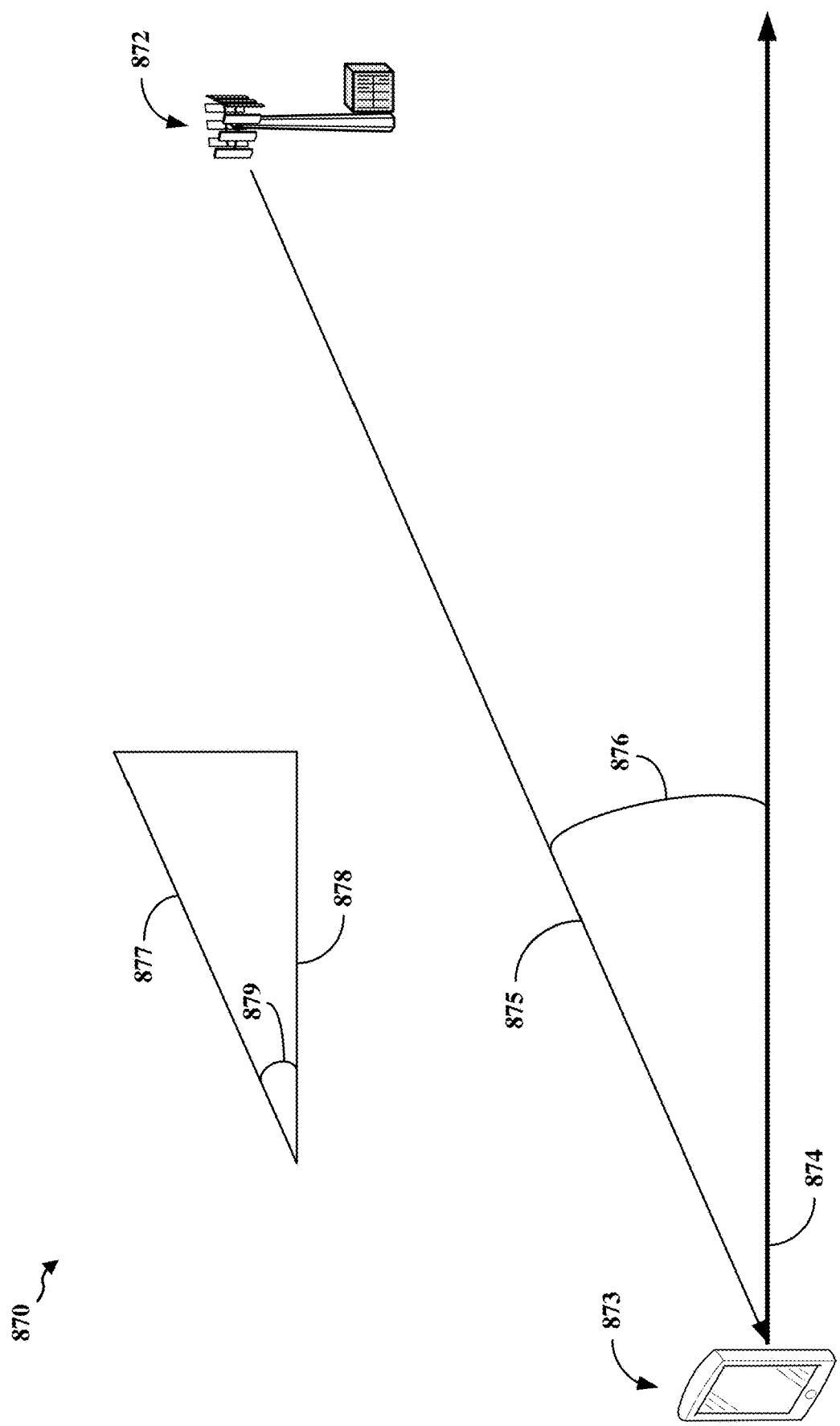
FIG. 8C shows a diagram illustrating an example doppler shift including a magnitude and an angle based on a UE movement with reference to a BS.

FIG. 8C shows a diagram 870 illustrating an example doppler shift 878 including a magnitude 877 and an angle 879 based on a UE 873 movement with reference to a BS 872. The UE 873 moves along the direction 874, and the doppler shift is measured using signals travelling along the direction 875. Direction 874 and direction 875 are separated by angle 876. If the UE is assumed to be travelling along the direction 875 when measuring the doppler shift, the doppler shift will decrease as the angle 876 increases. For example, the doppler shift 878 that is measured by the UE 873 is a value corresponding to a length of the side of the right triangle. The doppler shift 878 includes an angle 879 (which is the same as angle 876) and a magnitude 877 indicated by the hypotenuse (which may be equal to the doppler shift 878 divided by the cosine of the angle 879). The magnitude 877 is associated with the speed of the UE 873 along the direction 874.

If the BS 872 is associated with a doppler shift range for cell reselection or CHO, the range may correspond to movement of the UE 873 directly towards the BS 872. The magnitude 877 of the doppler shift 878 may be the component associated with the range. In this manner, the magnitude 877 may be determined from the measured doppler shift 878 based on the angle 879 to compare the magnitude

877 to the range, or the range may be adjusted based on the angle 879 to compare the doppler shift 878 to the adjusted range.

In some implementations, a speed of the UE 873 may be determined using an accelerometer, a GPS, or another suitable sensor of the UE 873, and the determined speed may be compared to the determined doppler shift 878 to determine the magnitude 877. For example, the determined doppler shift 878 (which may be in MHz) corresponds to a speed (which may be in kph) assuming that the UE 873 is moving directly towards the BS 872. The UE 873 may generate a factor by dividing the measured speed determined from a device sensor by the speed corresponding to the determined doppler shift 878, and the UE 873 may multiply the determined doppler shift 878 by the factor to generate the magnitude 877. In this manner, the doppler shift range of the BS 872 includes a first magnitude threshold and a second magnitude threshold that corresponds to the angle 879 and to which the determined magnitude 877 is compared. If the magnitude is between the first magnitude threshold and the second magnitude threshold, the doppler shift is determined to be in the doppler shift range.

The UE may determine a doppler shift for each target BS (such as determining a magnitude for each target BS), and the doppler shift (such as the magnitude) may be used for cell reselection (such as described above) or CHO (such as described below). Use of a doppler shift for CHO is also described in more detail below with reference to FIGS. 12-14.

RACH Parameters

Referring back to FIG. 7, a UE 750 may access a RACH between the UE 750 and the BS 710 to transmit uplink data. For example, the UE 750 may use carrier sense to contend with other UEs for access to the RACH. One or more parameters of the RACH or one or more parameters for accessing the RACH may be based on a movement direction (and, optionally, a movement magnitude) of the UE 750 with reference to a BS 710 serving the UE 750. For example, one or more RACH parameters may be based on a doppler shift (such as a magnitude of the doppler shift). In some implementations, the UE 750 may determine whether the UE 750 is moving toward, away from, or equidistant from the BS 710. One or more parameters of the RACH may be based on whether the UE 750 is moving toward, away from, or equidistant from the BS 710. For example, one or more RACH parameters may be based on whether the doppler shift is positive or negative.

In some implementations, the UE 750 may determine a movement vector of the UE 750 (such as described above, which includes the movement direction and a movement magnitude). The one or more parameters of the RACH may be based on the movement direction and the movement magnitude. For example, the one or more RACH parameters may vary based on the movement direction of the UE 750 with reference to the BS 710.

In some implementations of the movement magnitude affecting one or more RACH parameters, ranges of movement magnitude may be defined. For example, one range may be associated with a "normal" speed classification, another range may be associated with a "medium" speed classification, and another range may be associated with a "high" speed classification. In this manner, the UE 750 may identify the range including the measured movement magnitude, and the UE 750 may determine a classification of the UE speed based on the identified range. In some implementations, one or more RACH parameters may vary based on the identified range. In one example, a range of movements may refer to a range of doppler shifts. For example, a range of movement magnitudes may refer to a range of doppler shift magnitudes. In this manner, one or more RACH parameters may vary based on an identified range of the doppler shift of the UE 750.

In some implementations, a BS indicates one or more RACH parameters to the UE in configuring the communication link between the BS and the UE. For example, a BS 710 may configure the RACH (including one or more RACH parameters) when setting up the communication link to serve the UE 750. In configuring the one or more RACH parameters, the BS 710 may obtain a movement direction metric associated with a movement direction or a movement vector measured by the UE 750 (such as a doppler shift measured by the UE 750). The BS 710 may output a configuration message (such as an RRC reconfiguration message) indicating the one or more RACH parameters. In some implementations, the BS 710 indicates to the UE 750 how one or more RACH parameters vary based on the movement direction or the movement magnitude (such as how one or more RACH parameters vary based on the doppler shift indicated by the UE 750).

The one or more RACH parameters may include any suitable parameter defining the RACH or defining access means to the RACH by UEs. RACH parameters may be defined by one or more standards (such as by the 3GPP). Example RACH parameters may include:

- a defined PRACH (such as a physical channel or frequency for the RACH);
- one or more PRACH parameters (such as whether time division duplex (TDD) or frequency division duplex (FDD), a PRACH configuration index, or a PRACH frequency offset);
- one or more RRC parameters (such as a preamble size a preamble power ramping step, a target received power of the preamble, a maximum transmission power of the preamble, a power offset between the preamble and a payload associated with the preamble, a contention resolution timer size, or a window size for the BS to respond to a request from the UE to access the RACH);
- a preamble format of a RACH signal;
- a payload length associated with the preamble of the RACH signal;
- a priority of the UE to access the RACH (such as a priority of the RACH with reference to other UEs serviced by the BS to access the RACH); or
- one or more access barring parameters for barring/preventing the UE from accessing the RACH.

In some implementations of a PRACH being based on the UE movement direction, the BS 710 may define that a first PRACH is to be used when the UE movement is away from the BS 710 and that a second PRACH is to be used when the UE movement is toward the BS 710. For example, as shown above, a doppler effect may cause signals to be received at a different frequency than transmitted. The first PRACH and the second PRACH may be configured to compensate for or reduce the doppler shift. For example, if a typical PRACH for all UEs is centered at 1800 MHz, the first PRACH may be centered at a frequency above 1800 MHz (with the UEs accessing the RACH moving away from the BS 710) and the second PRACH may be centered at a frequency below 1800 MHz (with the UEs accessing the RACH moving toward the BS 710). In this manner, the frequencies of the signals as seen by the BS 710 may approach 1800 MHz.

One or more PRACH parameters also may be based on the UE movement direction (and, optionally, the movement magnitude). For example, the frequency offset for the PRACH may be adjusted based on the movement direction (or the movement vector). In this manner, the signals from the UE 750, as received by the UE 710, may appear to approach a carrier frequency (as a result of the frequency offset). For example, one or more negative frequency offsets may be used when the UE 750 is moving toward the BS 710, and one or more positive frequency offsets may be used when the UE 750 is moving away from the BS 710. In another example, a PRACH configuration index number may be set by the BS 710 based on a movement direction (or movement vector) as measured by the UE 750. The BS 710 may provide the determined configuration index number to the UE 750 when configuring the link to serve the UE 750.

Other RACH parameters also may be configured based on a UE movement direction (or the movement vector). Some RACH parameters are defined by the 3GPP as being provided in an RRC reconfiguration message (which may be referred to as RRC parameters). RRC parameters may include formatting of packets from the UE 750 to the BS 710 to request access to the RACH. For example, the packet may include a preamble and a payload. One or more RRC parameters may include a size of the preamble, a power ramping step for the preamble in order to increase (or decrease) the transmission power, a target power of the preamble at reception at the BS 710, a maximum transmission power of the preamble by the UE 750, a power offset between the preamble and the payload (with the preamble being at a higher transmit power than the payload), a contention resolution timer (for which time a UE backs off from contending for access to the RACH if access to the RACH is contested), and a window size for the BS 710 to respond to an access request from the UE 750.

In some implementations, the preamble size may be shortened for UEs moving toward the BS and lengthened for UEs moving away from the BS. In this manner, the BS 710 may differentiate between UEs moving away from the BS and UEs moving toward the BS based on the length of the preamble. The BS 710 may bias granting access to a UE from one of the groups based on whether the UE is moving toward or away from the BS 710. In some other implementations, the preamble size also may be based on a movement magnitude. For example, a different preamble size may be associated with each of the classifications of UE speed (such as "normal," "medium," and "high"). In this manner, the BS 710 may be configured to bias access to the RACH based on the UE movement magnitude in addition to the UE movement direction. In some examples, when multiple UEs contend for the RACH, the BS 710 may prevent access to the RACH to a UE 750 moving away from the BS 710 at greater than a threshold speed. For example, the BS 710 may prevent access to a UE 750 classified as having a "high" speed as the UE 750 may soon require cell reselection.

In some other examples, the contention resolution timer may be adjusted to different times based on a movement direction (and, optionally, a movement magnitude). For example, a contention resolution timer may be shortened for UEs moving away from the BS to improve the probability of accessing the RACH before requiring cell reselection. In addition, or to the alternative, the window size for the BS 710 to respond to a request from the UE 750 may be adjusted to different sizes based on a movement direction (and, optionally, a movement magnitude). For example, the window may be increased for UEs moving away from the BS 710 (which may be to compensate for doppler effect of the signal and the UE being further away from the BS when a response is to be received than when the request is sent). Any suitable variance of the RRC parameters may be configured, as the above examples are to illustrate aspects of the disclosure.

As noted above, one or more RACH parameters may include a preamble format. In some implementations, the BS 710 may indicate to the UE 750 whether movement direction is to be considered. For example, some networks may be configured to receive and use measured movement direction (or a movement vector) from the UE 750, and other networks may not. If a network is configured to use movement direction, the BS 710 may indicate to the UE 750 to use a preamble format to include a movement direction. For example, the UE 750 may use a field of the preamble to indicate whether the UE 750 is moving toward or away from the BS 710 (such as a bit flag). In another example, a field may indicate whether the UE 750 will provide such measurements in a different portion of a signal to the BS 710 (such as during a specific set of subframes to the BS 710). In this manner, the UE 750 may be able to communicate with legacy systems not configured to use movement direction.

In some examples, the payload length may vary based on a movement direction (and, optionally, a movement magnitude). In some implementations, the payload length may be lengthened for UEs moving away from the BS 710. For example, if a BS 710 biases RACH access toward UEs moving toward the BS 710, the BS 710 may increase the payload length for UEs moving away from the BS 710 to more balance access to the RACH between UEs moving toward the BS 710 and UEs moving away from the BS 710. In this manner, the payload length may be a first length for UEs moving toward the BS 710, and the payload length may be a second length for UEs moving away from the BS 710. In some other implementations, the payload length may be based on a range of movement magnitudes in addition to the movement direction.

When a UE 750 contends for access to the RACH, the UE 750 may be associated with an access priority. For example, in a round robin RACH access system, a first UE that recently accessed the RACH has a lower access priority than a second UE that has not accessed the RACH. In this manner, access to the RACH may be fair and balanced. In some implementations, the access priority may vary based on a UE movement direction (and, optionally, a movement magnitude). For example, if the BS 710 is to bias access toward UEs moving toward the BS 710, the BS 710 may increase the access priority for UEs moving toward the BS 710 or decrease the access priority for UEs moving away from the BS 710. In this manner, a UE moving away from the BS 710 may be associated with a first access priority, and a UE moving toward the BS 710 may be associated with a second access priority greater than the first access priority. The access priority also may be increased or decreased based on a movement magnitude of a UE.

In some instances, the BS 710 may bar/prevent a UE 750 from accessing the RACH for an amount of time. For example, after a UE 750 accesses the RACH, the BS 710 may prevent the UE 750 from accessing the RACH for a barring time to allow other UEs to access the RACH. In some implementations, the BS 710 may vary the barring time based on a movement direction (or a movement vector).

As noted above, a movement direction and a movement magnitude may be associated with a doppler shift measured by the UE 750 with reference to the BS 710. In this manner, in the above examples of one or more RACH parameters being associated with a movement direction or a movement magnitude, one or more RACH parameters may be associated with a doppler shift.

Link Parameter Measurement and Reporting

A UE 750 may measure one or more link metrics. A link metric may be a parameter for cell reselection by a UE, or the link metric may be a parameter for communication handover by a BS. Such parameters may be referred to as a link parameter. One or more link parameters may include:

- a received signal strength of a signal from the BS 710 to the UE 750;
- an RSRP of a reference signal from the BS 710 to the UE 750;
- an RSRQ of the reference signal;
- an SINR of the reference signal;
- an SNR of the reference signal; or
- a CSI-RS.

For a communication handover by a BS 710, the BS 710 may obtain one or more measurement results from the UE 750, and the BS 710 may initiate the communication handover based on the measurement results. The target BS may obtain a request for the communication handover from the BS 710. The UE 750 may output measurement results to the serving BS in a periodic manner or based on one or more conditions or events being met.

Figure 9:
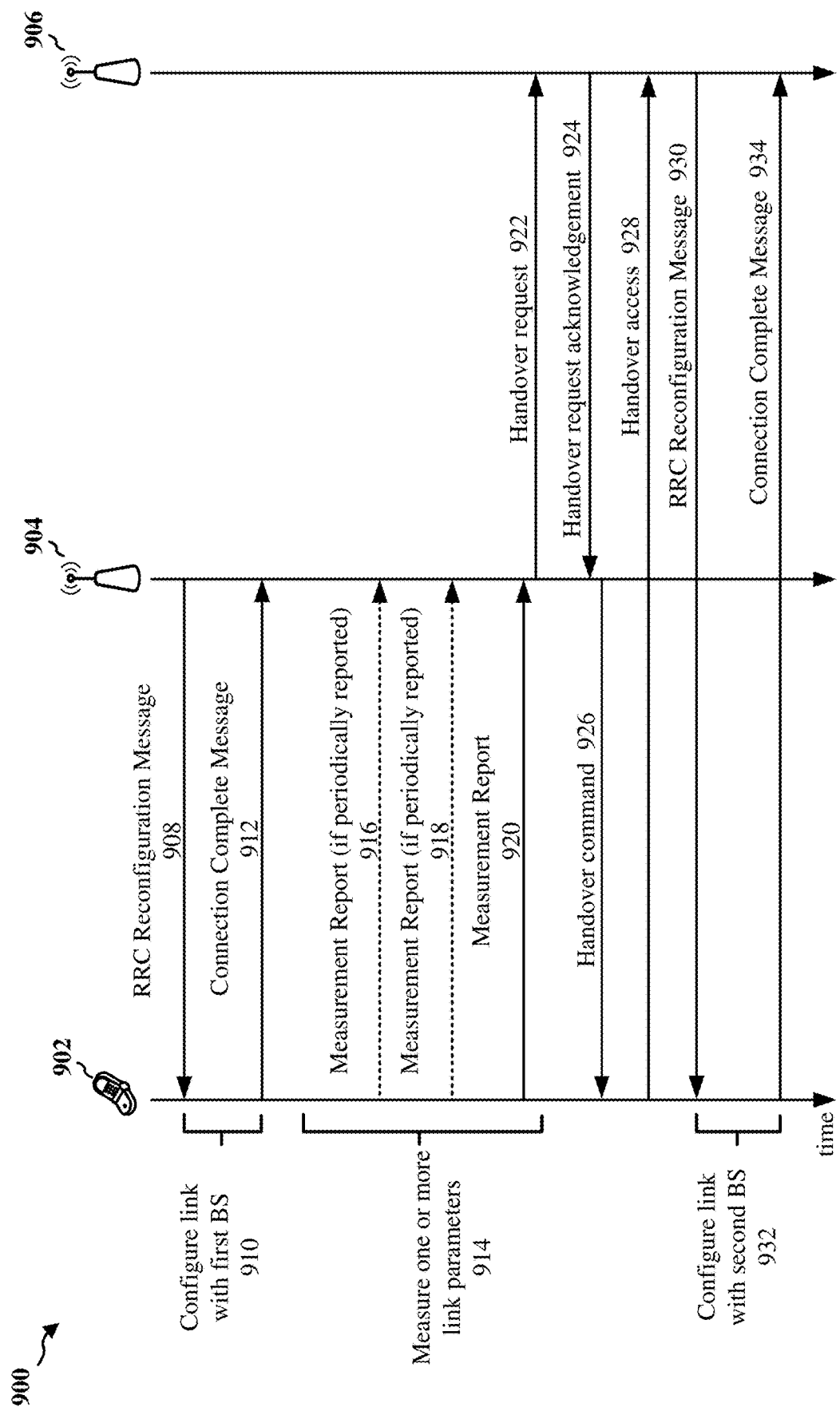
FIG. 9 shows a diagram illustrating an example signaling between a first BS, a second BS, and a UE for configuring links between the BSs and the UE.

FIG. 9 shows a diagram 900 illustrating an example signaling between a first BS 904, a second BS 906, and a UE 902 for configuring links between the BSs 904 and 906 and the UE 902. In the example, the first BS 904 is a serving BS, and the second BS 906 is a target BS for handover. The diagram 900 illustrates a communication handover from the BS 904 to the BS 906. The UE 902 is an example implementation of the UE 750 in FIG. 7, and the BSs 904 and 906 are example implementations of the BS 710 in FIG. 7.

When the BS 904 is to setup a link to serve the UE 902 (such as for a communication handover), the BS 904 may output an RRC reconfiguration message 908 to the UE 902. As noted above, the RRC reconfiguration message may include one or more parameters for configuring the communication link (such as one or more RACH parameters). The RRC reconfiguration message also may include information regarding trigger events, link parameters, and so on for handover. During time 910, the UE 902 may configure the link and complete the connection with the BS 904 based on the RRC reconfiguration message 908. After completing the connection with the BS 904, the UE 902 outputs a connection complete message 912 to the BS 904 to indicate to the BS 904 that setup of the communication link is complete.

In some implementations, the UE 902 may measure one or more link parameters for measurement reporting (which may be used to adjust parameters for the current communication link (such as the RACH, trigger events, and so on) or may be used for handover).

As noted, the RRC reconfiguration message (or one or more system information blocks) output by the BS 904 to the UE 902 may indicate the one or more link parameters to be measured. The message also may indicate one or more parameters for message reporting (such as whether the reporting is to be periodic or triggered). As noted, the one or more link parameters may be measured for signals from the BS 904 to generate measurement results. The one or more link parameters also may be measured for signals from the BS 906 (which may be a target BS) to generate measurement results.

If the measurement reporting is to be periodic, the UE 902 may periodically output a measurement report including the measurement results (such as measurement report 916, measurement report 918, and measurement report 920). If the measurement reporting is to be trigger event based, the measurement report 920 may be output to the BS 904 when a trigger event is met. If the measurement results in the measurement report 920 cause a trigger event for communication handover to be met, the BS 904 may initiate a communication handover to the BS 906. For example, if a communication handover is to be triggered by an RSRP of a signal from the target BS 906 being greater than a threshold amount more than an RSRP of a signal from the target BS 904, the measurement report 920 may include the RSRP associated with the target BS 906 and the RSRP associated with the serving BS 904 as measurement results. In this manner, the UE 902 may measure the RSRPs during time 914 to generate the measurement results. In response to the BS 904 identifying that a communication handover is to be performed, the BS 904 may provide a handover request 922 to the BS 906 to initiate a possible communication handover from the BS 904 to the BS 906.

In some implementations, if one or more link parameters for measurement, one or more parameters for measuring the link parameters, or one or more parameters for reporting the measurement results are to be adjusted while the BS 904 services the UE 902, the BS 904 may output another RRC reconfiguration message to the UE 902 indicating the adjustment to one or more parameters. The UE 902 may adjust the parameters, and the UE 902 may output a configuration complete message to the BS 904.

The BS 906 may obtain the handover request 922 from the BS 904, and the BS 906 may configure a communication link with the UE 902. For example, the BS 906 may initialize one or more channels for communication between the BS 906 and the UE 902. The BS 906 may output a handover request acknowledgement 924 to the BS 904 to indicate to the BS 904 that the communication handover is in process. After obtaining the acknowledgement 924, the BS 904 may output a handover command 926 to the UE 902. The handover command 926 may include information regarding the BS 906 (such as channels to be used for communication). The handover command 926 also may include a trigger event to indicate when handover to the BS 906 is to occur. For CHO, multiple target BSs may be prepared for possible handover. In this manner, the handover command 926 also may include a trigger event associated with each target BS, a list of target BSs for possible handover, and a priority of the target BSs for handover. In this manner, if multiple trigger events for multiple target BSs are met, handover may be to the target BS associated with the highest priority.

The UE 902 uses the information from the handover command 926 to obtain the one or more trigger events, and the UE 902 may determine whether one or more of the trigger events are met. If a trigger event is met, the UE 902 may synchronize with the target BS associated with the trigger event (such as the BS 906) in completing handover. The UE 902 also may output a handover access message 928 to the BS 906. The BS 906 may output an RRC reconfiguration message 930 (which may be similar to the RRC reconfiguration message 908). The UE 902 may use the information in the RRC reconfiguration message 930 to configure the link with the second BS during time 932, and the UE 902 may output the connection complete message 934 (which may be similar to the connection complete message 912) or another suitable acknowledgement of the message 930 and that the communication link between the UE 902 and the BS 906 is established. While not shown, the communication link between the UE 902 and the BS 904 may be torn down after the communication link between the UE 902 and the BS 906 is established.

One or more link parameters for measurement, one or more parameters for measuring the link parameters, one or more parameters for reporting the measurement results, or one or more trigger events for a communication handover may vary based on a movement direction (and, optionally, a movement magnitude) of the UE 902 with reference to the BS 904 (or the BS 906). For example, the link parameters described above (such as signal strength, RSRP, RSRQ, SINR, SNR, or CSI-RS) may be based on a doppler shift associated with a UE movement direction or movement vector. In addition, or to the alternative, when to measure or how to measure the link parameters may be based on the UE movement direction or movement vector. When and how to report the measurement results also may be based on the UE movement direction or movement vector. For example, measuring the one or more link parameters or reporting the one or more measurement results may be based on whether the UE movement is identified as being away from, toward, or equidistant from the BS (such as based on a doppler shift). In some aspects, measuring the one or more link parameters or reporting the one or more measurement results also is based on the movement magnitude of the UE (such as based on a magnitude of the doppler shift). For example, if a measured movement magnitude is identified as being in one of a plurality of ranges of movement magnitude, measuring the one or more link parameters or reporting the one or more measurement results may be based on which range is identified. In some implementations, the ranges may be for the movement vectors, and measuring the one or more link parameters or reporting the one or more measurement results is based on which range is identified. For example, measuring the one or more link parameters or reporting the one or more measurement results may be based on a doppler shift being in a range of doppler shifts.

In some implementations, the BS to service the UE 902 may indicate to the UE 902 how the link parameters, measurement of the link parameters, or reporting of the measurement results are to vary based on the UE movement direction or movement vector (such as based on the doppler shift). For example, RRC reconfiguration message 908 or RRC reconfiguration message 930 may be output by a BS to indicate how the link parameters or other factors are to vary based on the movement direction or movement vector. A measurement report (such as the measurement report 920) may include the movement direction or the movement vector as measured by the UE 902. For example, a measurement report may include one or more doppler shifts measured by the UE 902. The serving BS (such as BS 904) may determine that the link parameters, measurement of the link parameters, or reporting of the measurement results are to vary based on the measurement report received. For example, the link parameters, measurement of the link parameters, or reporting of the measurement results for one or more target BSs may vary based on the one or more doppler shifts. The serving BS outputs to the UE 902 a new RRC reconfiguration message indicating the changes in measurement or reporting to occur.

One example adjustment may be which link parameter is to be measured based on the UE movement direction or movement vector (such as based on a doppler shift). For example, the BS 904 may indicate whether a first link parameter or a second link parameter is to be measured based on the movement direction or the movement vector. In another example, whether the first link parameter or the second link parameter is to be measured may be based on a range of movement vectors identified for the measured movement vector of the UE 902.

Another example adjustment is a periodicity of reporting measurement results. In some implementations, the periodicity may vary based on the movement direction (and, optionally, the movement magnitude) (such as based on a doppler shift). For example, if the UE 902 is classified as moving away from the BS 904 at a "high" speed, the BS 904 may indicate that the periodicity of reporting is to be reduced. In this manner, with the UE 902 more likely to leave a coverage area associated with the BS 904 than another UE moving at a slower speed, the BS 904 may more quickly determine when a trigger event is met and a handover is to occur. Conversely, the periodicity may be lengthened for UEs moving toward the BS 904.

In some implementations, if the reporting is event triggered, a trigger event may be based on the movement direction (or movement vector) of the UE (such as based on a doppler shift). For example, if $Q_{offset}$ or $Q_{Hyst}$ are used for trigger events, $Q_{offset}$ or $Q_{Hyst}$ may be adjusted based on the movement direction or the movement vector of the UE 902. Some example trigger events may include a link parameter that is measured crossing a threshold. For example, if the link parameter being measured is a received signal strength, a trigger event may include the received signal strength going below a lower threshold. However, the BS 904 may obtain an indication that the UE 902 is moving toward the BS 904, and the BS 904 may indicate that the lower threshold for the received signal strength is to be reduced. Other example threshold adjustments may include adjusting a length of a TTT or adjusting a minimum threshold for a link metric.

The link parameters to be measured, when to report, when to measure, or other suitable parameters may be determined by the BS and indicated by the BS to the UE 902 via a dedicated RRC message from the BS. In some other implementations, the parameters may be indicated in one or more SIBs from the BS to the UE 902. While some example link parameters, measurement means, and reporting means are described in the above examples, any suitable measurement means, reporting means, and link parameters may be used, as the examples are provided for illustrating aspects of the present disclosure.

Conditional Handover (CHO)

While FIG. 9 illustrates one target BS 906 for possible handover, multiple BSs may cover a geographic region. For example, referring back to FIG. 1, the coverage areas 110 of different base stations 102 may overlap, and a UE 104 in an overlapping region potentially may be serviced by one of multiple BSs 102. As a result, multiple target BSs may be potential candidates for handover during a cell reselection. The network 100 may be configured for CHO. In another example, referring back to FIG. 8B, the coverage areas of the BSs 852-856 may overlap, and the UE 866 potentially may be serviced by one of the BSs. As a result, multiple target BSs may be potential candidates for handover during a cell reselection, and the network including the BSs 852-856 may be configured for CHO.

Referring back to FIG. 1, a network 100 configured for CHO (such as defined by the 3GPP) allows multiple target BSs 102 to be considered as potential candidates for handover. The UE 104 measures one or more link metrics associated with the serving BS and each of one or more target BSs to generate measurement results. The UE 104 may output a measurement report including the measurement results to the serving BS. After obtaining the measurement report from the UE 104, the serving BS may determine one or more target BSs that may be a candidate for potential handover. The serving BS also may determine a trigger event associated with each candidate BS that, when met, may cause a handover for the candidate BS to service the UE.

The BS 102 also may determine a priority of each target BS for handover during a CHO. In this manner, one target BS may have a higher priority than another target BS for handover. In some implementations, if multiple trigger events associated with different target BSs are met, handover may occur to the target BS with the highest priority from the different target BSs associated with the multiple trigger events. For example, the UE may synchronize with the target BS associated with the highest priority. A CHO mechanism where multiple target BSs may be considered for communication handover may be defined by the 3GPP set of standards, or the CHO mechanism may be proprietary. As noted above, any operation performed for CHO (from determining which BSs are to be candidates for handover, to determining if one or more trigger events are met to initiate handover, to prioritizing the candidate BSs for handover, to selecting the candidate BS for handover, to signaling between the BSs and UE for handover, and so on) may be referred to as a CHO operation.

In some implementations, CHO is based on the UE movement direction (and, optionally, the movement magnitude). For example, if the UE is moving toward a first target BS and moving away from a second target BS, the serving BS may prioritize the first target BS over the second target BS for handover. For the serving BS to analyze each target BS for possible handover during CHO, a UE movement direction may be determined for each of the target BSs. In some implementations, a UE movement direction also may be determined for the serving BS. For example, if the UE is served by a serving BS, and the serving BS is analyzing a first target BS and a second target BS as potential candidates for handover, the UE may determine a first target movement direction with reference to the first target BS and a second target movement direction with reference to the second target BS, and the serving BS may obtain the first target movement direction and the second target movement direction from the UE In some implementations, the UE also may determine a movement direction with reference to the serving BS, and the serving BS may obtain the movement direction from the UE.

In some implementations, the UE may determine movement vectors (including movement magnitudes) for each of the BSs, and the movement vectors may be output to the serving BS. For example, the UE may identify a first target movement vector with reference to a first target BS and identify a second target movement vector with reference to a second target BS. For CHO (with the first target BS and the second target BS as candidates for handover), the serving BS may identify the first target BS or the second target BS for an initiated communication handover based on the first target BS and the second target BS. For example, if the UE is classified as moving at a "high" speed away from the first target BS and the UE is classified as moving at a "normal" speed away from the second target BS based on the movement vectors, the serving BS may bias handover toward the second target BS (such as by adjusting a priority of the first target BS or the second target BS).

In some implementations, ranges of movement vectors (or movement magnitudes) may exist. For example, if the speed of the UE may be classified as "normal," "medium," or "high," a first range of movement vectors may be associated with a "normal" speed away from a BS, a second range of movement vectors may be associated with a "medium" speed away from the BS, a third range of movement vectors may be associated with a "high" speed away from the BS, a fourth range of movement vectors may be associated with a "normal" speed toward the BS, a fifth range of movement vectors may be associated with a "medium" speed toward the BS, and a sixth range of movement vectors may be associated with a "high" speed toward the BS. In some examples, a seventh range of movement vectors may be associated with a UE not moving or moving equidistant to the BS. In some implementations, the UE may identify a range of movement vectors for a first measured movement vector for the UE with reference to a first target BS, and the UE may identify a range of movement vectors for a second measured movement vector for the UE with reference to a second target BS. For CHO, selection of the target BS for handover may be based on the identified ranges of movement vectors for the first target BS and the second target BS. For example, if the UE identifies the second range (from the above example) with reference to the first target BS, the UE identifies the sixth range (from the above example) with reference to the second target BS, and the UE indicates the identified ranges to the serving BS, the serving BS may bias handover toward the second target BS. The ranges may be the same regarding different target BSs or may be different. In some implementations, the serving BS may define the ranges for each target BS to be used by the UE for identification.

As noted herein, a serving BS may define one or more parameters that are adjusted based on a UE movement direction (or movement vector), and the serving BS may indicate such parameters to the UE. The UE may measure one or more link parameters for the serving BS and each target BS to generate measurement results. The UE may provide measurement results to the serving BS (such as via a measurement report, as described above) for each target BS being considered as a potential candidate for handover during a CHO. Using the measurement results, the serving BS may adjust one or more parameters for CHO (such as one or more link parameters, one or more trigger events, one or more priorities of BSs, and so on). The BS may indicate the adjusted parameters for CHO to the UE via one or more RRC reconfiguration messages. In this manner, the UE may communicate with the serving BS based on the adjusted parameters for CHO.

Different means or mechanisms for CHO to be based on a movement direction (or a movement vector) may be used. In some implementations, the serving BS may exclude a target BS as a candidate BS for handover based on the movement direction (or the movement vector, or an identified range of movement vectors including the movement vector). In some other implementations, the serving BS may adjust a priority of a target BS for handover with reference to the priorities of other target BSs for handover, and the adjustment may be based on the movement direction (or the movement vector, or an identified range of movement vectors including the movement vector). In some further implementations, the serving BS may adjust one or more link parameters, measurement of the link parameters, or reporting of the link parameters (such as described above). In some other implementations, the serving BS may adjust one or more trigger events for handover during a CHO (such as adjusting one or more parameters of a trigger event). In some implementations, a UE obtaining the trigger events from the serving BS may adjust one or more trigger events for handover. Example parameters of a trigger event may include a TTT, a hysteresis threshold for one or more link parameters associated with a BS, or an offset threshold for one or more link parameters associated with two or more BSs.

In some implementations, a serving BS configures a trigger event to be specific for a target BS. For example, if a trigger event includes an offset between RSRPs for the serving BS and a target BS, the serving BS may adjust an offset to be different for each target BS. In this manner, a trigger event may differ between different target BSs. In some other implementations, the UE may adjust a trigger event to be specific for a target BS.

As noted herein, a movement direction (or a movement vector) of a UE with reference to a BS may be used to adjust one or more aspects of cellular communications (such as cell reselection, RACH access, measurement reports, or CHO). For example, one or more doppler shifts measured by the UE may be used to adjust one or more aspects of cellular communications. With reference to CHO, one or more CHO operations may be based on one or more doppler shifts determined by the UE. In some implementations, which BS is to serve the UE, when the UE is to synchronize with the BS, and whether the UE is to synchronize with the BS during CHO may be based on a doppler shift associated with the UE moving with reference to the BS. For example, a serving BS may adjust the priorities of target BSs for handover, a serving BS may adjust one or more trigger events, or a UE may adjust one or more trigger events based on one or more doppler shifts. CHO based on one or more doppler shifts is described in more detail below with reference to FIGS. 12-14.

Aspects of the present disclosure may be performed by a UE or a BS using hardware, software, or a combination of both. Example implementations of a UE and a BS to incorporate aspects of the present disclosure are described below with reference to FIGS. 10 and 11.

Figure 10:
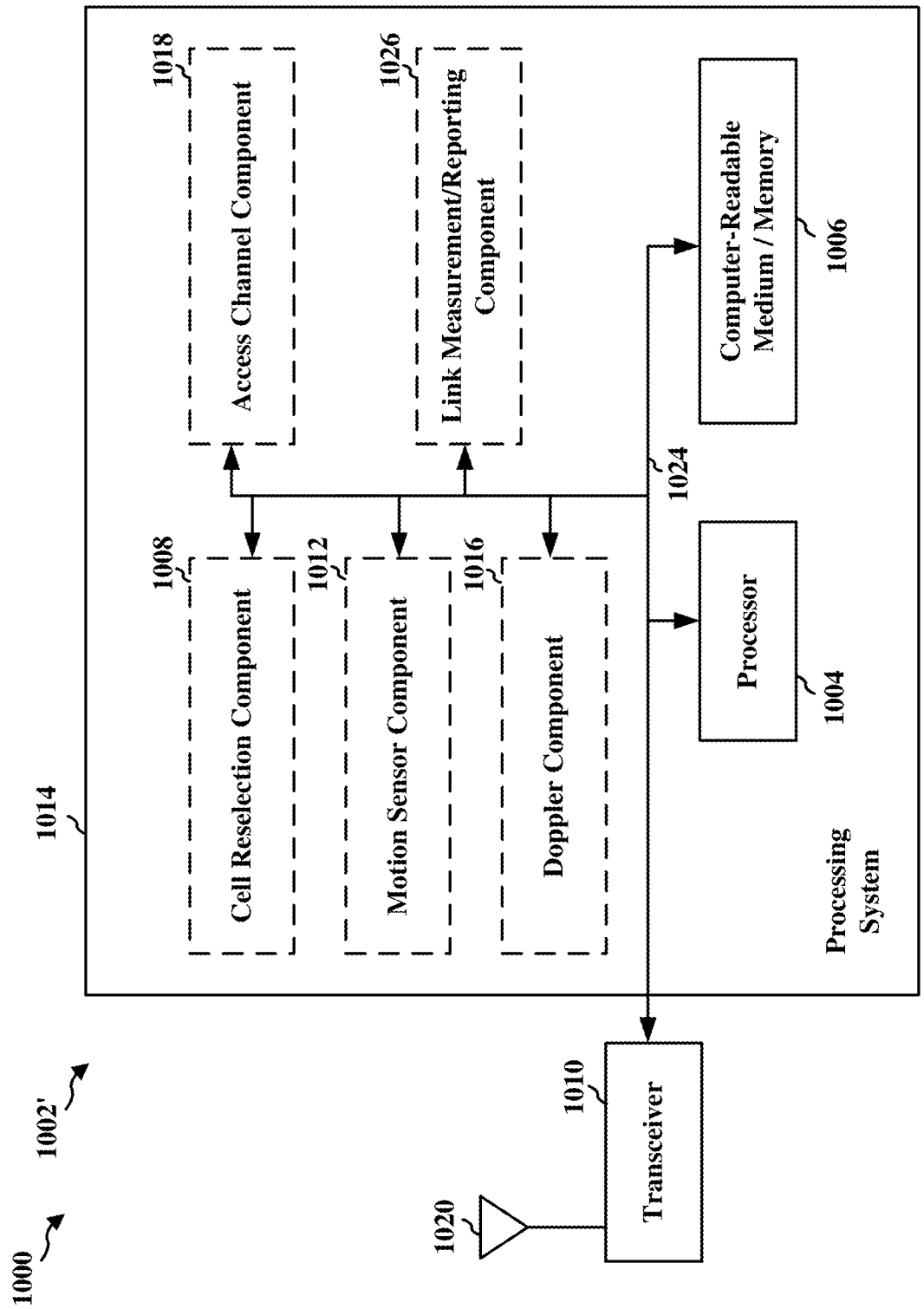
FIG. 10 shows a diagram illustrating an example implementation of an apparatus employing a processing system.

FIG. 10 shows a diagram 1000 illustrating an example implementation of an apparatus employing a processing system 1014. In some implementations, a UE includes the apparatus to perform aspects of the present disclosure. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors or hardware components, represented by the processor 1004, one or more of the components 1008, 1012, 1016, 1018, 1022, or 1026, and the computer-readable medium/memory 1006. The bus 1024 also may link various other circuits such as timing sources, peripherals, voltage regulators, and power management circuits that are not shown.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. For example, an extracted signal may be provided to a doppler component 1016 for determining a doppler metric associated with the received signal. In another example, the extracted signal (if an RRC reconfiguration message from a BS) may be provided to the link measurement/reporting component 1026 to update one or more link parameters, measurement parameters, or reporting parameters. In another example, the extracted signal may be provided to the access channel component 1018 to update one or more parameters of the RACH for the UE to access in transmitting uplink data to the BS.

In addition, the transceiver 1010 receives information from the processing system 1014. For example, the transceiver 1010 may receive a RACH access request from the access channel component 1018, may receive a cell reselection request from the cell reselection component 1008, or may receive a measurement report from the link measurement/reporting component 1026. Based on the received information, the transceiver 1010 generates a signal to be applied to the one or more antennas 1020. In some implementations, an interface of the UE includes the transceiver 1010. The interface also may include the antenna 1020.

The motion sensor component 1012 may include one or more sensors for the apparatus 1002 to determine a movement direction (or movement vector) with reference to a BS if the processing system 1014 is implemented in a UE. The doppler component 1016 may include any suitable mechanisms for determining a doppler metric or doppler effect of a received signal. In some implementations, the doppler component 1016 determines a UE movement direction (or movement vector) with reference to a BS if the processing system 1014 is implemented in a UE.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described herein for any particular apparatus. The computer-readable medium/memory 1006 also may be used for storing data that is manipulated by the processor 1004 when executing software. The components 1008, 1012, 1016, 1018, or 1026 may be software components running in the processor 1004, resident/stored in the computer readable medium/memory 1006, one or more hardware components coupled to the processor 1004, or some combination thereof. In some implementations, the processing system 1014 may be a component of the UE 750 and may include the memory 760 or at least one of the TX processor 768, the RX processor 756, and the controller/processor 759.

Figure 11:
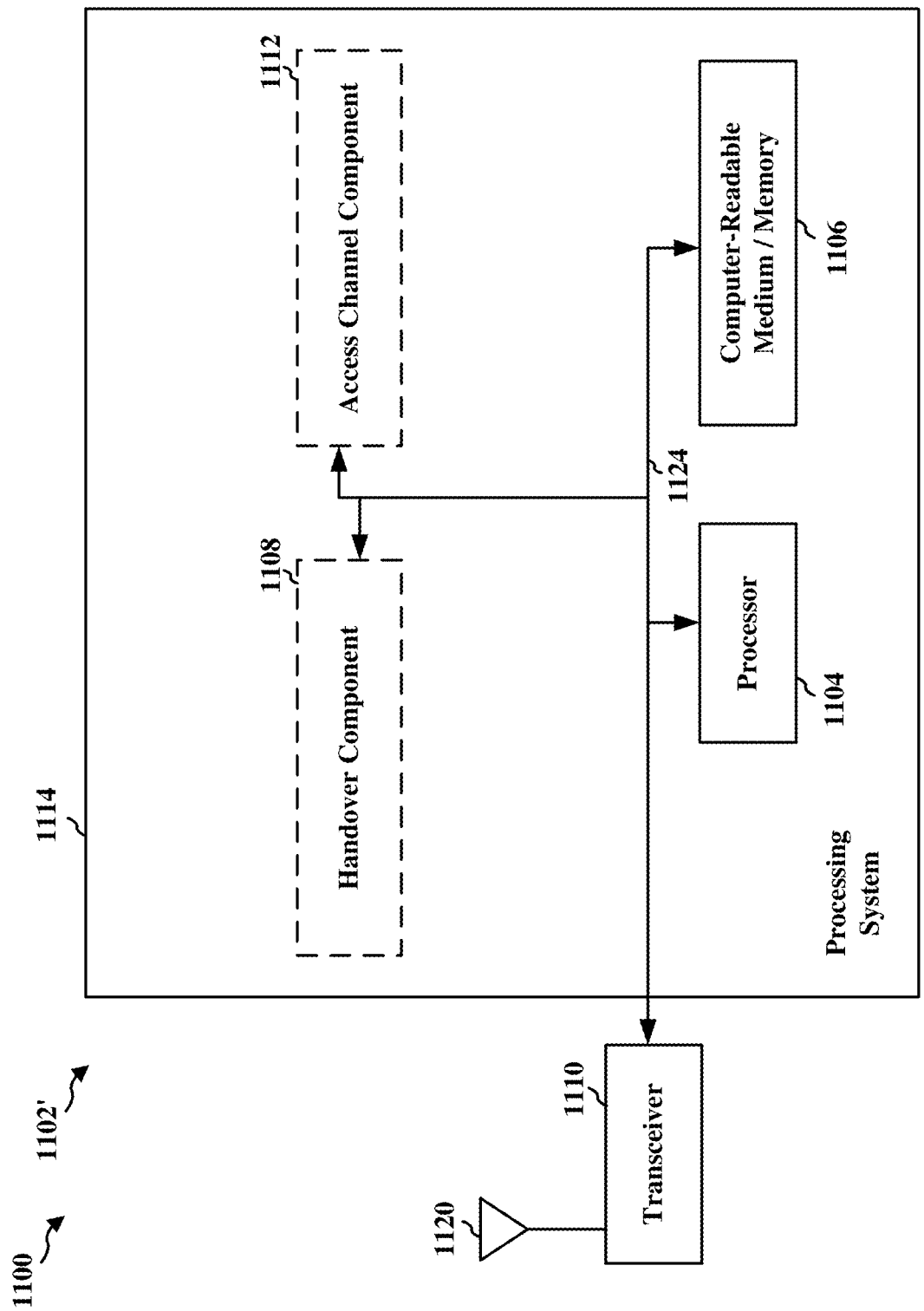
FIG. 11 shows a diagram illustrating an example implementation of an apparatus employing a processing system.

FIG. 11 shows a diagram 1100 illustrating an example implementation of an apparatus employing a processing system 1114. In some implementations, a BS includes the apparatus to perform aspects of the present disclosure. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors or hardware components, represented by the processor 1104, one or more of the components 1108 or 1112, and the computer-readable medium/memory 1006. The bus 1124 also may link various other circuits such as timing sources, peripherals, voltage regulators, and power management circuits that are not shown.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114. For example, an extracted signal may be provided to a handover component 1108 to determine, for example, whether a handover is to be initiated, link parameters for trigger events for a handover, target BSs for a CHO, whether one or more parameters are to be adjusted based on a UE movement direction, and so on. In another example, the extracted signal may be provided to the access channel component 1112 determine one or more RACH parameters for communications from the UE to the BS.

In addition, the transceiver 1110 receives information from the processing system 1114. For example, the transceiver 1110 may receive information regarding the RACH parameters from the access channel component 1112 or may receive an indication to initiate a communication handover or adjustment of one or more parameters from the handover component 1108. Based on the received information, the transceiver 1110 generates a signal to be applied to the one or more antennas 1120. In some implementations, an interface of the BS includes the transceiver 1110. The interface also may include the antenna 1120.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described herein for any particular apparatus. The computer-readable medium/memory 1106 also may be used for storing data that is manipulated by the processor 1104 when executing software. The components 1108 or 1112 may be software components running in the processor 1104, resident/stored in the computer readable medium/memory 1106, one or more hardware components coupled to the processor 1104, or some combination thereof. In some implementations, the processing system 1114 may be a component of the BS 710 and may include the memory 776 or at least one of the TX processor 718, the RX processor 770, and the controller/processor 775.

The apparatus 1002/1002' in FIG. 10 or the apparatus 1102/1102' in FIG. 11 for wireless communication may include means for performing the operations described herein. For a UE, the aforementioned means may be one or more of the aforementioned components of the apparatus 1002 or the processing system 1014 of the apparatus 1002' configured to perform the functions recited by the aforementioned means. As described above, the processing system 1014 may include the TX Processor 768, the RX Processor 756, and the controller/processor 759 if implemented in a UE 750. As such, in one configuration, the aforementioned means may be the TX Processor 768, the RX Processor 756, and the controller/processor 759 configured to perform the functions recited by the aforementioned means.

For a BS, the aforementioned means may be one or more of the aforementioned components of the apparatus 1102 or the processing system 1114 of the apparatus 1102' configured to perform the functions recited by the aforementioned means. As described above, the processing system 1114 may include the TX Processor 716, the RX Processor 770, and the controller/processor 775 if implemented in a BS 710. As such, in one configuration, the aforementioned means may be the TX Processor 716, the RX Processor 770, and the controller/processor 775 configured to perform the functions recited by the aforementioned means. In some implementations, the processing system 1114 may be a component of the base station 710 and may include the memory 776 or at least one of the TX processor 716, the RX processor 770, and the controller/processor 775.

Figure 12:
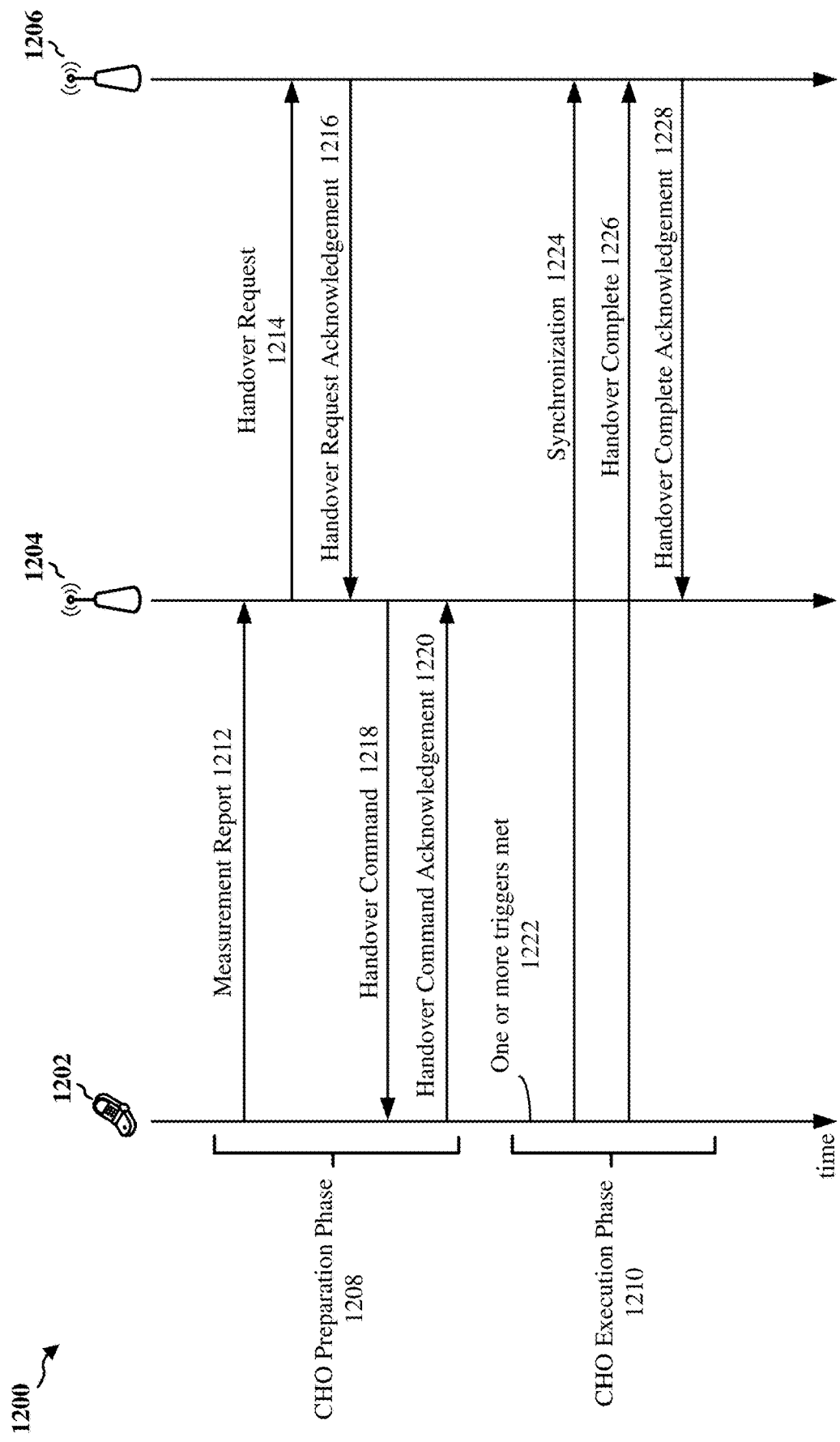
FIG. 12 shows an example signaling diagram between a serving BS, a first target BS and a UE for conditional handover (CHO).

FIG. 12 shows an example signaling diagram 1200 between a UE 1202, a serving BS 1204, and a first target BS 1206 for CHO. While one target BS is illustrated, any number of target BSs may be included for CHO. In the example, CHO includes a CHO preparation phase 1208 and a CHO execution phase 1210. During the CHO preparation phase 1208, the UE 1202 provides a measurement report 1212 to a serving BS 1204. As noted above, the measurement report 1212 may include one or more link measurements. In some implementations, the measurement report 1212 also may include one or more indications of doppler shifts determined by the UE 1202. For example, the measurement report 1212 may include an indication of a doppler shift associated with the UE 1202 moving with reference to the first target BS 1206. In some other implementations, the measurement report 1212 may not include an indication of a doppler shift.

After obtaining the measurement report 1212, the serving BS 1204 may provide a handover request 1214 to the first target BS 1206. For example, the measurement report 1212 may indicate one or more link measurements between the UE 1202 and the first target BS 1206. Based on the one or more link measurements, the serving BS 1204 may determine that the first target BS 1206 is a candidate BS for handover. The serving BS 1204 thus may prepare the first target BS 1206 for a possible handover via the handover request 1214. In response to obtaining the handover request 1214, the first target BS 1206 may provide a handover request acknowledgement 1216 to the serving BS 1204. While not shown, the serving BS 1204 may provide one or more additional handover requests to other target BSs, and the serving BS 1204 may obtain a handover request acknowledgement from the other target BSs. After obtaining the handover request acknowledgement 1216, the serving BS 1204 may provide a handover command 1218 to the UE 1202. The handover command 1218 may indicate one or more target BSs (including the first target BS 1206) that are candidates for handover. The handover command 1218 also may indicate a priority of each candidate BS with reference to the other candidate BSs. The handover command 1218 also may include a first trigger that, when met, may cause the UE 1202 to synchronize with the first target BS 1206 for handover. As used herein, a trigger also may be referred to as a trigger event. The handover command 1218 also may include one or more additional triggers. For example, the handover command 1218 may include a second trigger that, when met, may cause the UE 1202 to synchronize with a second target BS for handover. In some implementations, the handover command 1218 may be or include a RRC reconfiguration message. After obtaining the handover command 1218, the UE 1202 may provide a handover command acknowledgement 1220 to the serving BS 1204. Also after obtaining the handover command 1218 including one or more triggers, the UE 1202 may determine whether one or more triggers are met. Example triggers may include one or more trigger events described above (such as described above with reference to cell reselection or generation of measurement reports).

During the CHO execution phase 1210, the UE 1202 determines that one or more triggers are met (1222). For example, the UE 1202 may determine that the first trigger associated with the first target BS 1206 is met, and the UE 1202 may synchronize with the first target BS 1206 in response to the first trigger being met (1224). In some implementations, more than one trigger associated with different target BSs may be met. If multiple triggers associated with different target BSs are met, the target BS with which the UE is to synchronize may be based on the priority of the target BSs indicated in the handover command 1218. For example, the UE 1202 may synchronize with the target BS associated with the highest priority.

While not shown, the UE 1202 also may configure itself for one or more RACH parameters to complete handover. Once handover is complete so that the first target BS 1206 serves the UE 1202, the UE may provide a handover complete message 1226 to the first target BS 1206. After obtaining the handover complete message 1226, the first target BS may provide a handover complete acknowledgement 1228 to the serving BS 1204. With the handover complete acknowledgement 1228 being obtained by the serving BS 1204, the existing triggers obtained by the UE 1202 for the candidate BSs may no longer be valid. In this manner, new triggers and candidate BSs may be indicated in a new handover command from the first target BS 1206 as the UE 1202 moves through the network. While not shown in the diagram 1200, CHO operations also may include the serving BS 1204 removing or replacing one or more target BSs from being a candidate BS for handover. For example, the serving BS 1204 may determine from one or more link measurements that a target BS is no longer a candidate. In this manner, the serving BS 1204 may communicate with the target BS to remove the target BS as a candidate, and the serving BS 1204 may provide a handover command to the UE 1202 that does not include the target BS in the list of candidate BSs for handover or a trigger associated with the target BS.

Figure 13:
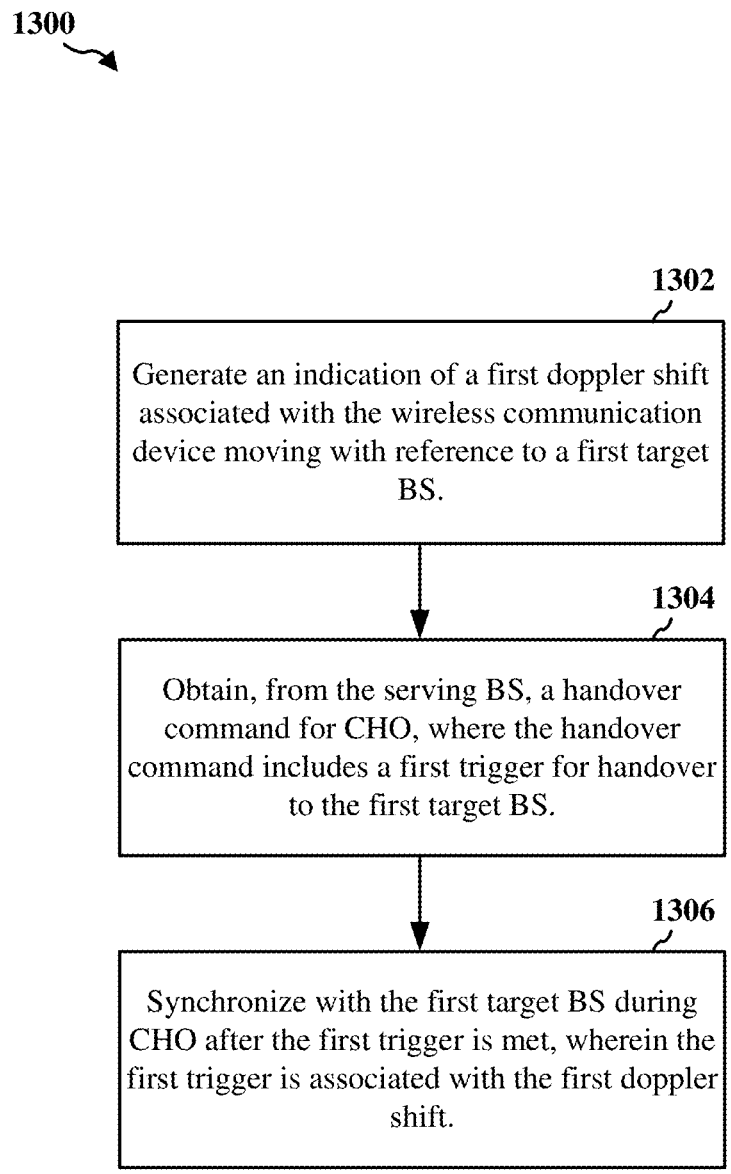
FIG. 13 shows a flowchart of an example method performed by a UE for CHO.
Figure 14:
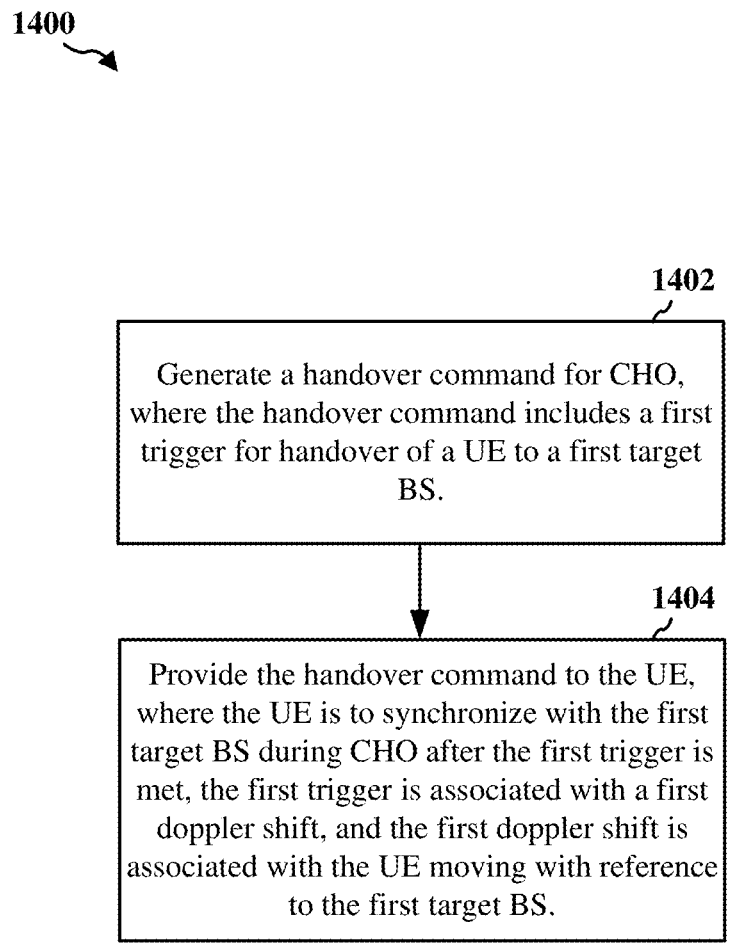
FIG. 14 shows a flowchart of an example method performed by a BS for CHO.

As noted above, one or more CHO operations may be based on one or more doppler shifts determined by the UE 1202. Additional details in performing CHO based on one or more doppler shifts are described in the examples below. FIG. 13 depicts an example operation performed by a UE. FIG. 14 depicts an example operation performed by a BS. While the following examples are with reference to performing CHO, other types of operations may be based on one or more doppler shifts. For example, as noted above, cell reselection, adjusting one or more RACH parameters, or generating measurement reports may be based on a doppler shift determined by the UE. In this manner, one or more operations described below with reference to performing CHO may be applied to cell reselection, the adjustment of one or more RACH parameters, the generation of measurement reports, or other suitable operations.

FIG. 13 shows a flowchart of an example method 1300 performed by a UE for CHO. At 1302, a wireless communication device (such as a UE) may generate an indication of a first doppler shift associated with the wireless communication device moving with reference to a first target BS. The first target BS may be within range of the wireless communication device so that the device receives one or more signals from the first target BS. In this manner, the wireless communication device may obtain one or more signals from the first target BS, and the wireless communication device may determine the first doppler shift from the one or more obtained signals.

At 1304, the wireless communication device may obtain, from the serving BS, a handover command for CHO. The handover command includes a first trigger for handover to the first target BS. In some implementations, multiple target BSs may be candidates for handover. In this manner, the handover command also may indicate triggers associated with other target BSs. For example, the handover command may include a second trigger for handover to a second target BS. As noted above, the handover command also may indicate a priority of each candidate BS for handover in the handover command.

At 1306, the wireless communication device may synchronize with the first target BS during CHO after the first trigger is met (with the first trigger being associated with the first doppler shift). In some implementations, a UE may indicate the first doppler shift to a serving BS, and the serving BS may adjust the handover command based on the first doppler shift. For example, referring back to FIG. 12, the UE 1202 may determine the first doppler shift with reference to the UE 1202 movement with reference to the first target BS 1206 before providing the measurement report 1212 to the serving BS 1204. The UE 1202 may generate an indication of the first doppler shift in the measurement report 1212 along with one or more link measurements associated with the first target BS 1206. The UE 1202 provides the measurement report 1212 including the indication of the first doppler shift and the one or more link measurements. While not shown in FIG. 12, the UE 1202 also may determine a second doppler shift associated with a second target BS, generate an indication of the second doppler shift, and include the indication of the second doppler shift in the measurement report 1212.

After obtaining the measurement report 1212 including one or more indications of doppler shifts, the serving BS 1204 may adjust one or more CHO operations based on the one or more doppler shifts. In some implementations, the first trigger included in the handover command 1218 is associated with the first doppler shift indicated in the measurement report 1212. If the handover command 1218 includes a second trigger associated with a second target BS, the second trigger may be associated with the second doppler shift indicated in the measurement report 1212.

In some implementations, the first target BS 1206 may be associated with a range of doppler shifts. For example, handover to a target BS may not be preferred if the UE 1202 is moving less than a threshold speed towards the target BS. In this manner, the doppler shift associated with the target BS is to be greater than a first threshold. In a specific example, handover to a target BS may not be preferred if the UE 1202 is moving away from the target BS. In this manner, the serving BS 1204 may determine if the doppler shift associated with the target BS is greater than 0. If the doppler shift is greater than 0, the serving BS 1204 may determine that the target BS is a candidate BS for handover, increase the priority for handover to the target BS, or adjust the trigger associated with the target BS to cause the trigger to be more easily met (such as decreasing a signal strength threshold or another suitable threshold). If the doppler shift is less than 0, the serving BS 1204 may exclude the target BS as a candidate BS for handover, decrease the priority for handover to the target BS, or adjust the trigger associated with the target BS to cause the trigger to be more difficult to meet (such as increasing a signal strength threshold or another suitable threshold). If the target BS is not a candidate BS for handover, the serving BS 1204 may not include the target BS in the list of candidate BSs included in the handover command 1218. If the target BS still is a candidate but associated with a lower priority or an adjusted trigger, the adjusted priority or adjusted trigger is included in the handover command 1218.

In this manner, the UE 1202 may be prevented from synchronizing with the target BS based on the target BS being excluded as a candidate BS, the trigger being adjusted, or the priority of the target BS being decreased. For example, the serving BS 1204 may decrease the priority of a second target BS to be lower than the priority of the first target BS 1206 or adjust a second trigger associated with the second target BS based on a second doppler shift associated with the second target BS. In this manner, the serving BS 1204 may provide the adjusted priority or the adjusted second trigger to the UE 1202 in the handover command 1218. If the adjusted second trigger is not met, the UE 1202 may be prevented from synchronizing with the second target BS. If the adjusted second trigger is met and the first trigger associated with the first target BS 1206 also is met, the UE 1202 may be prevented from synchronizing with the second target BS based on the handover priority of the first target BS 1206 being greater than the handover priority of the second target BS.

In another example of a target BS being associated with a range of doppler shifts, a target BS may be configured to service UEs moving at a "normal" speed range, at a "medium" speed range, or at a "high" speed range as described above. For example, referring back to FIG. 8B, the BS 852 may be configured to service UEs travelling at one or more of a "normal" speed range or a "medium" speed range (such as a movement by foot, by bicycle, or by car below a threshold speed). The BS 852 may be associated with a doppler shift range including the first (minimum) threshold (such as described above). The doppler shift range also may include a second (maximum) threshold. The second threshold may be associated with the threshold speed to delineate the "normal" speed range from the "high" speed range. The BS 856 may be configured to service UEs travelling at a "high" speed range (such as a movement by a high speed train or by car travelling above the threshold speed). In this manner, the BS 856 may be associated with a doppler shift range which may include a first (minimum) threshold that is equal to or greater than the maximum threshold associated with the BS 852. In some implementations, the BS 856 also may be associated with a second (maximum) threshold. For example, the second threshold may be associated with a maximum speed defined in the 3GPP set of standards for the UE regarding a high speed train (such as 200 kph).

In a particular example, the BS 852 may not be configured to service UEs on the high speed train 858. In this manner, the second (maximum) threshold associated with the BS 852 may be associated with a threshold speed to delineate between a UE travelling on the high speed train 858 (moving at a speed in the "high" speed range) or the UE not travelling on the high speed train 858 (moving at a speed in the "normal" speed range or the "medium" speed range). The BS 856 may be configured to service UEs on the high speed train 858. In this manner, the first (minimum) threshold associated with the BS 856 may be associated with a threshold speed to indicate that a UE is travelling on the high speed train 858. In the above example, a first doppler shift range associated with the BS 852 may be lower than a second doppler shift range associated with the BS 856.

A serving BS to the UE 866 may obtain a first doppler shift associated with the BS 852 and a second doppler shift associated with the BS 856 from the UE 866. The serving BS may compare the doppler shifts to the corresponding doppler shift ranges. If the UE 866 is on the high speed train 858, the first doppler shift may be outside of the first doppler shift range, and the second doppler shift may be in the second doppler shift range. Based on the first doppler shift being outside of the first doppler shift range, the serving BS may determine that the BS 852 is not a candidate BS for handover, may decrease a priority of the BS 852 for handover, or may adjust a trigger associated with the BS 852 for handover. Based on the second doppler shift being in the second doppler shift range, the serving BS may determine that the BS 856 is a candidate BS for handover, may increase a priority of the BS 856 for handover, or may adjust a trigger associated with the BS 856 for handover.

In addition or alternative to a serving BS determining whether one or more BSs are a candidate BS, adjusting one or more priorities of the candidate BSs, or adjusting one or more triggers based on the doppler shifts, the UE may assist in excluding one or more BSs as a candidate BS, adjust one or more priorities of the candidate BSs, or adjust one or more triggers based on the doppler shifts. In some implementations, the UE may not provide indications of doppler shifts to the serving BS. For example, referring back to FIG. 12, the measurement report 1212 may not include an indication of a doppler shift to the serving BS 1204. The serving BS 1204 may determine one or more candidate BSs (including the first target BS 1206), may determine a priority of the one or more candidate BSs for handover, and may determine a trigger for each of the one or more candidate BSs without reference to a doppler shift. In some implementations, the serving BS also prepares each of the candidate BSs for possible handover. In this manner, the handover command 1218 may include a list of candidate BSs for handover, priorities of the candidate BSs, and a trigger for each candidate BS that is not based on a doppler shift.

The UE 1202 may determine a doppler shift for each candidate BS (including the first doppler shift for the first target BS 1206). After obtaining the handover command 1218, the UE 1202 may adjust one or more of whether a target BS is a candidate BS for handover, one or more priorities of the candidate BSs, or one or more triggers based on the determined doppler shifts. For example, the UE 1202 may generate an indication of a first doppler shift associated with the first target BS 1206. The UE 1202 may determine whether the first target BS 1206 is to remain a candidate BS (or whether the first target BS 1206 is excluded as a candidate BS), may adjust the priority of the first target BS 1206, or may adjust the first trigger associated with the first target BS 1206. The operations performed by the UE 1202 in excluding or keeping the first target BS 1206 as a candidate BS, adjusting the priority of the first target BS 1206, or adjusting the first trigger associated with the first target BS 1206 may be similar to the example operations that may be performed by the serving BS 1204 described above. In excluding a BS as a candidate, the UE 1202 may prevent reporting a link measurement for the excluded BS in a subsequent measurement report to the serving BS 1204.

Referring back to block 1306 in FIG. 13, synchronizing with the first target BS may be based on the first target BS being identified as a candidate BS, an adjusted priority of the first target BS being greater than a priority of another target BS, or an adjusted trigger being met for the first target BS. In this manner, the first trigger may be associated with the first doppler shift. In addition to whether a first trigger is met, a link quality between the UE and the first target BS may be measured to be greater than a link quality threshold before the UE synchronizes with the first target BS. For example, a first trigger may be associated with a signal strength or include another suitable trigger described above. However, a link quality threshold also is to be met to ensure the link quality between the UE and the first target BS is sufficient for the first target BS to service the UE. If a signal to interference plus noise ratio (SINR) or another suitable link quality metric is below the link quality threshold, the link quality may be insufficient for the first target BS to service the UE. In this manner, if the link quality is not greater than the link quality threshold, the UE may be prevented from synchronizing with the first target BS. In some implementations, the link quality periodically may be measured by the UE and compared to the threshold. If the link quality is above the link quality threshold, the UE may synchronize with the first target BS. In some other implementations, the UE may synchronize with a second target BS based on a second trigger being met and a link quality between the second target BS and the UE being greater than the link quality threshold.

As noted above with reference to FIG. 8C, a doppler shift may include a magnitude and an angle. Comparing the doppler shift to a doppler shift range or to a doppler shift threshold may include comparing the magnitude of the doppler shift to a magnitude range or to a magnitude threshold (with a magnitude threshold or the thresholds of the magnitude range being associated with the angle of the doppler shift as described above with reference to FIG. 8C). In this manner, the serving BS or the UE may compare a magnitude of a first doppler shift to a magnitude of a first doppler shift range associated with the first target BS.

Referring now to the BS perspective in performing the CHO operations, FIG. 14 shows a flowchart of an example method 1400 performed by a BS for CHO. The BS may be a serving BS of the UE performing the operations in example method 1300 in FIG. 13. At 1402, the serving BS may generate a handover command for CHO. The handover command may include a first trigger for handover of a UE to a first target BS. For example, referring back to FIG. 12, the serving BS 1204 may generate the handover command 1218, and the handover command 1218 may include a first trigger for handover of the UE 1202 to the first target BS 1206. The handover command 1218 also may include one or more triggers associated with other candidate BSs for handover, an indication of the candidate BSs, and a priority of each candidate BS (including a priority of the first target BS 1206). As noted above, the first trigger, the priority, or whether the first target BS is a candidate may be determined by the serving BS based on a first doppler shift obtained from the UE. In some other implementations, the first trigger, the priority, or whether the first target BS is a candidate may be determined by the serving BS without reference to a first doppler shift, and the UE may adjust one or more of the first trigger, the priority, or whether the first target BS is a candidate obtained in the handover command based on the first doppler shift.

Referring back to FIG. 14, at block 1404, the serving BS provides the handover command to the UE. The first trigger is associated with a first doppler shift measured by the UE moving with reference to the first target BS, and the UE is to synchronize with the first target BS after the first trigger is met. As noted above, in some implementations, the serving BS may obtain the first doppler shift from the UE and adjust one or more of whether the first target BS is a candidate for handover, the first trigger, or the priority of the first target BS based on the first doppler shift. In addition or to the alternative, the UE may adjust one or more of whether the first target BS is a candidate for handover, the first trigger, or the priority of the first target BS based on the first doppler shift. For example, the first doppler shift may be compared to a doppler shift range associated with the first target BS, or a magnitude of the first doppler shift may be compared to one or more magnitudes of the doppler shift range to determine if the first doppler shift is in the doppler shift range. Adjusting one or more of whether the first target BS is a candidate for handover, the first trigger, or the priority of the first target BS may be based on whether the first doppler shift is in the doppler shift range. In this manner, the first trigger may be associated with the first doppler shift measured by the UE.

As noted above, the UE 1202 may provide one or more indications of doppler shifts to the serving BS 1204 (such as in a measurement report 1212 depicted in FIG. 12). In some implementations, the serving BS 1204 helps configure the UE 1202 to provide one or more indications of doppler shifts to the serving BS 1204. The serving BS 1204 also may indicate to the UE 1202 when and whether the UE 1202 is to measure a doppler shift. For example, the serving BS 1204 may provide a measurement control message to the UE 1202 before the UE 1202 provides a measurement report 1212. The measurement control message indicates a request for the UE 1202 to provide a measurement report 1212 to the serving BS 1204. The measurement control message also may indicate one or more target BSs (such as target BS 1206) that may be candidates for handover and the channels to be used for measurement for each of the one or more target BSs. For example, the measurement control message may indicate the target BS 1206 and a channel for receiving signals from the target BS 1206. The UE 1202 may listen for a signal on the indicated channel to generate a measurement of the signal (such as a RSRQ, RSRP, RSSI, or other link quality measurement), and the UE 1202 may provide an indication of the measurement in the measurement report 1212.

The measurement control message also may indicate configurations for generating the measurement report. For example, the measurement control message may indicate one or more of a periodicity for generating or providing the measurement reports (such as whether a separate report is to be provided in response to a new measurement control message or whether message reports are to be provided automatically at a defined interval), when to begin generating or providing measurement reports (such as a link quality threshold with the serving BS 1204 to indicate when the UE 1202 is to provide one or more measurement reports), or what link qualities to measure for each target BS. If the measurement report 1212 is to include one or more indications of doppler shifts (such as an indication of a first doppler shift and an indication of a second doppler shift for a first target BS and a second target BS, respectively), the measurement control message may indicate to the UE 1202 that the UE 1202 is to provide the one or more indications of the doppler shifts in the measurement report 1212. In some implementations, the measurement control message also may indicate whether the UE 1202 is to measure one or more doppler shifts. In response to obtaining the measurement control message, the UE 1202 may measure a doppler shift from a signal obtained from a target BS, and the UE may provide an indication of the doppler shift in a measurement report 1212 to the serving BS 1204. In this manner, the serving BS 1204 may control whether an indication of a doppler shift is obtained in a measurement report 1212 from the UE 1202. For the above examples of a first doppler shift for a first target BS and a second doppler shift for a second BS, the measurement control message is associated with the indication of the first doppler shift and the indication of the second doppler shift being provided in the one or more measurement reports to the serving BS.

In some implementations, CHO also may be based on a doppler shift between the UE and the serving BS. For example, while the above examples depict a trigger for CHO being associated with a doppler shift for a target BS (such as the target BS 1206 in FIG. 12), a trigger also may be associated with a doppler shift for the serving BS. Referring back to FIG. 12, the UE 1202 may measure a doppler shift associated with the UE 1202 moving with reference to the serving BS 1204. Measuring the doppler shift associated with the serving BS 1204 is similar to measuring the doppler shift associated with the target BS 1206 (such as described herein).

For example, the serving BS 1204 may indicate to the UE 1202 that the UE 1202 is to measure the doppler shift associated with the serving BS 1204. The indication may be included in the measurement control message, a message when first performing or completing handover from a previous serving BS to the serving BS 1204 to serve the UE 1202, or another suitable message to the UE 1202. The measurement control message also may indicate that the UE 1202 is to report the doppler shift to the serving BS 1204. The measurement report 1212 indicates the doppler shift associated with the target BS 1206 and the doppler shift associated with the serving BS 1204.

The serving BS 1204 may generate the first trigger for handover to the target BS 1206, and the first trigger may be based on the doppler shifts. An example trigger without reference to a doppler shift may include a link quality of the serving BS 1204 (such as a RSRP or RSRQ) being less than a link quality of the target BS 1206 by a threshold amount or a link quality of the serving BS 1204 being less than a threshold. As described above, the first trigger also may be based on the doppler shift associated with the target BS 1206 being greater than a threshold or within a range of doppler shifts. In addition or alternative to the first trigger being based on the doppler shift associated with the target BS 1206 being greater than a threshold or within a range of doppler shifts, the first trigger may be based on a comparison of the doppler shift associated with the serving BS 1204 to one or more thresholds or ranges or to one or more doppler shifts associated with target BSs (such as the target BS 1206). For example, an example first trigger may include: (1) a link quality comparison, such as a RSRQ of the link between the target BS 1206 and the UE 1202 being more than a RSRQ threshold amount better than a RSRQ of the link between the serving BS 1204 and the UE 1202; and (2) a doppler shift comparison, such as a doppler shift associated with the serving BS 1204 being less than a threshold or being more than a threshold amount less than a doppler shift associated with the target BS 1206.

In some implementations, other than the serving BS 1204 generating a first trigger based on the doppler shift associated with the serving BS 1204, the UE 1202 may adjust a first trigger obtained from the serving BS 1204 based on the doppler shift associated with the serving BS 1204. For example, the UE 1202 measures the link quality metrics (including the link quality metrics associated with the serving BS 1204) and reports them to the serving BS 1204 in the measurement report 1212. The serving BS 1204 may generate a first trigger based on the link quality metrics (such as a RSRQ of the link between the target BS 1206 and the UE 1202 being more than a RSRQ threshold amount better than a RSRQ of the link between the serving BS 1204 and the UE 1202) and provide the first trigger in the handover command 1218. The UE 1202 may obtain the first trigger from the handover command 1218 and adjust the first trigger to include a doppler shift based component. For example, the first trigger may be adjusted to include whether a doppler shift associated with the serving BS 1204 is less than a threshold or is more than a threshold amount less than a doppler shift associated with the target BS 1206. In this manner, a trigger may be associated with a doppler shift associated with a serving BS as well as one or more doppler shifts associated with one or more target BSs.

As noted above, cell reselection, adjusting one or more RACH parameters, or measurement reporting by the UE may be associated with a doppler shift. While some of the example provided above depict cell reselection, adjusting one or more RACH parameters, and measurement reporting as being associated with one or more doppler shifts for one or more target BSs, cell reselection, adjusting one or more RACH parameters, or measurement reporting also may be associated with a doppler shift for the serving BS. In this manner, the operations performed by the UE 1202, the serving BS 1204 or a target BS 1206 based on a doppler shift is not limited to being based on a doppler shift for a target BS, but also may be based on a doppler shift for the serving BS 1204.

Beam Selection/Switching

While the above examples describe cell reselection, the adjustment of RACH parameters, measurement reporting, or CHO being associated with one or more doppler shifts, in some other implementations, beam selection (such as for beam switching) may be associated with one or more doppler shifts. In some implementations, a BS is configured to emit different beams in different directions from the BS. For example, a BS may extend its coverage range in a direction by focusing a same amount of energy for an omnidirectional transmission into a beam emitted in a specific direction from the BS. A BS also may reduce interference and congestion by separating UEs to be serviced by different beams emitted in different directions. In some implementations, a BS may include one or more directional antennas configured to beam signals in a specific direction. In some implementations, a BS may be configured to combine signals from multiple antennas to amplify the signal in a specific direction and cancel out or reduce the signal in other directions.

If a BS is configured to emit different beams, one of the beams is selected for use in communicating with the UE. Selection may occur to switch between beams servicing the UE (such as similar to a handover between BS as described above, except the handover is between beams from the same BS). Selection also may occur when initially configuring a link between the UE and the BS. Selecting the beam to be used may be based on the location of the UE with reference to the BS and the emission directions of the different beams.

The beams are emitted in different directions from the BS. In this manner, a first doppler shift measured by the UE based on a first beam from the BS may differ from a second doppler shift measured by the UE based on a second beam from the BS. In some implementations, which beam is to be selected may be based one or more of a doppler shift associated with the selected beam or a doppler shift associated with another beam emitted by the same BS.

Figure 15:
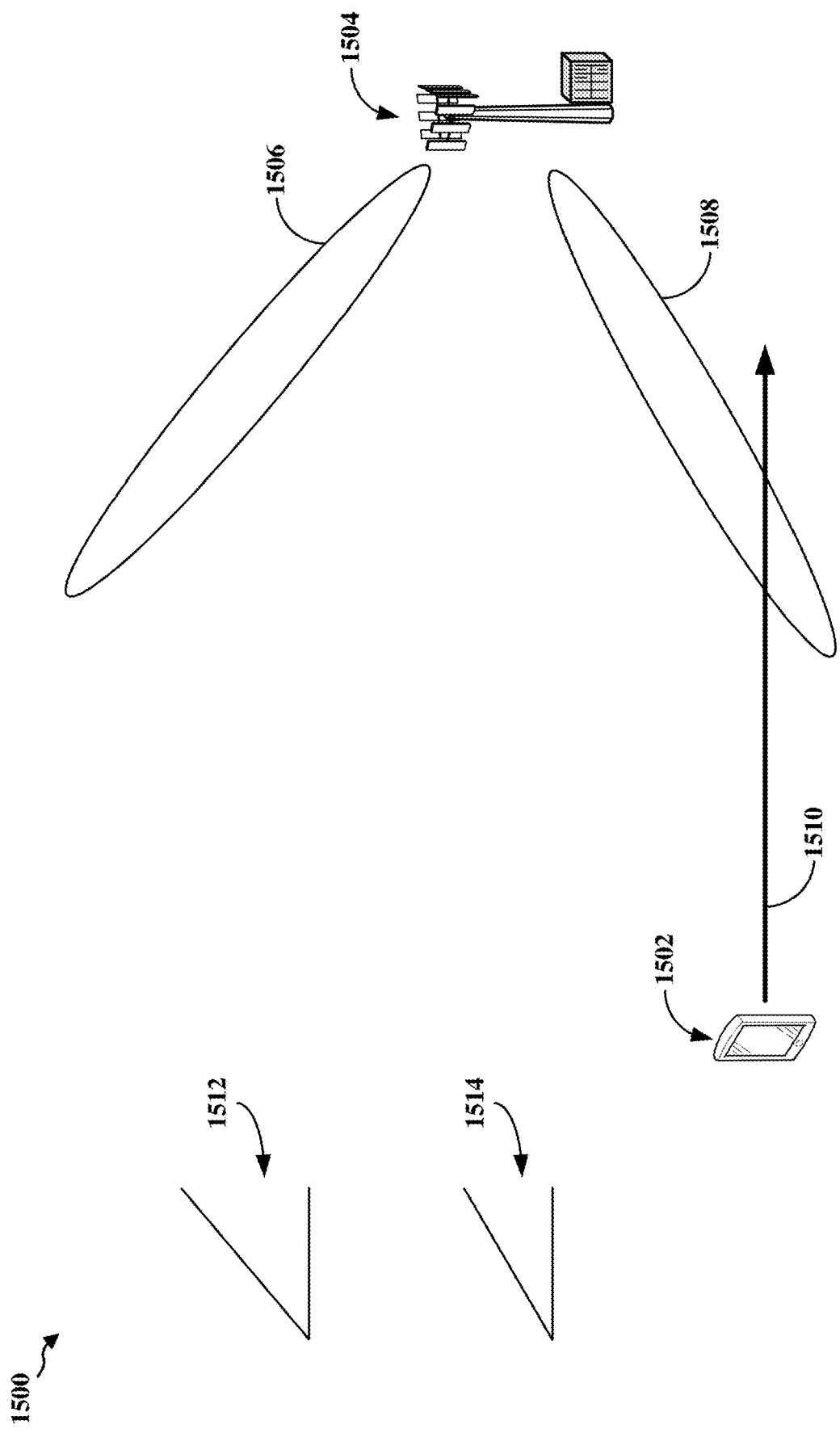
FIG. 15 shows a diagram illustrating a plurality of beams emitted by a BS that may selected for communication with a UE.

FIG. 15 shows a diagram 1500 illustrating a plurality of beams 1506-1508 emitted by a BS 1504 that may be selected for communication with a UE 1502. While only two beams are depicted, the BS 1504 may be configured to emit any suitable number of beams in any number of directions. In addition or to the alternative, the BS 1504 may be configured to emit omnidirectionally (such as by using one or more omnidirectional antennas). While FIG. 15 is described with reference to selecting between beams 1506 and 1508, beam selection may be among one or more directional beams or an "omnidirectional" beam.

The UE 1502 is travelling along direction 1510. The UE 1502 may listen for signals from different beams from the BS 1504 and may measure a signal quality (such as a RSSI, RSRQ, or RSRP) for each beam on which signals are received. The UE 1502 also may determine a doppler shift for each beam for which signals are received (such as using a reference signal from a beam). For example, if the UE 1502 is able to receive signals from beam 1506 and beam 1508, the UE 1502 may measure a first doppler shift associated with beam 1506 and a second doppler shift associated with 1508.

If the BS 1504 is to perform beam switching, one of the beams may be used to currently communicate with the UE 1502. For example, beam 1506 currently may be used for communicating with the UE 1502. Beam 1506 may be referred to as a serving beam. In this manner, beam 1508 may be a candidate beam for beam switching in order to communicate with the UE 1502. Beam 1508 may be referred to as a target beam.

With the UE 1502 moving along direction 1510, angle 1512 depicts the angle between the signals emitted in the serving beam 1506 and the direction 1510. Angle 1514 depicts the angle between the signals emitted in the target beam 1508 and the direction 1510. Larger angles are associated with a smaller doppler shift magnitude (such as described above with reference to FIG. 8C). In this manner, a magnitude of a first doppler shift measured from signals from serving beam 1506 are smaller than a magnitude of a second doppler shift measured from signals from target beam 1508.

Similar to a trigger for handover from a serving BS to a target BS being associated with one or more doppler shifts for BSs, a trigger to switch beams from the serving beam 1506 to the target beam 1508 for the UE 1502 may be associated with one or more of the first doppler shift or the second doppler shift for the beams. For example, the BS 1504 may switch from the serving beam 1506 to the target beam 1508 to service the UE 1502 based at least in part on the first doppler shift being less than a threshold doppler shift, the first doppler shift being more than a threshold amount less than the second doppler shift, or the second doppler shift being greater than a threshold doppler shift. The UE 1502 may provide one or more measurement reports indicating the one or more doppler shifts to the BS 1504, and the BS 1504 may determine or adjust a trigger for beam switching based on the one or more doppler shifts. In some implementations, a doppler shift associated with an omnidirectional beam is assumed to be the doppler shift associated with the UE moving with reference to the BS (without reference to a directionality of transmitting signals, such as the direction of the beam 1506 or the direction of the beam 1508). In this manner, a doppler shift determined for an omnidirectional beam may be compared to one or more thresholds, ranges, or other doppler shifts for directional beams.

Since beam switching or selection may be associated with one or more doppler shifts between the direction of the beams and the movement of the UE, operations described above with reference to CHO, cell reselection, and measurement reporting may apply to beam switching or selection. For example, instead of measuring doppler shifts for one or more BSs in the above examples, doppler shifts may be measured for one or more beams from a single BS (such as a serving BS to the UE). In this manner, a beam may be associated with a range of doppler shifts. A trigger to switch to the beam may be based on the doppler shift of the beam being in the associated range of doppler shifts.

Implementation examples are described in the following numbered clauses:

1. A wireless communication device, including:
   a processing system configured to:
   generate an indication of a first doppler shift associated with the wireless communication device moving with reference to a first target base station (BS);
   and
   cause the wireless communication device to synchronize with the first target BS during conditional handover (CHO) after a first trigger is met, where the first trigger is associated with the first doppler shift; and
   an interface configured to:
   obtain, from the serving BS, a handover command for CHO, where the handover command includes a first trigger for handover to the first target BS.

2. The wireless communication device of clause 1, where the first trigger is associated with whether the first doppler shift is greater than a first threshold.

3. The wireless communication device of clause 2, where the first trigger also is associated with whether the first doppler shift is less than a second threshold and whether a link quality with the first target BS is greater than a link quality threshold.

4. The wireless communication device of clause 3, where:
   the first doppler shift includes a first magnitude and a first angle of the first doppler shift; and
   the first doppler shift being greater than a first threshold and less than a second threshold includes the first magnitude being greater than a first magnitude threshold and less than a second magnitude threshold, where the first magnitude threshold and the second magnitude threshold are associated with the first angle.

5. The wireless communication device of clause 1, where the processing system is further configured to:
   generate an indication of a second doppler shift associated with the wireless communication device moving with reference to a second target BS, where the handover command includes a second trigger for handover to the second target BS, where the second trigger is associated with the second doppler shift.

6. The wireless communication device of clause 5, where the processing system is further configured to:
   prevent the wireless communication device from synchronizing with the second target BS, where one of:
   the second trigger is not met; or
   a handover priority associated with the first trigger BS is greater than a handover priority associated with the second trigger BS.

7. The wireless communication device of clause 5, where the interface is further configured to:
   provide the indication of the first doppler shift and the indication of the second doppler shift to the serving BS before obtaining the handover command from the serving BS, where the first trigger and the second trigger as obtained in the handover command from the serving BS are associated with the first doppler shift and the second doppler shift.

8. The wireless communication device of clause 7, where the interface is further configured to:
   obtain a measurement control message from the serving BS, where the measurement control message is associated with the indication of the first doppler shift and the indication of the second doppler shift being provided in one or more measurement reports to the serving BS; and provide the one or more measurement reports after obtaining the measurement control message, where the one or more measurement reports include the indication of the first doppler shift and the indication of the second doppler shift during CHO preparation.

9. A method performed by a wireless communication device, including:
generating an indication of a first doppler shift associated with the wireless communication device moving with reference to a first target base station (BS);
obtaining, from a serving BS, a handover command for conditional handover (CHO), where the handover command includes a first trigger for handover to the first target BS; and
synchronizing with the first target BS during CHO after the first trigger is met, where the first trigger is associated with the first doppler shift.

10. The method of clause 9, where the first trigger is associated with whether the first doppler shift is greater than a first threshold.

11. The method of clause 10, where the first trigger also is associated with whether the first doppler shift is less than a second threshold and whether a link quality with the first target BS is greater than a link quality threshold.

12. The method of clause 11, where:
the first doppler shift includes a first magnitude and a first angle of the first doppler shift; and
the first trigger being greater than a first threshold and less than a second threshold includes the first magnitude being greater than a first magnitude threshold and less than a second magnitude threshold, where the first magnitude threshold and the second magnitude threshold are associated with the first angle.

13. The method of clause 9, further including:
generating an indication of a second doppler shift associated with the wireless communication device moving with reference to a second target BS, where the handover command includes a second trigger for handover to the second target BS, where the second trigger is associated with the second doppler shift.

14. The method of clause 13, further including preventing synchronizing with the second target BS, where one of:
the second trigger is not met; or
a handover priority associated with the first trigger BS is greater than a handover priority associated with the second trigger BS.

15. The method of clause 13, further including:
obtaining a measurement control message from the serving BS, where the measurement control message is associated with the indication of the first doppler shift and the indication of the second doppler shift being provided in one or more measurement reports to the serving BS; and
providing the one or more measurement reports after obtaining the measurement control message, where the one or more measurement reports include the indication of the first doppler shift and the indication of the second doppler shift during CHO preparation.

16. A wireless communication device, including:
a processing system configured to:
generate a handover command for conditional handover (CHO), where the handover command includes a first trigger for handover of a user equipment (UE) to a first target base station (BS); and
an interface configured to:
provide the handover command to the UE, where:
the UE is to synchronize with the first target BS during CHO after the first trigger is met;
the first trigger is associated with a first doppler shift; and
the first doppler shift is associated with the wireless communication device moving with reference to the first target BS.

17. The wireless communication device of clause 16, where the first trigger is associated with whether the first doppler shift is greater than a first threshold.

18. The wireless communication device of clause 17, where the first trigger also is associated with whether the first doppler shift is less than a second threshold and whether a link quality with the first target BS is greater than a link quality threshold.

19. The wireless communication device of clause 18, where:
the first doppler shift includes a first magnitude and a first angle of the first doppler shift; and
the first doppler shift being greater than a first threshold and less than a second threshold includes the first magnitude being greater than a first magnitude threshold and less than a second magnitude threshold, where the first magnitude threshold and the second magnitude threshold are associated with the first angle.

20. The wireless communication device of clause 16, where:
the handover command includes a second trigger for handover to a second target BS;
the second trigger is associated with a second doppler shift; and
the UE generates an indication of a second doppler shift associated with the UE moving with reference to the second target BS.

21. The wireless communication device of clause 20, where the UE prevents synchronizing with the second target BS, where one of:
the second trigger is not met; or
a handover priority associated with the first trigger BS is greater than a handover priority associated with the second trigger BS.

22. The wireless communication device of clause 20, where the interface is further configured to:
obtain the indication of the first doppler shift and the indication of the second doppler shift from the UE, where the first trigger and the second trigger as provided to the UE in the handover command are associated with the first doppler shift and the second doppler shift.

23. The wireless communication device of clause 22, where:
the processing system is further configured to:
generate a measurement control message, where the measurement control message is associated with the indication of the first doppler shift and the indication of the second doppler shift being obtained in one or more measurement reports from the UE; and
the interface is further configured to:
provide the measurement control message to the UE; and
obtain the one or more measurement reports after providing the measurement control message, where the one or more measurement reports include the indication of the first doppler shift and the indication of the second doppler shift during CHO preparation.

24. A method performed by a wireless communication device, including:
generating a handover command for conditional handover (CHO), where the handover command includes a first trigger for handover of a user equipment (UE) to a first target base station (BS); and
providing the handover command to the UE, where:
the UE is to synchronize with the first target BS during CHO after the first trigger is met;
the first trigger is associated with a first doppler shift; and
the first doppler shift is associated with the wireless communication device moving with reference to the first target BS.

25. The method of clause 24, where the first trigger is associated with whether the first doppler shift is greater than a first threshold.

26. The method of clause 25, where the first trigger also is associated with whether the first doppler shift is less than a second threshold and whether a link quality with the first target BS is greater than a link quality threshold.

27. The method of clause 26, where:
the first doppler shift includes a first magnitude and a first angle of the first doppler shift; and
the first doppler shift being greater than a first threshold and less than a second threshold includes the first magnitude being greater than a first magnitude threshold and less than a second magnitude threshold, where the first magnitude threshold and the second magnitude threshold are associated with the first angle.

28. The method of clause 24, where:
the handover command includes a second trigger for handover to a second target BS;
the second trigger is associated with a second doppler shift; and
the UE generates an indication of a second doppler shift associated with the UE moving with reference to the second target BS.

29. The method of clause 28, where the UE prevents synchronizing with the second target BS, where one of:
the second trigger is not met; or
a handover priority associated with the first trigger BS is greater than a handover priority associated with the second trigger BS.

30. The method of clause 24, further including:
generating a measurement control message, where the measurement control message is associated with the indication of the first doppler shift and the indication of the second doppler shift being obtained in one or more measurement reports from the UE;
providing the measurement control message to the UE; and
obtaining the one or more measurement reports after providing the measurement control message, where the one or more measurement reports include the indication of the first doppler shift and the indication of the second doppler shift during CHO preparation.

31. The wireless communication device of clause 1, where the processing system is further configured to generate an indication of a second doppler shift associated with the wireless communication device moving with reference to the serving BS, where the first trigger also is associated with the second doppler shift.

32. The wireless communication device of clause 31, where the first trigger is associated with one or more of:
whether the second doppler shift is greater than a threshold doppler shift; or
whether the first doppler shift is greater than the second doppler shift by a threshold amount.

33. The method of clause 9, further including generating an indication of a second doppler shift associated with the wireless communication device moving with reference to the serving BS, where the first trigger also is associated with the second doppler shift.

34. The method of clause 33, where the first trigger is associated with one or more of:
whether the second doppler shift is greater than a threshold doppler shift; or
whether the first doppler shift is greater than the second doppler shift by a threshold amount.

35. The wireless communication device of clause 16, where the first trigger also is associated with a second doppler shift associated with the UE moving with reference to the wireless communication device.

36. The wireless communication device of clause 35, where the first trigger is associated with one or more of:
whether the second doppler shift is greater than a threshold doppler shift; or
whether the first doppler shift is greater than the second doppler shift by a threshold amount.

37. The method of clause 24, where the first trigger also is associated with a second doppler shift associated with the UE moving with reference to the wireless communication device.

38. The method of clause 37, where the first trigger is associated with one or more of:
whether the second doppler shift is greater than a threshold doppler shift; or
whether the first doppler shift is greater than the second doppler shift by a threshold amount.

39. A wireless communication device, including:
a processing system configured to:
generate an indication of a first doppler shift associated with the wireless communication device moving with reference to a first beam emitted by a base station (BS); and
an interface configured to:
provide the indication of the first doppler shift to the BS, where a beam selection by the BS for communicating with the wireless communication device is associated with the first doppler shift.

40. The wireless communication device of clause 39, where:
the processing system is further configured to:
generate an indication of a second doppler shift associated with the wireless communication device moving with reference to a second beam emitted by the BS, where the first beam is a serving beam and the second beam is a target beam; and
the interface is further configured to:
provide the indication of the second doppler shift to the BS, where the beam selection by the BS also is associated with the second doppler shift.

41. A method, including:
generating an indication of a first doppler shift associated with the wireless communication device moving with reference to a first beam emitted by a base station (BS); and
providing the indication of the first doppler shift to the BS, where a beam selection by the BS for communicating with the wireless communication device is associated with the first doppler shift.

42. The method of clause 41, further including:
generating an indication of a second doppler shift associated with the wireless communication device moving with reference to a second beam emitted by the BS, where the first beam is a serving beam and the second beam is a target beam; and
providing the indication of the second doppler shift to the BS, where the beam selection by the BS also is associated with the second doppler shift.

43. A wireless communication device, including:
an interface configured to:
obtain an indication of a first doppler shift from a user equipment (UE), where the first doppler shift is associated with the UE moving with reference to a first beam emitted by the wireless communication device; and
a processing system configured to:
select a beam for communicating with the UE, where selecting the beam is associated with the first doppler shift.

44. The wireless communication device of clause 43, where the interface is further configured to:
obtain an indication of a second doppler shift from the UE, where:
the second doppler shift is associated with the UE moving with reference to a second beam emitted by the wireless communication device;
the first beam is a serving beam;
the second beam is a target beam;
selecting the beam also is associated with the second doppler shift; and
selecting the beam includes selecting between the first beam and the second beam for communicating with the UE.

45. A method, including:
obtaining an indication of a first doppler shift from a user equipment (UE), where the first doppler shift is associated with the UE moving with reference to a first beam emitted by the wireless communication device; and
selecting a beam for communicating with the UE, where selecting the beam is associated with the first doppler shift.

46. The method of clause 45, further including obtaining an indication of a second doppler shift from the UE, where:
the second doppler shift is associated with the UE moving with reference to a second beam emitted by the wireless communication device;
the first beam is a serving beam;
the second beam is a target beam;
selecting the beam also is associated with the second doppler shift; and
selecting the beam includes selecting between the first beam and the second beam for communicating with the UE.

Other implementation examples are described in the following numbered clauses:

1. A method performed by an apparatus of a user equipment (UE), including:
identifying a movement direction of the UE with reference to a target base station (BS);
identifying that a criterion for cell reselection is met, where the criterion is based on one or more reselection parameters associated with the movement direction; and
performing cell reselection to the target BS in response to identifying that the criterion for cell reselection is met.

2. The method of clause 1, where the one or more reselection parameters include one or more of:
a reselection hysteresis (QHyst);
a reselection timer (TReselection); or
a reselection offset (QOffset).

3. The method of clause 1, further including:
obtaining information regarding the one or more reselection parameters from a serving BS.

4. The method of clause 3, where the information regarding the one or more reselection parameters is obtained in:
one or more system information blocks (SIBs) from the serving BS; or
a dedicated radio resource control (RRC) message from the serving BS.

5. The method of clause 1, where identifying the movement direction includes identifying one of:
a UE movement away from the target BS;
the UE movement toward the target BS; or
the UE movement equidistant from the target BS,
where the one or more reselection parameters vary based on whether the UE movement is away from, toward, or equidistant from the target BS.

6. The method of clause 5, further including identifying a movement vector of the UE with reference to the target BS, where the movement vector includes the movement direction and a movement magnitude and where the one or more reselection parameters vary based on the movement magnitude.

7. The method of clause 6, further including identifying one of a plurality of movement vector ranges in which the movement vector of the UE is included, where the one or more reselection parameters vary based on which one of the plurality of movement vector ranges is identified.

8. The method of clause 5 or clause 6, where the one or more reselection parameters vary by a scaling factor associated with the movement direction.

9. The method of clause 8, where the scaling factor is the movement magnitude divided by a maximum movement magnitude.

10. The method of clause 9, where the maximum movement magnitude is defined by a technical standard from the Third Generation Partnership Project (3GPP).

11. The method of clause 9, further including obtaining the maximum movement magnitude from the serving BS.

12. The method of clause 11, where the maximum movement magnitude is obtained in:
a system information block (SIB) from the serving BS; or
a dedicated radio resource control (RRC) message from the serving BS.

13. A method performed by an apparatus of a user equipment (UE), including:
identifying a movement direction of the UE with reference to a base station (BS) serving the UE;
outputting the movement direction to the BS, where one or more random access channel (RACH) parameters are determined based on the movement direction; and
communicating with the BS over the RACH based on the one or more RACH parameters.

14. The method of clause 13, where identifying the movement direction includes identifying one of:
a UE movement away from the BS;
the UE movement toward the BS; or
the UE movement equidistant from the BS,
where the one or more RACH parameters are based on whether the UE movement is away from, toward, or equidistant from the BS.
15. The method of clause 14, further including identifying a movement vector of the UE with reference to the BS, where the movement vector includes the movement direction and a movement magnitude and where the one or more RACH parameters are based on the movement magnitude.
16. The method of clause 15, further including identifying one of a plurality of movement vector ranges in which the movement vector of the UE is included, where the one or more RACH parameters are based on which one of the plurality of movement vector ranges is identified.
17. The method of clause 14 or clause 15, where the one or more RACH parameters vary based on the movement direction or the movement vector.
18. The method of clause 17, where the one or more RACH parameters include one or more of:
a physical RACH (PRACH) for communicating by the UE to the BS;
one or more PRACH parameters;
one or more radio resource control (RRC) parameters;
a preamble format of a RACH signal from the UE to the BS for requesting access to the RACH;
a payload length of the RACH signal;
a priority of the UE to access the RACH; or
one or more access barring parameters for barring the UE from accessing the RACH.
19. The method of clause 18, where the PRACH is:
a first PRACH based on the UE movement being away from the BS; or
a second PRACH based on the UE movement being toward the BS.
20. The method of clause 18, where the one or more PRACH parameters include one or more of:
a PRACH configuration index; or
a PRACH frequency offset.
21. The method of clause 18, where the one or more RRC parameters include one or more of:
a preamble size;
a preamble power ramping step;
a target received power of a preamble at the BS;
a maximum transmission power of the preamble;
a power offset between the preamble and a payload associated with the preamble;
a contention resolution timer size; or
a window size for responding, by the serving BS, to a request from the UE to access the RACH.
22. The method of clause 18, where the preamble format includes a field to indicate the movement vector.
23. The method of clause 18, where the payload length is:
a first length based on the UE movement being away from the BS; or
a second length longer than the first length based on the UE movement being toward the BS.
47. The method of clause 18, where the priority of the UE to access the RACH is:
a first priority based on the UE movement being away from the BS; or
a second priority greater than the first priority based on the UE movement being toward the BS.

48. The method of clause 18, where the one or more access barring parameters include a barring time to bar the UE from accessing the RACH, where a length of the barring time corresponds to the movement vector.
49. A method performed by an apparatus of a user equipment (UE), including:
identifying a movement direction of the UE with reference to a base station (BS);
measuring one or more link parameters with the BS to generate one or more measurement results; and
reporting the one or more measurement results to the BS,
where measuring the one or more link parameters or reporting the one or more measurement results is based on the movement direction.
50. The method of clause 26, where identifying the movement direction includes identifying one of:
a UE movement away from the BS;
the UE movement toward the BS; or
the UE movement equidistant from the BS,
where measuring the one or more link parameters or reporting the one or more measurement results is based on whether the UE movement is away from, toward, or equidistant from the BS.
51. The method of clause 27, further including identifying a movement vector of the UE with reference to the BS, where the movement vector includes the movement direction and a movement magnitude and where measuring the one or more link parameters or reporting the one or more measurement results is based on the movement magnitude.
52. The method of clause 28, further including identifying one of a plurality of movement vector ranges in which the movement vector of the UE is included, where measuring the one or more link parameters or reporting the one or more measurement results is based on which one of the plurality of movement vector ranges is identified.
53. The method of clause 27 or clause 28, where the one or more link parameters include one or more of:
a received signal strength of a signal from the BS to the UE;
a reference signal receive power (RSRP) of a reference signal from the serving BS to the UE;
a reference signal receive quality (RSRQ) of the reference signal;
a signal to interference plus noise ratio (SINR) of the reference signal;
a signal to noise ratio (SNR) of the reference signal; or
a channel state information for the reference signal (CSI-RS).
54. The method of clause 30, further including:
outputting the movement direction or the movement vector to the BS; and
obtaining, from the BS, an indication of a first link parameter or a second link parameter to be measured, where whether the indication of the first link parameter or the indication of the second link parameter is obtained is based on the movement direction or the movement vector.
55. The method of clause 31, further including obtaining an indication of the one or more link parameters from the BS in a dedicated radio resource control (RRC) message from the BS.
56. The method of clause 27 or clause 28, where:
reporting the one or more measurement results is periodic; and a periodicity of reporting the one or more measurement results is based on the movement direction or the movement vector.

57. The method of clause 27 or clause 28, where:
reporting the one or more measurement results is event triggered; and
one or more trigger events for reporting the one or more measurement results are based on the movement direction or the movement vector.

58. The method of clause 34, further including adjusting a threshold of one or more link parameters based on the movement direction or the movement vector, where one or more trigger events include a measurement result crossing a threshold of the link parameter.

59. The method of clause 35, where a parameter of one or more trigger events include one or more of:
a time to trigger (TTT) during which one or more measurement results satisfy an event to trigger measurement reporting;
a difference between a first measurement result for the BS and an expected measurement result for the BS is outside a hysteresis; or
a difference between the first measurement result for the BS and a second measurement result for a serving BS is outside an offset.

60. The method of clause 36, where the TTT, the hysteresis, or the offset is adjusted based on the movement direction or the movement vector.

61. A method performed by an apparatus of a user equipment (UE), including:
identifying a first target movement direction of the UE with reference to a first target base station (BS);
identifying a second target movement direction of the UE with reference to a second target BS; and
indicating the first target movement direction and the second target movement direction to a serving BS, where a network including the serving BS, the first target BS, and the second target BS is to perform a conditional handover (CHO) to the first target BS or the second target BS based on the first target movement direction and the second target movement direction.

62. The method of clause 38, further including:
identifying a movement direction of the UE with reference to the serving BS, where the CHO is further based on the movement direction.

63. The method of clause 38, where identifying the first target movement direction and identifying the second target movement direction includes identifying one of:
a UE movement away from the first target BS or the second target BS;
the UE movement toward the first target BS or the second target BS; and
the UE movement equidistant from the first target BS or the second target BS,
where the CHO is based on whether the UE movement is away from, toward, or equidistant from the first target BS or the second target BS for each of the first target movement direction and the second target movement direction.

64. The method of clause 38, further including:
identifying a first target movement vector of the UE with reference to the first target BS, where the first target movement vector includes the first target movement direction and a first target movement magnitude; and
identifying a second target movement vector of the UE with reference to the second target BS, where the second target movement vector includes the second target movement direction and a second target movement magnitude,
where the CHO is based on the first target movement vector and the second target movement vector.

65. The method of clause 41, further including:
identifying a first vector range of a plurality of movement vector ranges in which the first target movement vector is included; and
identifying a second vector range of the plurality of movement vector ranges in which the second target movement vector is included,
where the CHO is based on the first vector range and the second vector range.

66. The method of clause 40 or clause 41, where the first target BS is excluded as a candidate for the CHO based on the first vector direction or the first vector range.

67. The method of clause 40 or clause 41, where a first priority of the first target BS is adjusted relative to a second priority of the second target BS based on:
the first target movement direction and the second target movement direction; or
the first target movement vector and the second target movement vector,
where the CHO is based on the first priority and the second priority.

68. The method of clause 40 or clause 41, where:
one or more parameters of a trigger event for the CHO are adjusted based on:
the first target movement direction and the second target movement direction; or
the first target movement vector and the second target movement vector;
the trigger event with the adjusted one or more parameters is identified as occurring; and
in response to identifying that the trigger event occurs, the first target BS or the second target BS is selected to serve the UE based on:
the first target movement direction and the second target movement direction; or
the first target movement vector and the second target movement vector.

69. The method of clause 45, where the one or more parameters include one or more of:
a time to trigger (TTT) during which the trigger event occurs to trigger the CHO;
a hysteresis threshold associated with the serving BS;
a first offset threshold associated with a first offset between a serving BS signal measurement and a first target BS signal measurement; or
a second offset threshold associated with a second offset between the serving BS signal measurement and a second target BS signal measurement.

70. The method of clause 1, clause 13, clause 26, or clause 38, further including measuring a movement of the UE with reference to the BS, where the movement direction is identified from the measured movement.

71. The method of clause 47, where the movement of the UE is measured as a doppler of a reference signal obtained by the UE.

72. The method of clause 47, where the movement of the UE is measured by one or more motion sensors included or coupled to the UE.

73. The method of clause 1, clause 13, clause 26, or clause 38, where the BS is a next generation NodeB (gNB).

74. A user equipment (UE), including:
one or more processors; and
a memory coupled to the one or more processors and storing instructions that, when executed by the one or more processors, cause the UE to perform the operations of one or more of clauses 1-50.

75. A user equipment (UE) including means for performing the operations of one or more of clauses 1-50.

76. A non-transitory computer-readable memory including instructions that, when executed by one or more processors of a user equipment (UE), cause the UE to perform the operations of one or more of clauses 1-50.

77. A method performed by an apparatus of a base station (BS) for conditional handover (CHO), including:
obtaining an indication of a first target movement direction of a UE with reference to a first target BS;
obtaining an indication of a second target movement direction of the UE with reference to a second target BS; and
initiating a communication handover with the first target BS or the second target BS based on the indication of the first target movement or the indication of the second target movement.

78. The method of clause 54, further including obtaining an indication of a movement direction of the UE with reference to the BS, where initiating the communication handover is further based on the movement direction.

79. The method of clause 54, where initiating the communication handover is based on whether the UE movement is away from, toward, or equidistant from the first target BS or the second target BS for each of the first target movement direction and the second target movement direction.

80. The method of clause 54, further including excluding one of the first target BS or the second target BS as a candidate for the communication handover based on one or more of the first target movement direction or the second target movement direction.

81. The method of clause 54, further including adjusting a handover priority of the first target BS relative to a handover priority of the second target BS based on the first target movement direction and the second target movement direction.

82. The method of clause 54, where the BS is a next generation NodeB (gNB).

83. A base station (BS), including:
one or more processors; and
a memory coupled to the one or more processors and storing instructions that, when executed by the one or more processors, cause the BS to perform the operations of one or more of clauses 54-59.

84. A base station (BS) including means for performing the operations of one or more of clauses 54-59.

62. A non-transitory computer-readable memory including instructions that, when executed by one or more processors of a base station (BS), cause the BS to perform the operations of one or more of clauses 54-59.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A wireless communication device, comprising:
a processing system configured to cause the wireless communication device to:
provide an indication of a first doppler shift associated with movement of the wireless communication device with reference to a first target base station (BS); and
synchronize with the first target BS during conditional handover (CHO) to the first target BS after a first trigger is met, wherein:
the first trigger is met based at least in part on the first doppler shift being greater than a first threshold and less than a second threshold;
the first doppler shift corresponds with a first magnitude and a first angle of the first doppler shift; and
the first magnitude being greater than a first magnitude threshold and less than a second magnitude threshold, wherein the first magnitude threshold and the second magnitude threshold are associated with the first angle; and
an interface configured to:
obtain, from a serving BS, a handover command for CHO to the first target BS, wherein the handover command includes the first trigger for handover.

2. The wireless communication device of claim 1, wherein the first trigger is met based further in part on a link quality with the first target BS being greater than a link quality threshold.

3. The wireless communication device of claim 1, wherein the processing system is further configured to cause the wireless communication device to:
provide an indication of a second doppler shift associated with movement of the wireless communication device with reference to a second target BS, wherein the handover command includes a second trigger for handover to the second target BS, wherein the second trigger is associated with the second doppler shift.

4. The wireless communication device of claim 3, wherein the processing system is further configured to:
prevent the wireless communication device from synchronizing with the second target BS, based at least in part on one of:
the second trigger not being met; or
a handover priority associated with the first target BS being greater than a handover priority associated with the second target BS.

5. The wireless communication device of claim 3, wherein the interface is further configured to:
output for transmission to the serving BS one or more measurement reports including the indication of the first doppler shift and the indication of the second doppler shift before obtaining the handover command from the serving BS, wherein the first trigger and the second trigger as obtained in the handover command from the serving BS are associated with the first doppler shift and the second doppler shift.

6. The wireless communication device of claim 5, wherein the interface is further configured to:
obtain a measurement control message from the serving BS, wherein the measurement control message indicates a request for the wireless communication device to output the one or more measurement reports for transmission to the serving BS with the indication of the first doppler shift and the indication of the second doppler, and
wherein the one or more measurement reports include the indication of the first doppler shift and the indication of the second doppler shift during CHO preparation.

7. A method performed by a wireless communication device, comprising:
providing an indication of a first doppler shift associated with movement of the wireless communication device with reference to a first target base station (BS);
obtaining, from a serving BS, a handover command for conditional handover (CHO) to the first target BS, wherein the handover command includes a first trigger for handover to the first target BS; and
synchronizing with the first target BS during CHO to the first target BS after the first trigger is met, wherein the first trigger is met based at least in part on the first doppler shift being greater than a first threshold and less than a second threshold.

8. The method of claim 7, wherein the first trigger is met based further in part on a link quality with the first target BS being greater than a link quality threshold.

9. The method of claim 7, wherein:
the indication of the first doppler shift includes a first magnitude and a first angle of the first doppler shift;
the first threshold is a first magnitude threshold associated with the first angle;
the second threshold is a second magnitude threshold associated with the first angle; and
a determination that the trigger is met is based at least in part on the first magnitude being greater than a first magnitude threshold and less than the second magnitude threshold.

10. The method of claim 7, further comprising:
providing an indication of a second doppler shift associated with movement of the wireless communication device with reference to a second target BS, wherein the handover command includes a second trigger for handover to the second target BS, wherein the second trigger is associated with the second doppler shift.

11. The method of claim 10, further comprising preventing synchronizing with the second target BS based at least in part on one of:
the second trigger not being met; or
a handover priority associated with the first trigger BS being greater than a handover priority associated with the second trigger BS.

12. The method of claim 10, further comprising:
obtaining a measurement control message from the serving BS, wherein the measurement control message indicates a request for the wireless communication device to output one or more measurement reports for transmission to the serving BS with the indication of the first doppler shift and the indication of the second doppler shift being provided in one or more measurement reports to the serving BS; and
providing the one or more measurement reports after obtaining the measurement control message, wherein the one or more measurement reports include the indication of the first doppler shift and the indication of the second doppler shift during CHO preparation.

13. A wireless communication device, comprising:
a processing system configured to:
provide a handover command for conditional handover (CHO) to a first target base station (BS), wherein the handover command includes a first trigger for handover of a user equipment (UE); and
an interface configured to:
output the handover command for transmission to the UE, wherein:
the UE is to synchronize with the first target BS during CHO after the first trigger is met;
the first trigger is met based at least in part on a first doppler shift being greater than a first threshold and less than a second threshold; and
the first doppler shift being associated with movement of the UE with reference to the first target BS.

14. The wireless communication device of claim 13, wherein the first trigger is met based further in part on a link quality with the first target BS being greater than a link quality threshold.

15. The wireless communication device of claim 13, wherein:
the indication of the first doppler shift includes a first magnitude and a first angle of the first doppler shift;
the first threshold is a first magnitude threshold associated with the first angle;
the second threshold is a second magnitude threshold associated with the first angle; and
a determination that the first doppler shift being greater than a first threshold and less than a second threshold includes the trigger is met is based at least in part on the first magnitude being greater than a first magnitude threshold and less than the second magnitude threshold.

16. The wireless communication device of claim 13, wherein:
the handover command includes a second trigger for handover to a second target BS;
the second trigger is associated with a second doppler shift; and
the UE provides an indication of the second doppler shift associated with movement of the UE with reference to the second target BS.

17. The wireless communication device of claim 16, wherein the UE is configured to prevent synchronizing with the second target BS based at least in part on one of:
the second trigger not being met; or
a handover priority associated with the first trigger BS being greater than a handover priority associated with the second trigger BS.

18. The wireless communication device of claim 16, wherein the interface is further configured to:
obtain one or more measurement reports from the UE including the indication of the first doppler shift and the indication of the second doppler shift, wherein the first trigger and the second trigger as provided to the UE in the handover command are associated with the first doppler shift and the second doppler shift.

19. The wireless communication device of claim 18, wherein:
the processing system is further configured to:
output for transmission to the UE a measurement control message, wherein the measurement control message indicates a request for the UE to output the one or more measurement reports for transmission to the wireless communication device, the one or more measurement reports including the indication of the first doppler shift and the indication of the second doppler shift; and
the interface is further configured to:
provide the measurement control message to the UE; and
obtain the one or more measurement reports from the UE after providing the measurement control message, wherein the one or more measurement reports include the indication of the first doppler shift and the indication of the second doppler shift during CHO preparation.

20. A method performed by a wireless communication device, comprising:
providing a handover command for conditional handover (CHO) to a first target base station (BS), wherein the handover command includes a first trigger for handover of a user equipment (UE) wherein:
the UE is to synchronize with the first target BS during CHO after the first trigger is met;
the first trigger is met based at least in part on a first doppler shift being greater than a first threshold and less than a second threshold; and
the first doppler shift being associated with movement of the UE with reference to the first target BS.

21. The method of claim 20, wherein the first trigger is met based further in part on a link quality with the first target BS being greater than a link quality threshold.

22. The method of claim 21, wherein:
the indication of the first doppler shift includes a first magnitude and a first angle of the first doppler shift;
the first threshold is a first magnitude threshold associated with the first angle; and
the second threshold is a second magnitude threshold associated with the first angle;
a determination that the trigger is met is based at least in part on the first magnitude being greater than a first magnitude threshold and less than the second magnitude threshold.

23. The method of claim 20, wherein:
the handover command includes a second trigger for handover to a second target BS;
the second trigger is associated with a second doppler shift; and
the UE provides an indication of the second doppler shift associated with movement of the UE with reference to the second target BS.

24. The method of claim 23, wherein the UE is configured to prevent synchronizing with the second target BS based at least in part on one of:
the second trigger not being met; or
a handover priority associated with the first trigger BS being greater than a handover priority associated with the second trigger BS.

25. The method of claim 20, further comprising:
outputting for transmission to the UE a measurement control message, wherein the measurement control message indicates a request for the UE to output one or more measurement reports for transmission to the wireless communication device, the one or more measurement reports including the indication of the first doppler shift and the indication of the second doppler shift;
providing the measurement control message to the UE; and
obtaining the one or more measurement reports from the UE after providing the measurement control message, wherein the one or more measurement reports include the indication of the first doppler shift and the indication of the second doppler shift during CHO preparation.

\* \* \* \* \*